United States Patent
Kim et al.

(10) Patent No.: US 9,952,661 B2
(45) Date of Patent: Apr. 24, 2018

(54) METHOD FOR PROVIDING SCREEN MAGNIFICATION AND ELECTRONIC DEVICE THEREOF

(71) Applicant: Samsung Electronics Co., Ltd., Suwon-si, Gyeonggi-do (KR)

(72) Inventors: Kyung-Jung Kim, Suwon-si (KR); Dong-Heon Kang, Suwon-si (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 14/837,447

(22) Filed: Aug. 27, 2015

(65) Prior Publication Data

US 2016/0062452 A1 Mar. 3, 2016

(30) Foreign Application Priority Data

Sep. 1, 2014 (KR) .................. 10-2014-0115711

(51) Int. Cl.
  *G09G 5/00* (2006.01)
  *G06F 3/01* (2006.01)
  *G06T 3/40* (2006.01)
  *G06F 3/0346* (2013.01)

(52) U.S. Cl.
  CPC ............ *G06F 3/011* (2013.01); *G06F 3/0346* (2013.01); *G06T 3/40* (2013.01)

(58) Field of Classification Search
  USPC ................................................ 345/660–671
  See application file for complete search history.

(56) References Cited

U.S. PATENT DOCUMENTS

| | | | | |
|---|---|---|---|---|
| 7,202,857 | B2 * | 4/2007 | Hinckley | G06F 3/0418 345/173 |
| 8,237,666 | B2 * | 8/2012 | Soo | G06F 3/0416 345/173 |
| 2012/0050333 | A1 * | 3/2012 | Bernstein | G06F 3/0416 345/660 |
| 2013/0050269 | A1 * | 2/2013 | Arrasvuori | G06T 3/0025 345/661 |
| 2014/0362119 | A1 * | 12/2014 | Freund | G06F 3/017 345/661 |
| 2015/0286378 | A1 * | 10/2015 | Joe | G06F 3/04845 345/663 |
| 2015/0324080 | A1 * | 11/2015 | Jin | G06F 3/0481 715/784 |

FOREIGN PATENT DOCUMENTS

| | | |
|---|---|---|
| KR | 10-2010-0062707 A | 6/2010 |
| KR | 10-2011-0029681 A | 3/2011 |
| KR | 10-2013-0031394 A | 3/2013 |
| KR | 10-2013-0115693 A | 10/2013 |

* cited by examiner

*Primary Examiner* — Ryan R Yang
(74) *Attorney, Agent, or Firm* — Jefferson IP Law, LLP

(57) ABSTRACT

A method and an apparatus for providing screen magnification in an electronic device are provided. The method includes displaying a screen, detecting a screen magnification event, determining a target area on the screen based on the screen magnification event, and magnifying the target area on the screen.

18 Claims, 60 Drawing Sheets

METHOD FOR PROVIDING SCREEN MAGNIFICATION AND ELECTRONIC DEVICE THEREOF

CROSS-REFERENCE TO RELATED APPLICATION(S)

This application claims the benefit under 35 U.S.C. § 119(a) of a Korean patent application filed on Sep. 1, 2014 in the Korean Intellectual Property Office and assigned Serial number 10-2014-0115711, the entire disclosure of which is hereby incorporated by reference.

TECHNICAL FIELD

The present disclosure relates to a method and an apparatus for providing screen magnification in an electronic device.

BACKGROUND

Currently, electronic devices which complexly perform one or more functions are increasingly used. More particularly, mobile terminals which are generally known as "smartphones" are the mainstream of the electronic devices. The electronic device, for example, a mobile terminal, is provided with a large touch screen display module and is provided with a high-pixel camera module in addition to the basic function of communicating with other devices, so that the electronic device can photograph a still image or a moving image, and access a network to be able to perform web surfing. The performance of these electronic devices has been enhanced with the inclusion of a high performance processor. Therefore, such electronic devices are able to perform various functions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for providing screen magnification in an electronic device.

Another aspect of the present disclosure is to provide a method and an apparatus for providing screen magnification based on a hovering input in an electronic device.

Another aspect of the present disclosure is to provide a method and an apparatus for providing screen magnification based on a hovering input by an electronic pen in an electronic device.

Another aspect of the present disclosure is to provide a method and an apparatus for providing screen magnification based on a hovering input by a finger in an electronic device.

Another aspect of the present disclosure is to provide a method and an apparatus for providing screen magnification based on an input on a virtual input pad in an electronic device.

In accordance with an aspect of the present disclosure, a method for providing screen magnification in an electronic device is provided. The method includes displaying a screen, detecting a screen magnification event, determining a target area on the screen based on the screen magnification event, and magnifying the target area on the screen.

In accordance with another aspect of the present disclosure, an electronic device is provided. The electronic device includes a display and a processor configured to display a screen on the display, detect a screen magnification event, determine a target area on the screen based on the screen magnification event, and magnify the target area on the screen.

According to various embodiments of the present disclosure, a method for providing screen magnification in an electronic device is provided so that a user requiring screen magnification (for example, a user with low vision) can easily control the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
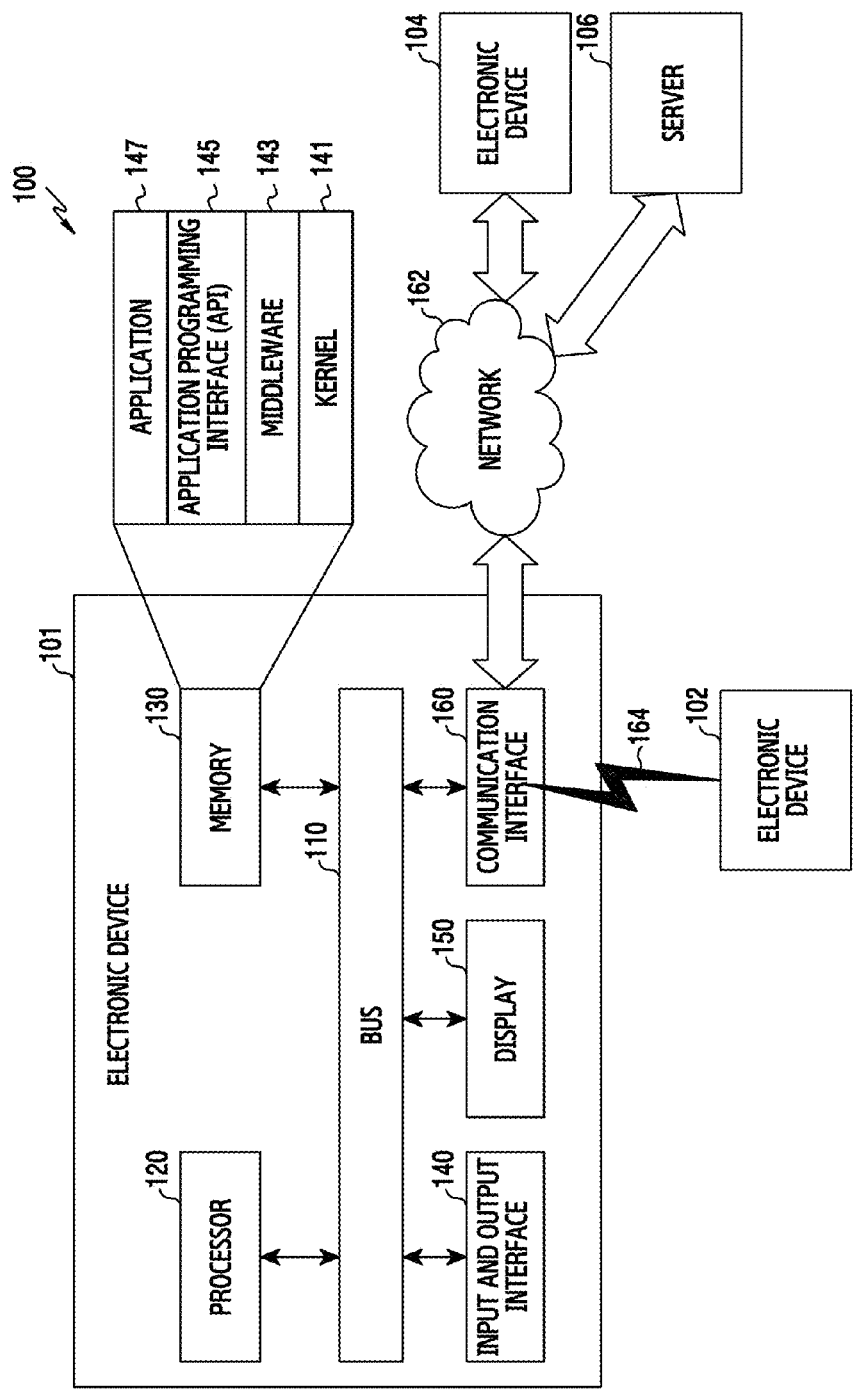
FIG. 1A illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have", "may have", "include", and "may include" used in various embodiments of the present disclosure indicate the presence of corresponding features (for example, elements, such as numerical values, functions, operations, parts, and the like), and do not preclude the presence of additional features.

The terms "A or B," "at least one of A or/and B," or "one or more of A or/and B" used in various embodiments of the present disclosure include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" used in various embodiments of the present disclosure may modify various elements regardless of an order and/or importance of the corresponding elements, and does not limit the corresponding elements. These terms may be used for the purpose of distinguishing one element from another element. For example, a first user device and a second user device may indicate different user devices regardless of the order or importance. For example, a first element may be named a second element without departing from the scope of right of various embodiments of the present disclosure, and similarly, a second element may be named a first element.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in various embodiments of the present disclosure may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (for example, an embedded processor) for performing a corresponding operation, or a generic-purpose processor (for example, a central processing unit (CPU) or an application processor (AP)) capable of performing a corresponding operation by executing one or more software programs stored in a memory device.

All of the terms used herein including technical or scientific terms have the same meaning as those generally understood by one of ordinary skill in the related art unless they are defined otherwise. The terms defined in a generally used dictionary should be interpreted as having the same meanings as the contextual meanings of the relevant technology and should not be interpreted as having ideal or exaggerated meanings unless they are clearly defined in various embodiments of the present disclosure. According to circumstances, even the terms defined in various embodiments of the present disclosure should not be interpreted as excluding the embodiments of the present disclosure.

An electronic device according to various embodiments of the present disclosure may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical machine, a camera, a wearable device (for example, smart glasses, a head-mounted-device (HMD), electronic clothing, an electronic bracelet, an electronic necklace, an electronic appcessory, electronic tattoos, a smart mirror, or a smartwatch), and the like.

According to various embodiments of the present disclosure, the electronic device may be a smart home appliance. For example, the smart home appliance may include at least one of a television (TV), a digital versatile disc (DVD) player, a stereo, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™, PlayStation™), an electronic dictionary, an electronic key, a camcorder, an electronic album, and the like.

According to an embodiment of the present disclosure, the electronic device may include at least one of various medical machines (for example, various portable medical measurement devices (a glucose monitor, a heart rate monitor, a blood pressure measuring device, or a thermometer), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (for example, a navigation equipment for ship, a gyro compass, and the like), avionics, a security device, a head unit for vehicles, an industrial or home robot, an automatic teller machine (ATM) of a financial institution, point of sales (POS) of a store, or Internet of things (for example, a lamp, various sensors, an electric or gas meter, a sprinkler, a fire alarm, a thermostat, a streetlamp, a toaster, an exercising machine, a hot water tank, a heater, a boiler, and the like).

According to an embodiment of the present disclosure, the electronic device may include at least one of a part of furniture or a building/a structure, an electronic board, an electronic signature receiving device, a projector, and various measurement devices (for example, devices for measuring water, power, gas, radio waves, and the like). The electronic device according to various embodiments of the present disclosure may be one or a combination of one or more of the above-mentioned devices. In addition, the electronic device according to various embodiments of the present disclosure may be a flexible device. In addition, the electronic device according to various embodiments of the present disclosure is not limited to the above-mentioned devices, and may include a new electronic device accompanied by technology development.

Hereinafter, an electronic device according to various embodiments of the present disclosure will be explained with reference to the accompanying drawings. The term "user" used in the various embodiments of the present disclosure may refer to a person who uses the electronic device or a device that uses the electronic device (for example, an artificial intelligence electronic device).

FIG. 1A illustrates a network environment including an electronic device according to an embodiment of the present disclosure.

Referring to FIG. 1A, an electronic device 101 in a network environment 100 according to various embodiments of the present disclosure will be described. The electronic device 101 may include a bus 110, a processor 120, a memory 130, an input and output interface 140, a display 150, and a communication interface 160. According to an embodiment of the present disclosure, the electronic device 101 may omit at least one of the elements (for example, the bus 110, the processor 120, the memory 130, the input and output interface 140, the display 150, and the communication interface 160) or may include additional other elements.

The bus 110 may include a circuit which connects the elements (for example, the bus 110, the processor 120, the memory 130, the input and output interface 140, the display 150, and the communication interface 160) with one another and transmits communication (for example, a control message and/or data) between the above-described elements (for example, the bus 110, the processor 120, the memory 130, the input and output interface 140, the display 150, and the communication interface 160).

The processor 120 may include one or more of a CPU, an AP, or a communication processor (CP). The processor 120 may execute calculation or data processing related to control and/or communication of at least one other element.

The memory 130 may include a volatile and/or non-volatile memory. For example, the memory 130 may store instructions or data which is related to at least one other element of the electronic device 101. According to an embodiment of the present disclosure, the memory 130 may store software and/or a program. For example, the program may include a kernel 141, middleware 143, an application programming interface (API) 145, and/or an application program (or an application) 147, and the like. At least some of the kernel 141, the middleware 143, or the API 145 may be referred to as an operating system (OS).

For example, the kernel 141 may control or manage system resources (for example, the bus 110, the processor 120, the memory 130, and the like) which are used for performing operations or functions implemented in the other programs (for example, the middleware 143, the API 145, or the application 147). In addition, the kernel 141 may provide an interface for allowing the middleware 143, the API 145, or the application program 147 to access an individual element of the electronic device 101 and control or manage the system resources.

For example, the middleware 143 may serve as an intermediary to allow the API 145 or the application program 147 to communicate with the kernel 141 and exchange data with the kernel 141. In addition, the middleware 143 may perform controlling (for example, scheduling or load balancing) with respect to work requests received from the application program 147, for example, by giving priority to use the system resources of the electronic device 101 (for example, the bus 110, the processor 120, the memory 130, and the like) to at least one application of the application programs 147.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

For example, the input and output interface 140 may serve as an interface for transmitting instructions or data inputted from a user or another external device to other element(s) of the electronic device 101. In addition, the input and output interface 140 may output instructions or data received from other element(s) of the electronic device 101 to another external device.

For example, the display 150 may include a liquid crystal display (LCD), a light emitting diode (LED) display, an organic LED (OLED) display, or a microelectromechanical system (MEMS) display, or an electronic paper display. The display 150 may display various contents (for example, a text, an image, a video, an icon, a symbol, and the like) for the user. The display 150 may include a touch screen, and for example, may receive input of a touch using an electronic pen or a part of a user's body, a gesture, approach, or hovering.

For example, the communication interface 160 may establish communication between the electronic device 101 and an external device (for example, a first external electronic device 102, a second external electronic device 104, or a server 106). For example, the communication interface 160 may be connected to a network 162 via wireless communication or wire communication to communicate with the external device (for example, the second external electronic device 104, or the server 106). For example, the communication interface 160 may be connected to a network 164 via wireless communication or wire communication to communicate with the external device (for example, the second external electronic device 102).

The wireless communication may use, as a cellular communication protocol, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like. The wire communication may include at least one of a universal serial bus (USB), a high definition multimedia interface (HDMI), a recommended standard 232 (RS-232), or plain old telephone service (POTS). The network 162 may include a telecommunications network, for example, at least one of a computer network (for example, a local area network (LAN) or wide area network (WAN)), Internet, or a telephone network.

Each of the first external electronic device 102 and the second external electronic device 104 may be the same kind of electronic device as the electronic device 101 or a different kind of device. According to an embodiment of the present disclosure, the server 106 may include a group of one or more servers. According to various embodiments of the present disclosure, all or a part of the operations executed in the electronic device 101 may be executed in another electronic device or a plurality of other electronic devices (for example, the first external electronic device 102, the second external electronic device 104, or the server 106). According to an embodiment of the present disclosure, when the electronic device 101 should perform a certain function or service automatically or in response to a request, the electronic device 101 may request another device (for example, the first external electronic device 102, the second external electronic device 104, or the server 106) to perform at least some function related to the certain function or service additionally or instead of executing the function or service by itself. Another electronic device (for example, the first external electronic device 102, the second external electronic device 104, or the server 106) may execute the requested function or additional function, and transmit the result to the electronic device 101. The electronic device 101 may process the received result as it is or additionally, and provide the requested function or service. To achieve this, for example, cloud computing, distributed computing, or client-server computing technology may be used.

Figure 1B:
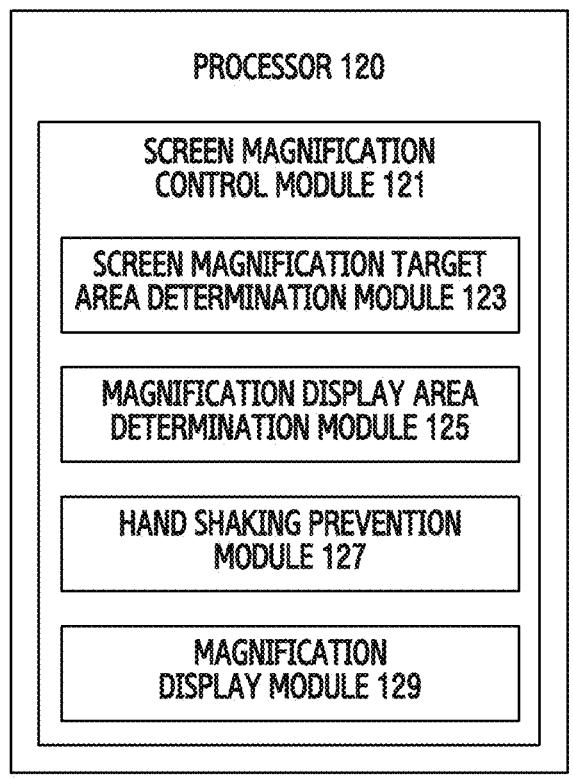
FIG. 1B illustrates a processor of an electronic device according to various embodiments of the present disclosure.

FIG. 1B illustrates a processor of an electronic device according to various embodiments of the present disclosure.

Referring to FIG. 1B, the processor 120 may include a screen magnification control module 121.

The screen magnification control module 121 may control the overall functions for providing screen magnification in the electronic device. According to an embodiment of the present disclosure, the screen magnification control module 121 may include a screen magnification target area determination module 123, a magnification display area determination module 125, a hand shaking prevention module 127, and a magnification display module 129.

The screen magnification target area determination module 123 may control to determine at least a certain area to be magnified and displayed on a screen magnification display area. According to an embodiment of the present disclosure, as shown in FIG. 6B, the screen magnification target area determination module 123 may determine a screen magnification target area based on hovering coordinates 613 which are detected through an electronic pen 611. For example, the screen magnification target area determination module 123 may determine a certain area which is formed with reference to the hovering coordinates 613 detected through the electronic pen 611 as the screen magnification target area.

The magnification display area determination module 125 may control to determine an area for magnifying and displaying the screen magnification target area which is determined by the screen magnification target area determination module 123. According to an embodiment of the present disclosure, the magnification display area determination module 125 may determine at least a certain area of a display as a magnification display area. In this case, the location of the certain area may be pre-set. According to an embodiment of the present disclosure, the magnification display area determination module 125 may determine a certain area based on coordinates where hovering is inputted as the magnification display area.

The magnification display area determination module 125 may be provided to determine a magnification ratio of the magnification display area based on a change in height between an object which generates a hovering input and a device which detects the hovering input.

The magnification display area determination module 125 may be provided to determine the size of the magnification display area based on a touch input of a user when a screen magnification event occurs.

Figure 18A:
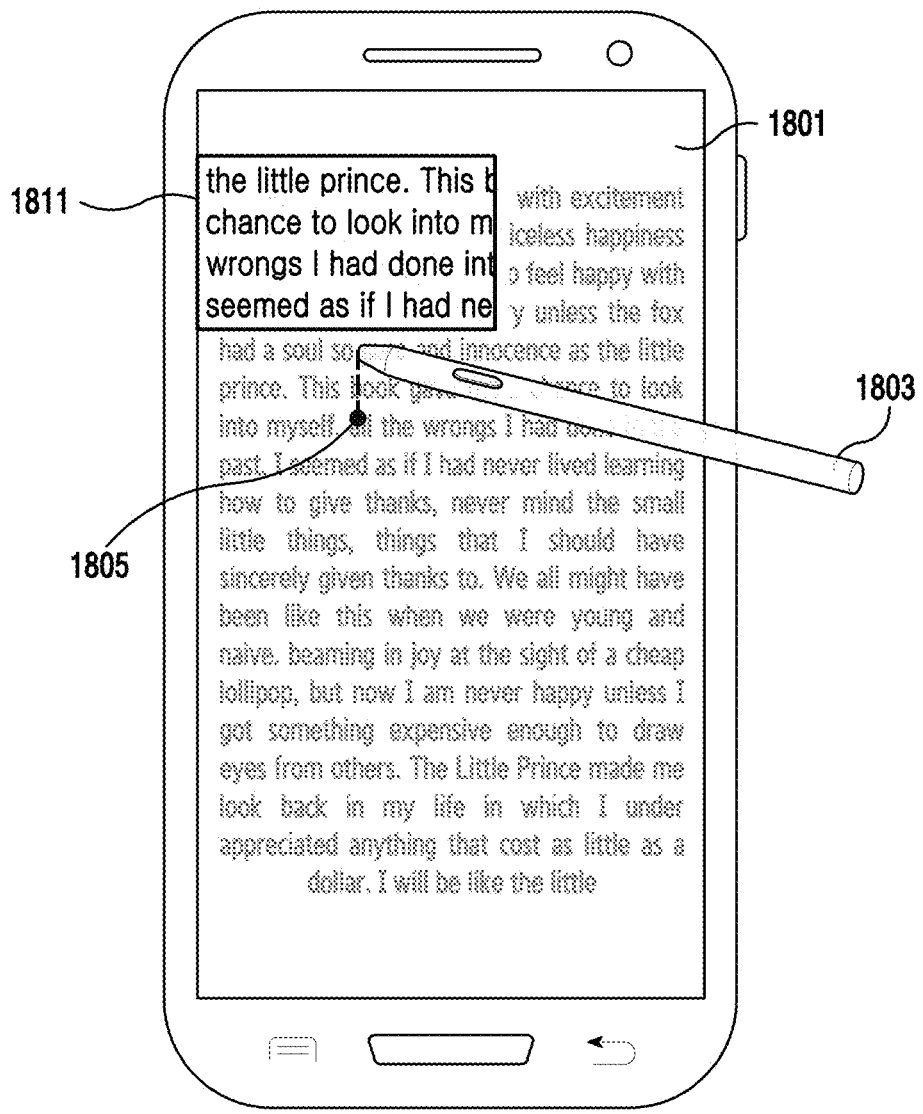
FIGS. 18A, 18B, and 18C illustrate a procedure for providing prevention of hand shaking by an electronic pen in an electronic device according to various embodiments of the present disclosure.
Figure 18B:
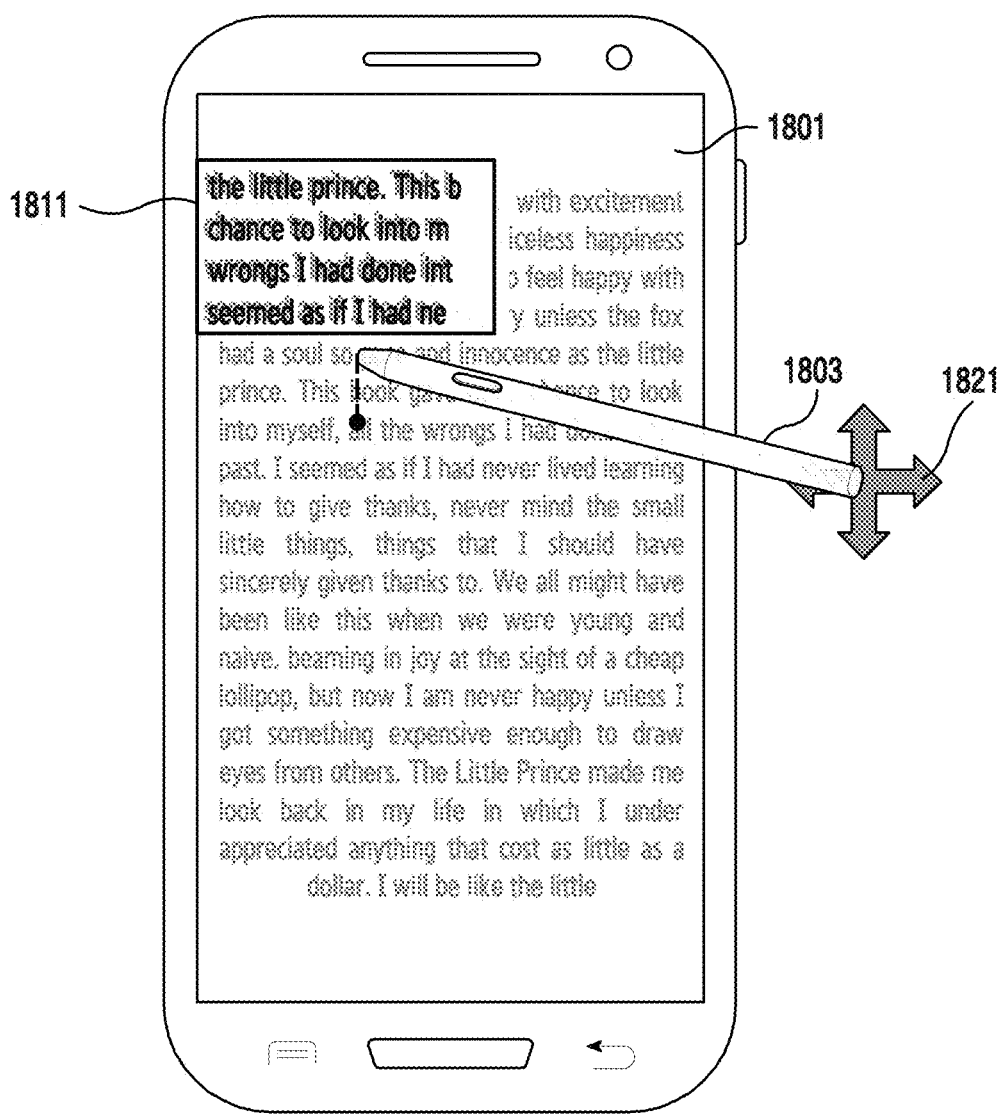
Figure 18C:
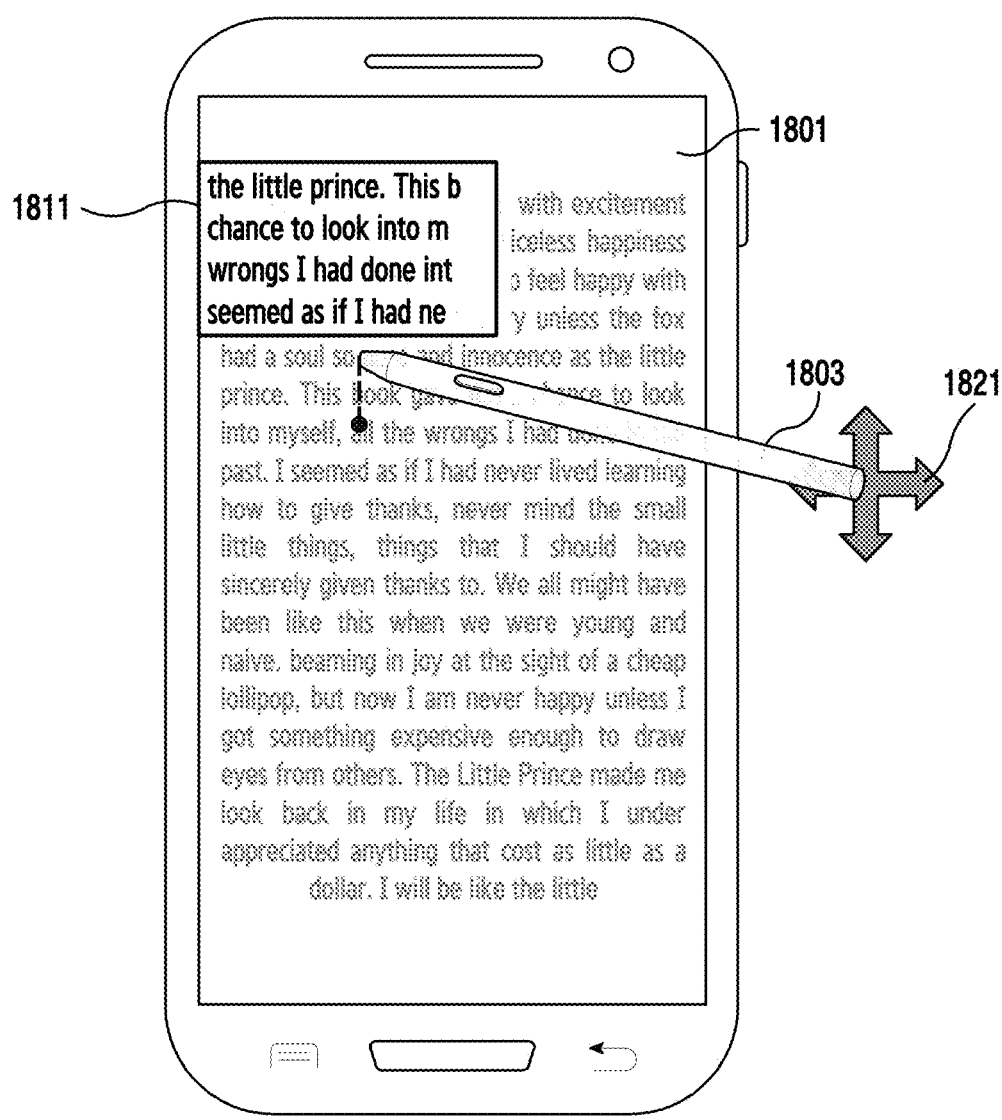

FIGS. 18A, 18B, and 18C illustrate a procedure for providing prevention of hand shaking by an electronic pen in an electronic device according to various embodiments of the present disclosure.

Referring to 18A, 18B, and 18C, the hand shaking prevention module 127 may be provided to prevent hand shaking while a screen 1801 is being magnified based on the hovering input. According to an embodiment of the present disclosure, when the location of an electronic pen 1803 is changed as shown in FIG. 18B, a screen magnification target area displayed on a magnification display area 1811 may be shaken by the change in the location of the electronic pen 1803. Accordingly, when the change in the location of the electronic pen 1803 is made within a reference range, the hand shaking prevention module 127 may recognize that the change in the location of the electronic pen 1803 is made by hand shaking, and disregard a change in coordinates 1821 of the electronic pen 1803 and prevent the shaking of the screen magnification target area displayed on the magnification display area 1811 as shown in FIG. 18C.

The magnification display module 129 may control to magnify and display the screen magnification target area determined by the screen magnification target area determination module 123 on the magnification display area determined by the magnification display area determination module 125.

Figure 2:
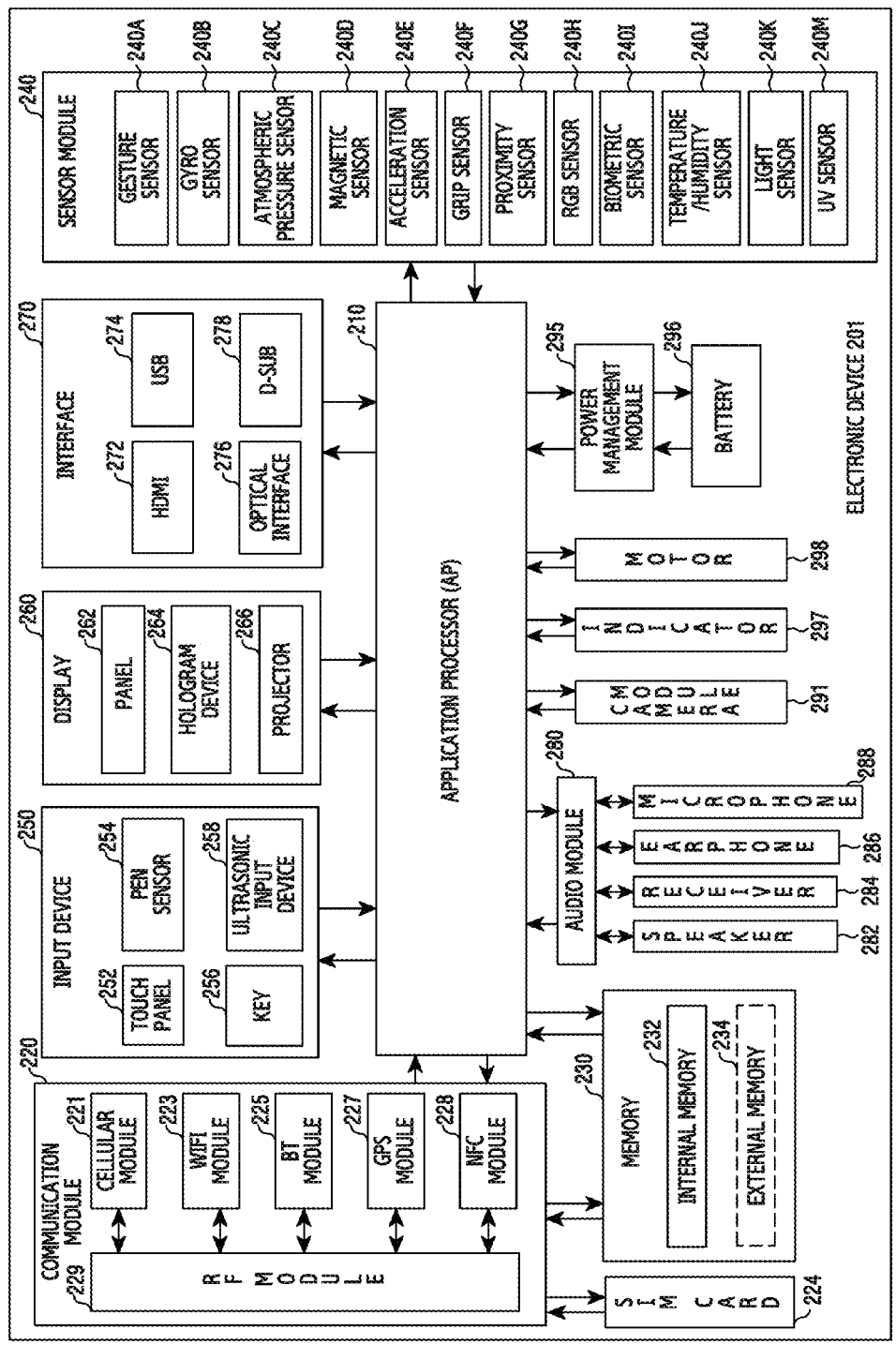
FIG. 2 illustrates a block diagram of an electronic device according to various embodiments of the present disclosure.

FIG. 2 illustrates a block diagram of an electronic device according to various embodiments of the present disclosure.

Referring to FIG. 2, an electronic device 201 may include an entirety or part of the electronic device 101 shown in FIG. 1A. The electronic device 201 may include one or more APs 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, or a motor 298.

The AP 210 may control a plurality of hardware or software elements connected to the AP 210 by driving an operating system or an application program, and may process and calculate various data. For example, the AP 210 may be implemented by using a system on chip (SoC). According to an embodiment of the present disclosure, the AP 210 may further include a graphical processing unit (GPU) and/or an image signal processor. The AP 210 may include at least part of the elements shown in FIG. 2 (for example, a cellular module 221). The AP 210 may load instructions or data received from at least one of the other elements (for example, a non-volatile memory) into a volatile memory and process the instructions or data, and may store various data in the non-volatile memory.

The communication module 220 may have a same or similar configuration as or to that of the communication interface 160 of FIG. 1A. For example, the communication module 220 may include the cellular module 221, a Wi-Fi module 223, a Bluetooth (BT) module 225, a GPS module 227, a near field communication (NFC) module 228, and a radio frequency (RF) module 229.

The cellular module 221 may provide a voice call, a video call, a text service, or an Internet service through a telecommunications network. According to an embodiment of the present disclosure, the cellular module 221 may identify and authenticate the electronic device 201 in the telecommunications network by using a SIM (for example, the SIM card 224). According to an embodiment of the present disclosure, the cellular module 221 may perform at least some of the functions provided by the AP 210. According to an embodiment of the present disclosure, the cellular module 221 may include a CP.

The Wi-Fi module 223, the BT module 225, the GPS module 227, or the NFC module 228 each may include a processor for processing data received and transmitted through a corresponding module. According to an embodiment of the present disclosure, at least some (for example, at least two) of the cellular module 221, the Wi-Fi module 223, the BT module 225, the GPS module 227, or the NFC module 228 may be included in a single integrated chip (IC) or a single IC package.

The RF module 229 may transmit and receive communication signals (for example, RF signal). For example, the RF module 229 may include a transceiver, a power amp module (PAM), a frequency filter, a low noise amplifier (LNA), an antenna, and the like. According to an embodiment of the present disclosure, at least one of the cellular module 221, the Wi-Fi module 223, the BT module 225, the GPS module 227, or the NFC module 228 may transmit and receive an RF signal through a single separate RF module.

The SIM card 224 may include a card and/or an embedded SIM including a SIM, and may include the SIM's unique identification information (for example, an integrated circuit card identifier (ICCID)) or subscriber information (for example, international mobile subscriber identity (IMSI)).

The memory 230 (for example, the memory 230) may include an internal memory 232 or an external memory 234. For example, the internal memory 232 may include at least one of a volatile memory (for example, a dynamic random access memory (DRAM), a static RAM (SRAM), a synchronous DRAM (SDRAM), and the like) and a non-volatile memory (for example, a one-time programmable read only memory (OTPROM), a PROM, an erasable PROM (EPROM), an electrically erasable PROM (EEPROM), a mask ROM, a flash ROM, a flash memory (for example, a NAND flash memory, a NOR flash memory, and the like), a hard drive, and a solid state drive (SSD).

For example, the external memory 234 may further include a flash drive, for example, compact flash (CF), secure digital (SD), micro-SD, mini-SD, extreme-digital (xD), memory stick, and the like. The external memory 234 may be functionally and/or physically connected with the electronic device 201 through various interfaces.

The sensor module 240 may measure a physical quantity or detect an operation state of the electronic device 201, and may convert measured or detected information into electric signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (for example, red, green, blue (RGB) sensor), a biosensor 240I, a temperature/humidity sensor 240J, an illumination sensor 240K, and an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), and/or a fingerprint sensor (not shown), and the like. The sensor module 240 may further include a control circuit to control at least one sensor included therein. According to an embodiment of the present disclosure, the electronic device 201 may further include a processor configured to control the sensor module 240 as a part of the AP 210 or a separate part, and may control the sensor module 240 while the AP 210 is in a sleep state.

The input device 250 may include a touch panel 252, a (digital) pen sensor 254, a key 256, or an ultrasonic input device 258. The touch panel 252 may recognize a touch input in at least one method of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 allows the electronic device 201 to detect sound waves through a microphone (for example, the microphone 288) through an input device generating ultrasonic signals.

The display 260 (for example, the display 150) may include a panel 262, a hologram device 264, or a projector 266. The panel 262 may have a same or similar configuration as or to that of the display 150 of FIG. 1A. For example, the panel 262 may be implemented to be flexible, transparent, or wearable. The panel 262 may be configured as a single module along with the touch panel 252. The hologram device 264 may show a stereoscopic image in the air using interference of light. The projector 266 may display an image by projecting light onto a screen. The screen may be located inside or outside the electronic device 201. According to an embodiment of the present disclosure, the display 260 may further include a control circuit to control the panel 262, the hologram device 264, or the projector 266.

The interface 270 may include an HDMI 272, a USB 274, an optical interface 276, or D-subminiature (D-sub) 278. The interface 270 may be included in the communication interface 160 shown in FIG. 1A. Additionally or alternatively, the interface 270 may include a mobile high definition link (MHL) interface, an SD/multimedia card (MMC) interface or infrared data association (IrDA) standard interface.

The audio module 280 may convert a sound and an electric signal bidirectionally. For example, at least some elements of the audio module 280 may be included in the input and output interface 140 shown in FIG. 1A. The audio module 280 may process sound information which is input or output through a speaker 282, a receiver 284, an earphone 286, or a microphone 288.

The camera module 291 is a device for photographing a still image and a moving image, and, according to an embodiment of the present disclosure, the camera module 291 may include one or more image sensors (for example, a front surface sensor or a rear surface sensor), a lens (not shown), an image signal processor (ISP) (not shown), or a flash (memory) (for example, an LED or a xenon lamp).

The power management module 295 may manage power of the electronic device 201. Although not shown, the power management module 295 may include a power management IC (PMIC), a charging IC, or a battery or fuel gage. For example, the PMIC may have a wire charging method and/or a wireless charging method. The wireless charging method may include a magnetic resonance method, a magnetic induction method, or an electromagnetic wave method, and an additional circuit for charging wirelessly, for example, a circuit, such as a coil loop, a resonant circuit, a rectifier, and the like, may be added. For example, the battery gage may measure a remaining battery life of the battery 296, a voltage, a current, or temperature during charging. The battery 296 may include a rechargeable battery and/or a solar battery.

The indicator 297 may display a specific state of the electronic device 201 or a part of the state of the electronic device (for example, the AP 210), for example, a booting state, a message state, or a charging state. The motor 298 may convert an electric signal into a mechanical vibration, and cause a vibration or haptic effect. Although not shown, the electronic device 201 may include a processing device (for example, a GPU) for supporting a mobile TV. The processing device for supporting the mobile TV may process media data according to standards, such as digital multimedia broadcasting (DMB), digital video broadcasting (DVB), media flow, and the like.

Each of the above-described elements of the electronic device according to various embodiments of the present disclosure may be comprised of one or more components, and the names of the elements may vary according to the kind of the electronic device. The electronic device according to various embodiments of the present disclosure may include at least one of the above-described elements, and some of the elements may be omitted or an additional element may be further included. In addition, some of the elements of the electronic device according to various embodiments of the present disclosure may be combined into a single entity, and may perform the same functions as those of the elements before being combined.

Figure 3:
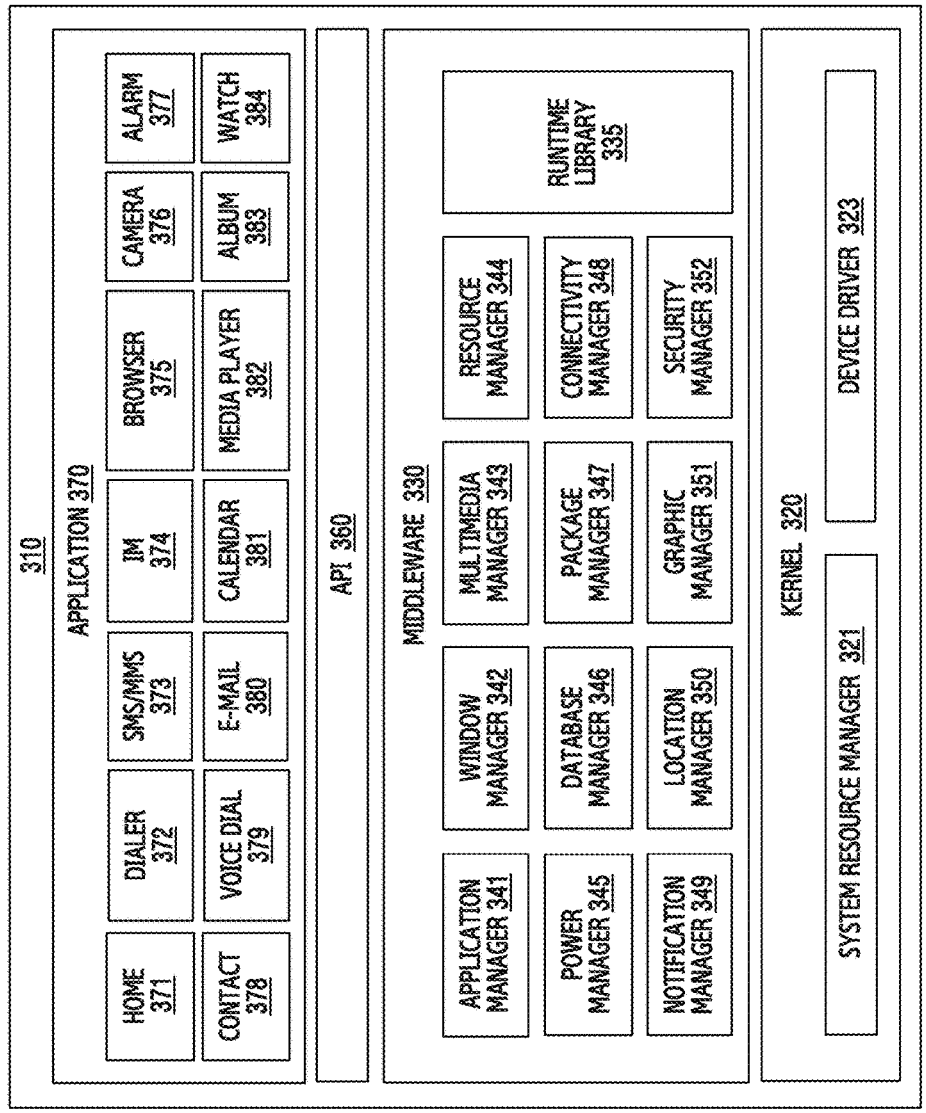
FIG. 3 illustrates a block diagram of a program module according to various embodiments of the present disclosure.

FIG. 3 illustrates a block diagram of a program module according to various embodiments of the present disclosure.

Referring to FIG. 3, according to an embodiment of the present disclosure, a program module 310 (for example, the program) may include an OS for controlling resources related to an electronic device (for example, the electronic device 101) and/or various applications (for example, the application 147) driven on the OS. For example, the OS may be Android, iOS, Windows, Symbian, Tizen, Bada, and the like.

The program module 310 may include a kernel 320, middleware 330, an API 360, and/or an application 370. At least part of the program module 310 may be preloaded on the electronic device or downloaded from a server (for example, the server 106).

The kernel 320 (for example, the kernel 141 of FIG. 1A) may include a system resource manager 321 or a device driver 323. The system resource manager 321 may control, allocate or collect the system resources. According to an embodiment of the present disclosure, the system resource manager 321 may include a process manager, a memory manager, a file system manager, and the like. The device driver 323 may include, for example, a display driver, a camera driver, a BT driver, a shared memory driver, a USB driver, a keypad driver, a Wi-Fi driver, an audio driver, an inter-process communication (IPC) driver, and the like.

The middleware 330 may provide functions which are commonly required by the application 370 or may provide various functions to the application 370 through the API 360 such that the application 370 can effectively use limited system resources in the electronic device. According to an embodiment of the present disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the applications 370. The window manager 342 may manage graphical user interface (GUI) resources used in a screen. The multimedia manager 343 grasps a format necessary for reproducing various media files and encodes or decodes the media files by using a codec suited to the corresponding format. The resource manager 344 may manage resources, such as a source code, a memory, a storage space, and the like, of at least one of the applications 370.

The power manager 345 operates along with a basic input/output system (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connection of Wi-Fi, BT, and the like. The notification manager 349 may display or notify an event, such as a message arrived, an appointment, a notification of proximity, and the like, in such a manner that the event does not hinder the user. The location manager 350 may manage location information of the electronic device. The graphic manager 350 may manage a graphic effect to be provided to the user or a relevant user interface. The security manager 352 may provide an overall security function necessary for system security or user authentication. According to an embodiment of the present disclosure, when the electronic device (for example, the electronic device 101) is equipped with a telephony function, the middleware 330 may further include a telephony manager to manage a speech or video telephony function of the electronic device.

The middleware 330 may include a middleware module to form a combination of the various functions of the above-described elements. The middleware 330 may provide a module which is customized according to a kind of OS to provide a distinct function. The middleware 330 may dynamically delete some of the existing elements or may add new elements.

The API 360 (for example, the API 145) is a set of API programming functions and may be provided as a different configuration according to an OS. For example, in the case of Android or iOS, a single API set may be provided for each platform. In the case of Tizen, at least two API sets may be provided.

The application 370 (for example, the application 147) may include one or more applications for providing functions, such as a home 371, a dialer 372, a short message service (SMS)/multimedia messaging service (MMS) 373, an instant message (IM) 374, a browser 375, a camera 376, an alarm 377, contacts 378, a voice dial 379, an email 380, a calendar 381, a media player 382, an album 383, or a clock 384, or health care (for example, measuring exercise or a blood sugar), or providing environment information (for example, information on atmospheric pressure, humidity, or temperature).

According to an embodiment of the present disclosure, the application 370 may include an application for supporting information exchange between the electronic device (for example, the electronic device 101) and an external electronic device (for example, the first external electronic device 102 and the second external electronic device 104) (hereinafter, referred to as an "information exchange application" for the convenience of explanation). The information exchange application may include a notification relay application for relaying specific information to an external electronic device or a device management application for managing an external electronic device.

For example, the notification relay application may include a function of relaying notification information generated by other applications of the electronic device (for example, the SMS/MMS application, the email application, the health care application, the environment information application, and the like) to an external electronic device (for example, the first external electronic device 102 and the second external electronic device 104). In addition, the notification relay application may receive notification information from an external electronic device and may relay the same to the user. For example, the device management application may manage (for example, install, delete or update) at least one function of an external electronic device (for example, the second external electronic device 104) communicating with the electronic device (for example, turning on/off an external electronic device (or some parts) or adjusting brightness (or resolution) of a display), an application operating in the external electronic device or a service provided by the external electronic device (for example, a calling service or a message service).

According to an embodiment of the present disclosure, the application 370 may include an application (for example, a health care application) which is specified according to the attribute (for example, an attribute of an electronic device indicating a kind of electronic device, for example, a mobile medical device) of the external electronic device (for example, the first external electronic device 102 and the second external electronic device 104). According to an embodiment of the present disclosure, the application 370 may include an application received from an external electronic device (for example, the server 106 or the first external electronic device 102 and the second external electronic device 104). According to an embodiment of the present disclosure, the application 370 may include a preloaded application or a third party application which may be downloaded from a server. The names of the elements of the program module 310 according to the illustrated embodiments of the present disclosure may be changed according to a kind of OS.

According to various embodiments of the present disclosure, at least part of the program module 310 may implemented by software, firmware, hardware, or a combination of at least two of them. At least part of the program module 310 may be implemented (for example, executed) by a processor (for example, the AP 210). At least part of the program module 310 may include, for example, a module, a program, a routine, sets of instructions, a process, and the like, to perform one or more functions.

According to various embodiments of the present disclosure, an electronic device includes a display, and a processor which displays a screen on the display, detects a screen magnification event, determines a target area on the screen based on the screen magnification event, and magnifies the target area on the screen.

According to various embodiments of the present disclosure, the electronic device may further include a sensor which detects a hovering input on the display, and the processor may detect the hovering input as the screen magnification event.

According to various embodiments of the present disclosure, the processor may control to determine the target area based on coordinates of the hovering input on the screen.

According to various embodiments of the present disclosure, the processor may control to determine a magnification ratio of the target area based on a height of the hovering input from the screen, and adjust the target area according to the magnification ratio.

According to various embodiments of the present disclosure, when the height of the hovering input from the screen is changed, the processor may control to change the magnification ratio of the target area.

According to various embodiments of the present disclosure, the processor may control to display the target area on a display area on a certain location of the screen, change a size of the display area based on a gesture on the display area, and change the magnification ratio of the target area according to the size of the display area.

According to various embodiments of the present disclosure, the processor may control to display a virtual input pad on the screen, and detect the screen magnification event on the virtual input pad.

According to various embodiments of the present disclosure, the processor may determine the target area in a circular shape, an oval shape, a polygonal shape, or a water drop shape.

According to various embodiments of the present disclosure, the processor may control to apply a water drop effect or a magnifying glass effect to the target area.

According to various embodiments of the present disclosure, the processor may control to detect a change in coordinates of the hovering input on the screen, when the change in the coordinates is less than or equal to a reference value, disregard the change in the coordinates, and, when the change in the coordinates exceeds the reference value, move the target area on the screen according to the change in the coordinates.

Figure 4:
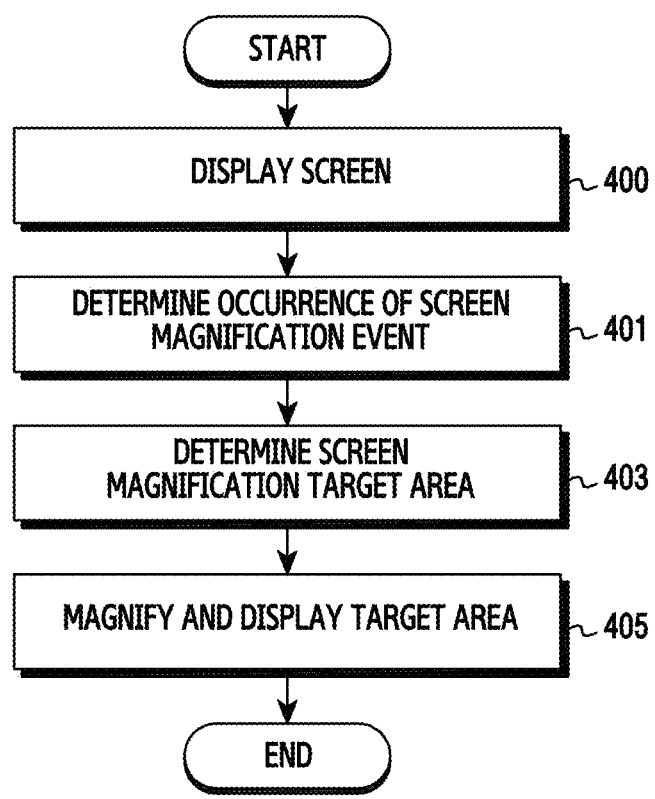
FIG. 4 is a flowchart illustrating a procedure for providing screen magnification in an electronic device according to various embodiments of the present disclosure.

FIG. 4 is a flowchart illustrating a procedure for providing screen magnification in an electronic device according to various embodiments of the present disclosure.

FIGS. 6A, 6B, 6C, 6D, and 6E illustrate a procedure for providing screen magnification based on a hovering input in an electronic device according to various embodiments of the present disclosure.

Figure 6A:
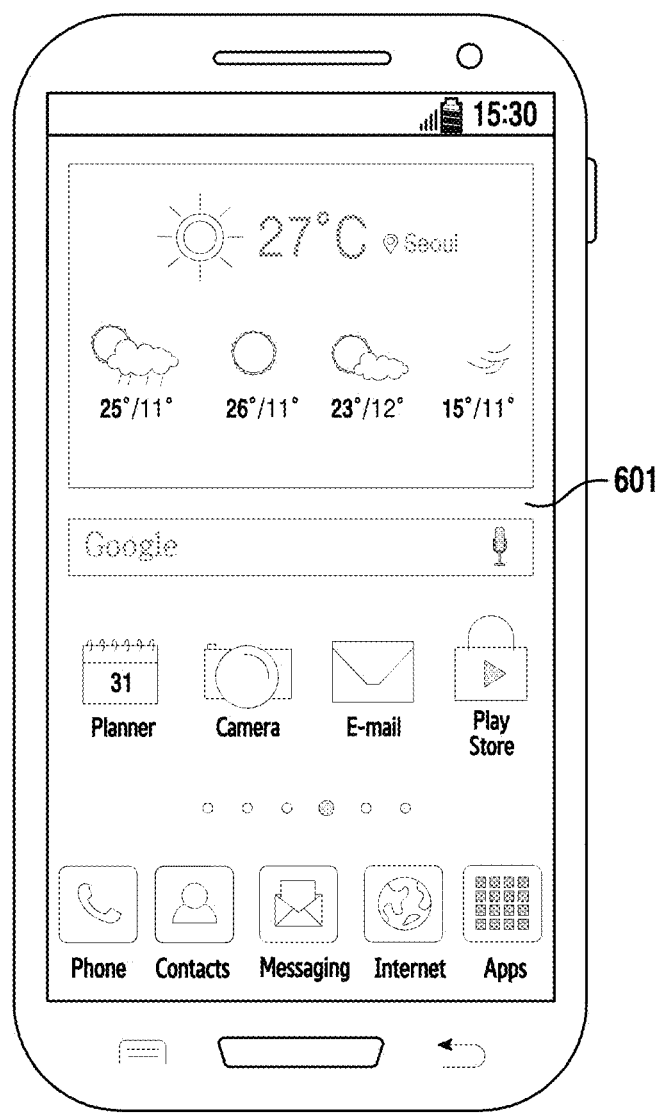
FIGS. 6A, 6B, 6C, 6D, and 6E illustrate a procedure for providing screen magnification based on a hovering input in an electronic device according to various embodiments of the present disclosure.
Figure 6B:
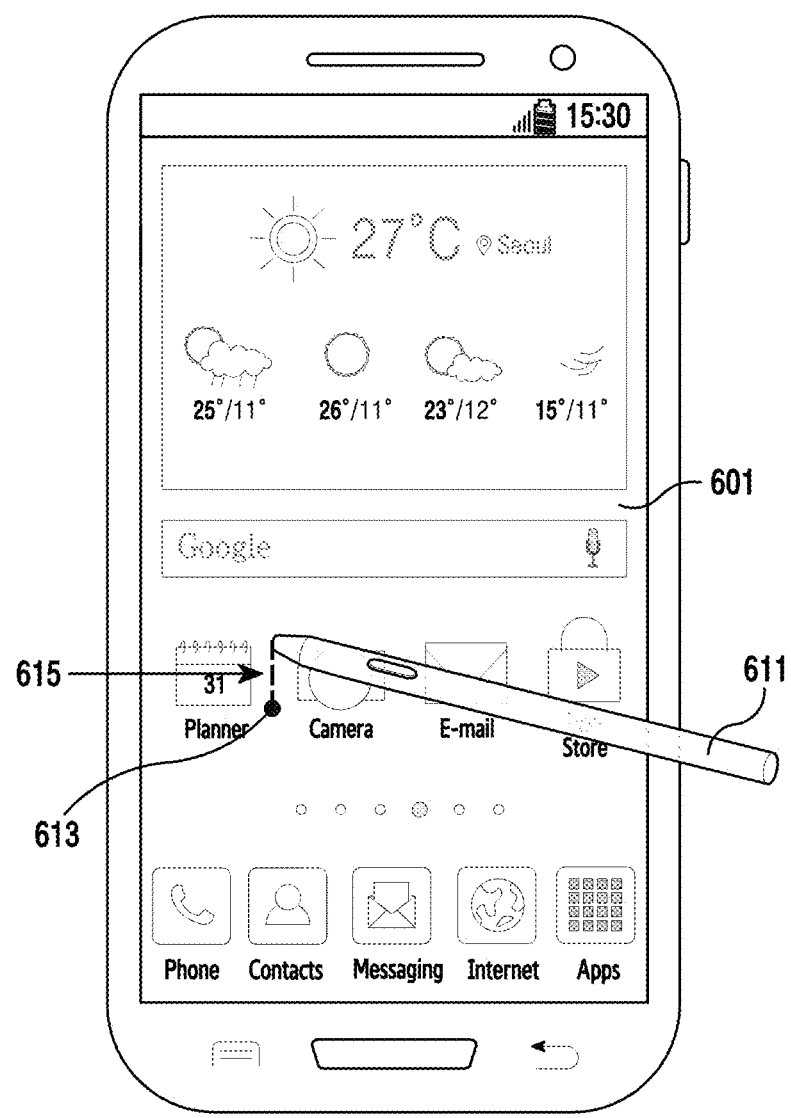

Referring to FIGS. 4 and 6A, in operation 400, the electronic device displays a screen. According to an embodiment of the present disclosure, the electronic device may display the screen through a touch screen 601 as shown in FIG. 6A.

In operation 401, the electronic device may determine whether a screen magnification event occurs. According to an embodiment of the present disclosure, the electronic device may detect a hovering input by an electronic pen or a finger through the touch screen 601.

Referring to FIGS. 4 and 6B, in operation 403, the electronic device may determine a screen magnification target area on the screen based on the screen magnification event. According to an embodiment, the electronic device may determine the screen magnification target area based on hovering coordinates 613 detected through an electronic pen 611 as shown in FIG. 6B. For example, the electronic device may determine a certain area formed with reference to the hovering coordinates 613 detected through the electronic pen 611 as the screen magnification target area.

Figure 6C:
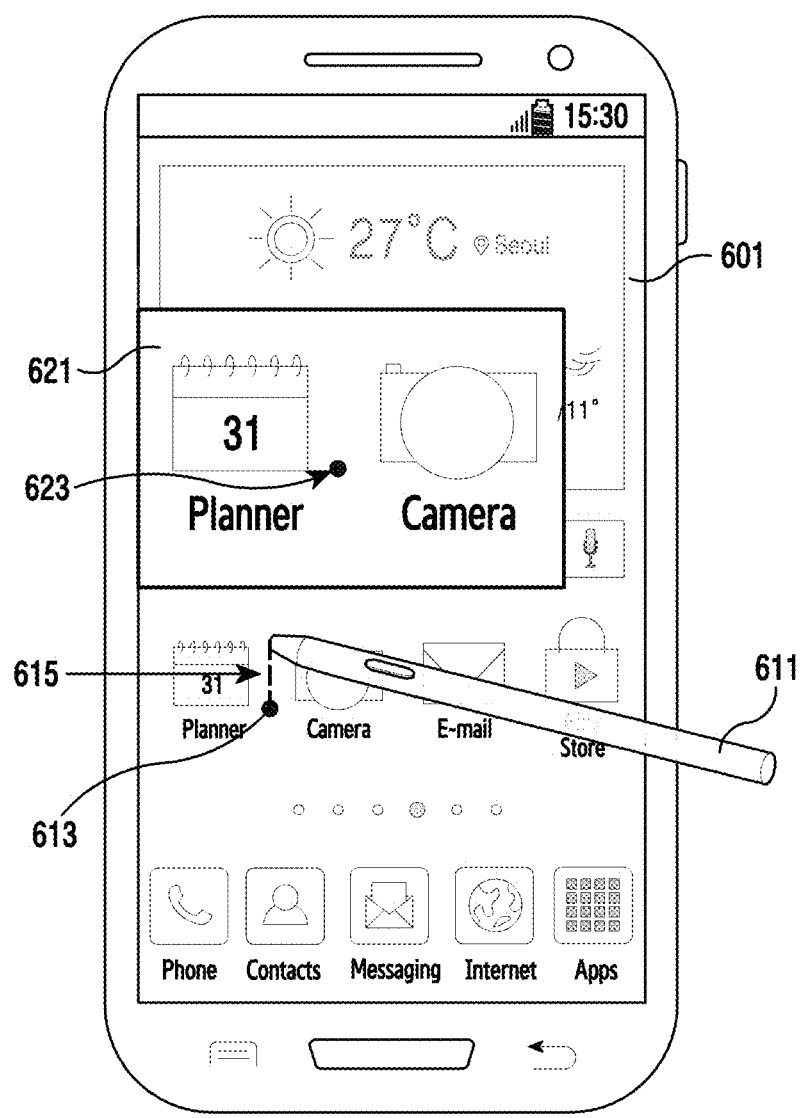

Referring to FIGS. 4 and 6C, in operation 405, the electronic device may magnify and display the target area. According to an embodiment of the present disclosure, as shown in FIG. 6C, the electronic device may magnify and display the screen magnification target area 623 determined based on the hovering coordinates 613 detected through the electronic pen 611 on a magnification display area 621. For example, the target area 623 and the display area 621 may overlap each other or may be distanced from each other.

Figure 6D:
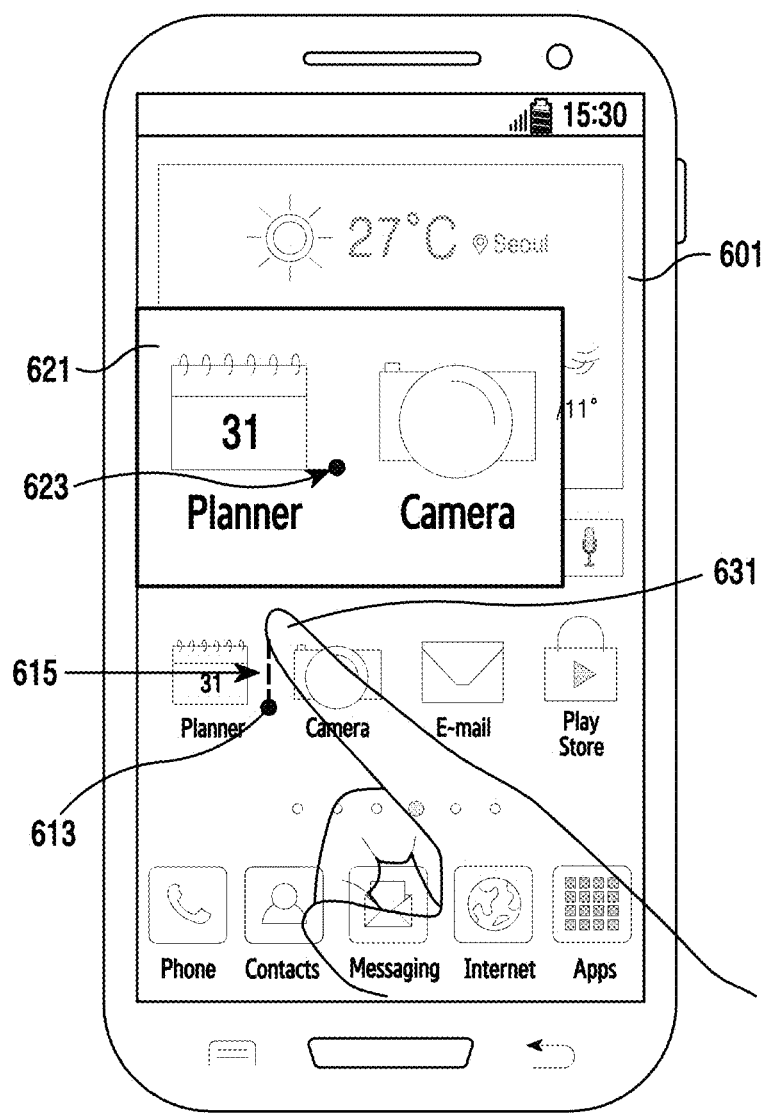

Referring to FIG. 6D, according to an embodiment of the present disclosure, the electronic device may magnify and display the screen magnification target area 623 determined based on the hovering coordinates 613 detected through a finger 631 on the magnification display area 621.

Figure 6E:
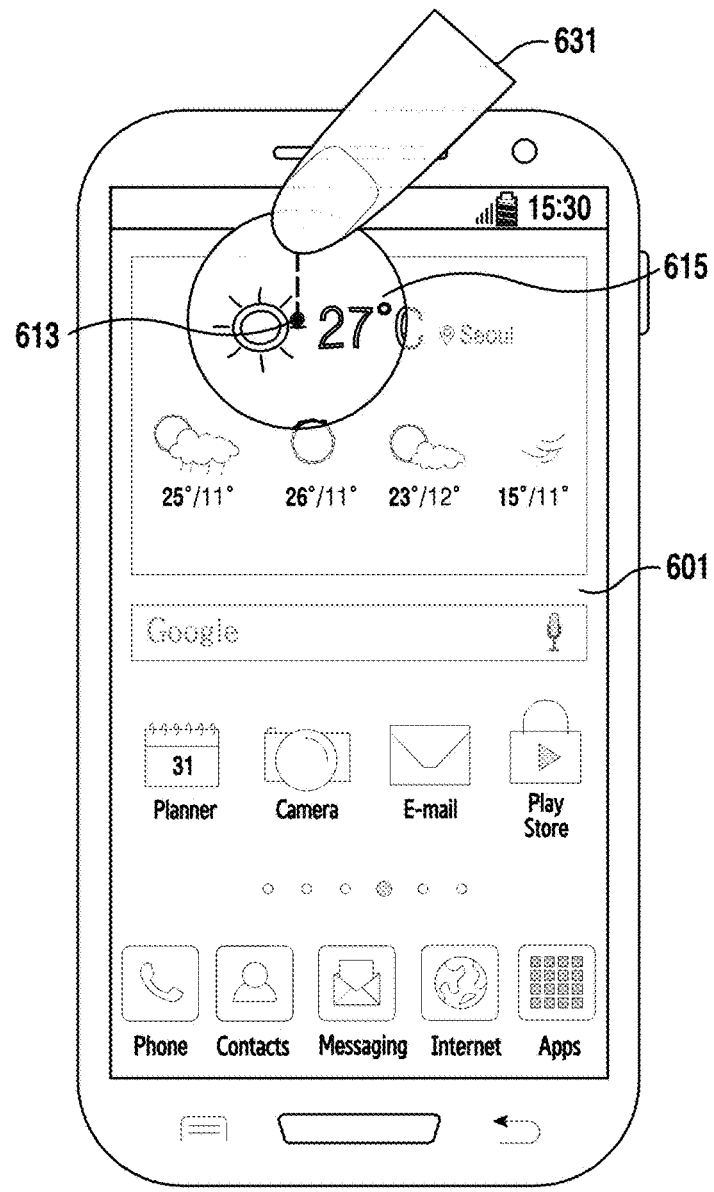

Referring to FIG. 6E, according to an embodiment of the present disclosure, the electronic device may magnify and display a screen magnification target area determined based on hovering coordinates 613 detected through the finger 631.

Figure 5:
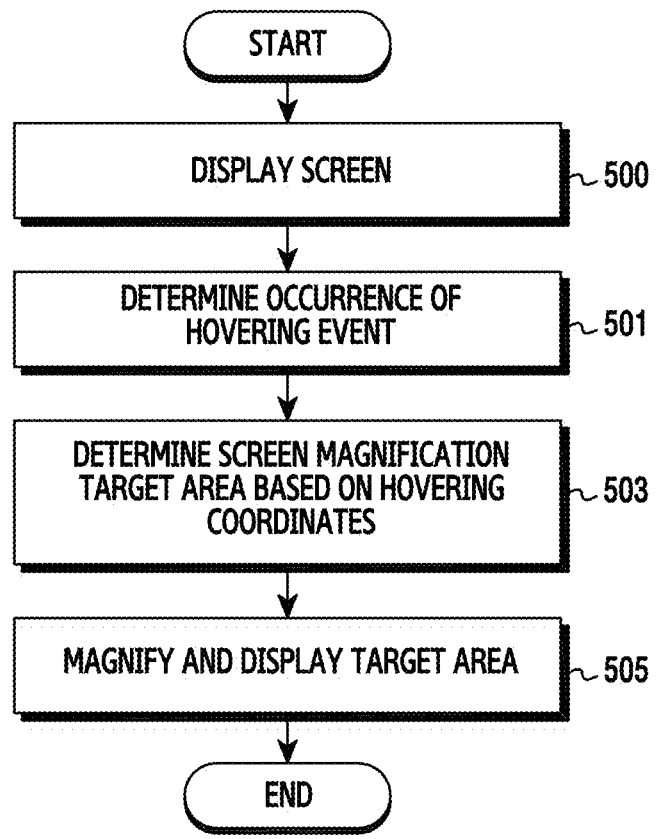
FIG. 5 is a flowchart illustrating a procedure for providing screen magnification based on a hovering input in an electronic device according to various embodiments of the present disclosure.

FIG. 5 is a flowchart illustrating a procedure for providing screen magnification based on a hovering input in an electronic device according to various embodiments of the present disclosure.

Referring to FIG. 5, in operation 500, the electronic device may display a screen. According to an embodiment of the present disclosure, the electronic device may display the screen through the touch screen 601 as shown in FIG. 6A.

In operation 501, the electronic device may determine whether a hovering input occurs. According to an embodiment of the present disclosure, the electronic device may detect a hovering input by an electronic pen or a finger through the touch screen 601. The electronic device may detect the hovering input as a screen magnification event. For example, in response to the hovering input, the electronic device may detect hovering coordinates and height to the hovering on the touch screen 601.

According to an embodiment of the present disclosure, when an input by the electronic pen 611 occurs at a certain distance 615 from the touch screen 601 as shown in FIG. 6B, the electronic device may recognize that hovering occurs.

According to an embodiment of the present disclosure, the electronic device detects the hovering input by the electronic pen or finger. However, this should not be considered as limiting, and any device that enables the electronic device to detect a hovering input may be used.

According to an embodiment of the present disclosure, the electronic device may determine whether the hovering input by the electronic pen or finger occurs through the touch screen 601 or a separate detection device other than the touch screen 601.

According to an embodiment of the present disclosure, different devices may detect the hovering input by the electronic pen or finger in the electronic device.

In operation 503, the electronic device may determine a screen magnification target area based on hovering coordinates on the screen in response to the hovering input.

According to an embodiment of the present disclosure, the electronic device may determine the screen magnification target area based on the hovering coordinates 613 detected through the electronic pen 611 as shown in FIG. 6B. For example, the electronic device may determine a certain area formed with reference to the hovering coordinates 613 detected through the electronic pen 611 as the screen magnification target area.

In operation 505, the electronic device may magnify and display the target area. According to an embodiment of the present disclosure, as shown in FIG. 6C, the electronic device may magnify and display the screen magnification target area determined based on the hovering coordinates 613 detected through the electronic pen 611 on the magnification display area 621. For example, the target area and the display area 621 may overlap each other or may be distanced from each other.

According to an embodiment of the present disclosure, as shown in FIG. 6D, the electronic device may magnify and display the screen magnification target area determined based on the hovering coordinates 613 detected through the finger 631 on the magnification display area 621.

According to an embodiment of the present disclosure, as shown in FIG. 6E, the electronic device may magnify and display the screen magnification target area determined based on the hovering coordinates 613 detected through the finger 631.

According to an embodiment of the present disclosure, the electronic device may display the hovering coordinates 613 detected through the electronic pen 611 on the magnification display area 621. However, this should not be considered as limiting. The electronic device may not display the hovering coordinates 613 detected through the electronic pen 611 on the magnification display area.

Figure 7:
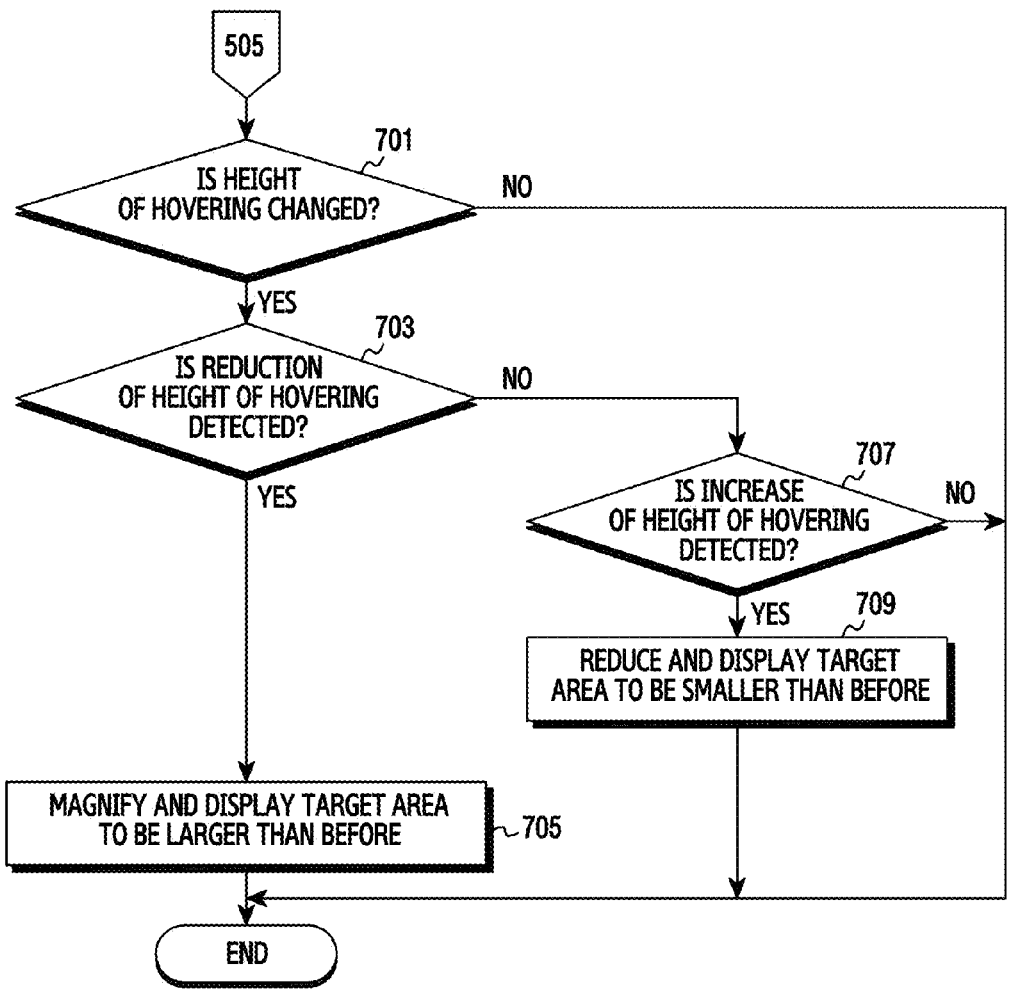
FIG. 7 is a flowchart illustrating a procedure for determining a screen magnification ratio in an electronic device according to various embodiments of the present disclosure.

FIG. 7 is a flowchart illustrating a procedure for determining a screen magnification ratio in an electronic device according to various embodiments of the present disclosure.

The procedure in the embodiment of FIG. 7 may include operations after operation 505 of magnifying and displaying the target area in FIG. 5.

Referring to FIG. 7, in operation 701, the electronic device may determine whether height of the hovering is changed. According to an embodiment of the present disclosure, when the input by the electronic device 611 occurs at the certain distance 615 from the touch screen 601 as shown in FIG. 6B, the electronic device may recognize that hovering occurs. In this case, the electronic device may determine whether the certain distance 615 between the touch screen 601 and the electronic pen 611 is changed. For example, the electronic device may determine whether the certain distance 615 between the touch screen 601 and the electronic pen 611 is reduced or increased.

FIGS. 8A, 8B, 8C, and 8D illustrate a procedure for determining a screen magnification ratio in an electronic device according to various embodiments of the present disclosure.

Figure 8A:
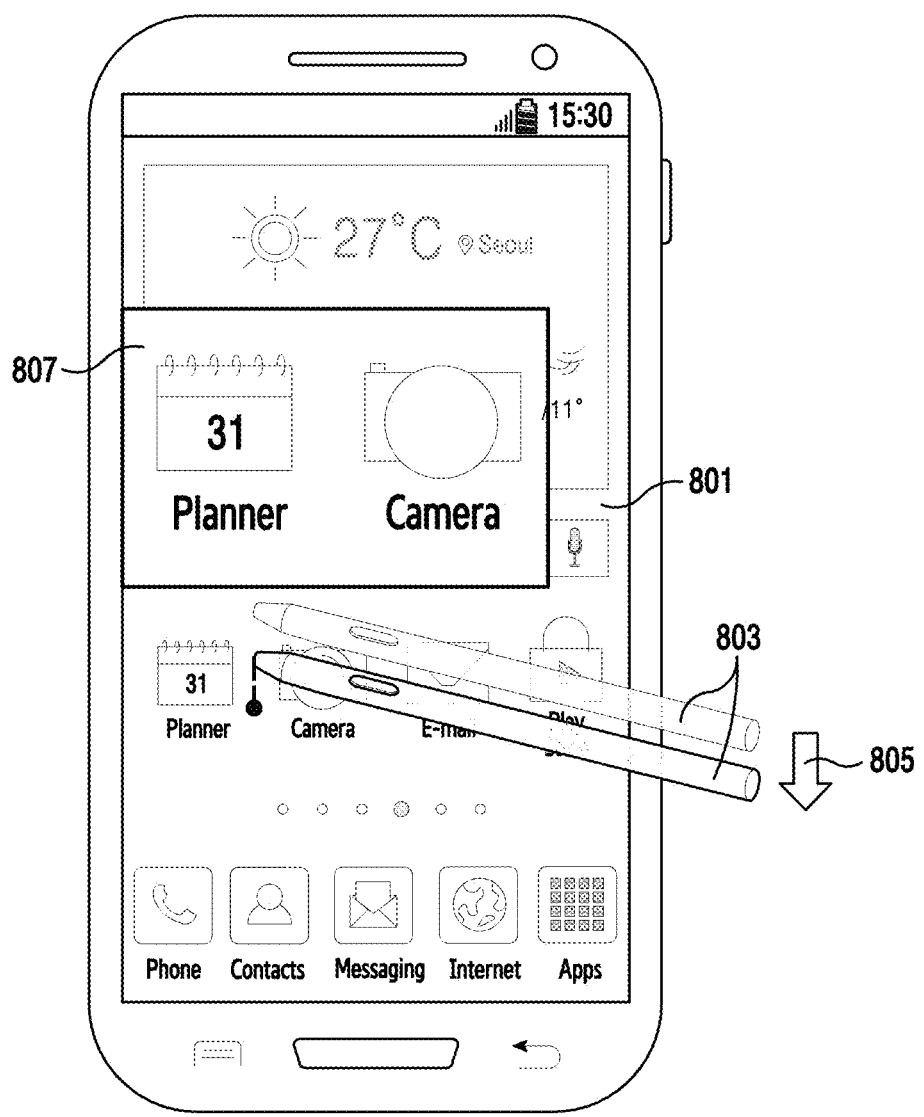
FIGS. 8A, 8B, 8C, and 8D illustrate a procedure for determining a screen magnification ratio in an electronic device according to various embodiments of the present disclosure.

Referring to FIGS. 7 and 8A, in operation 703, the electronic device may determine whether the height of the hovering is reduced. According to an embodiment of the present disclosure, as shown in FIG. 8A, the electronic device may determine whether a distance between an electronic pen 803 and a touch screen 801 is reduced in operation 805, while magnifying and displaying a screen magnification target area on a magnification display area 807.

Figure 8B:
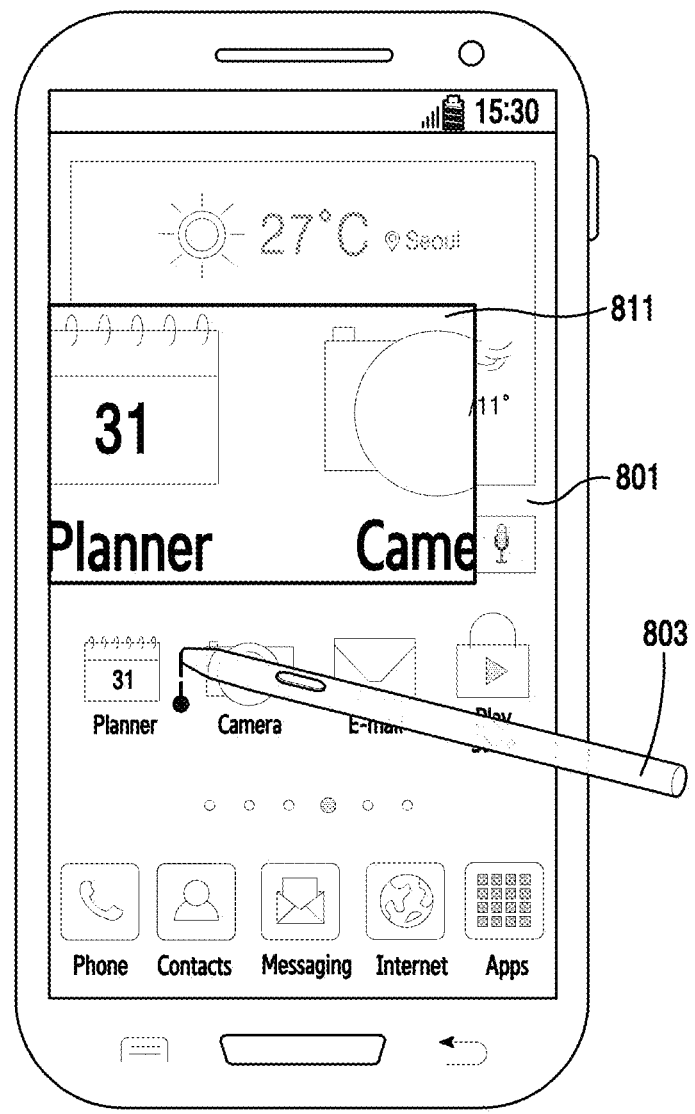

Referring to FIGS. 7 and 8B, in operation 705, the electronic device may further magnify and display the target area to be larger than before based on the reduction of the height of the hovering. According to an embodiment of the present disclosure, when the electronic device detects the distance between the electronic pen 803 and the touch screen 801 being reduced in operation 805 while magnifying and displaying the screen magnification target area on the magnification display area 807 as shown in FIG. 8A, the electronic device may further magnify and display the magnification target area to be larger than before on the magnification display area as shown in FIG. 8B in operation 811.

Figure 8C:
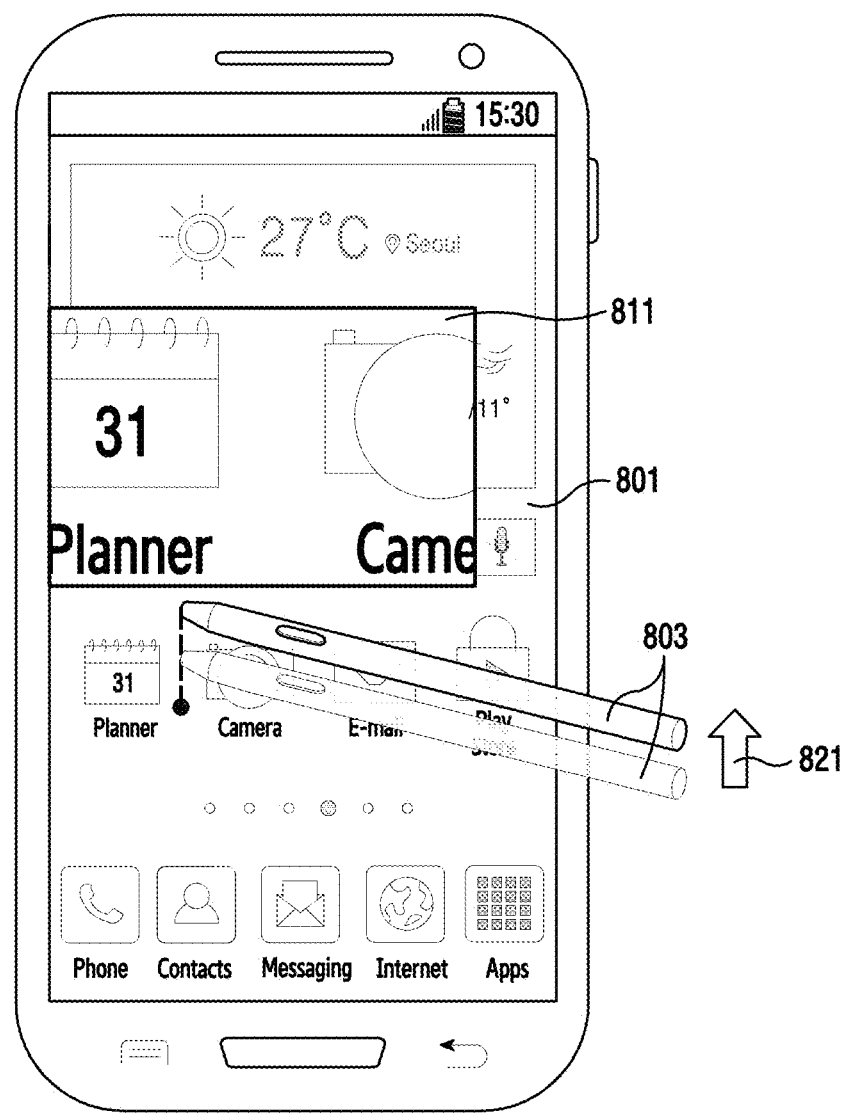

Referring to FIGS. 7 and 8C, in operation 707, the electronic device may determine whether the height of the hovering increases. According to an embodiment of the present disclosure, as shown in FIG. 8C, the electronic device may determine whether the distance between the electronic pen 803 and the touch screen 801 increases in operation 821, while magnifying and displaying the screen magnification target area on the magnification display area 811.

Figure 8D:
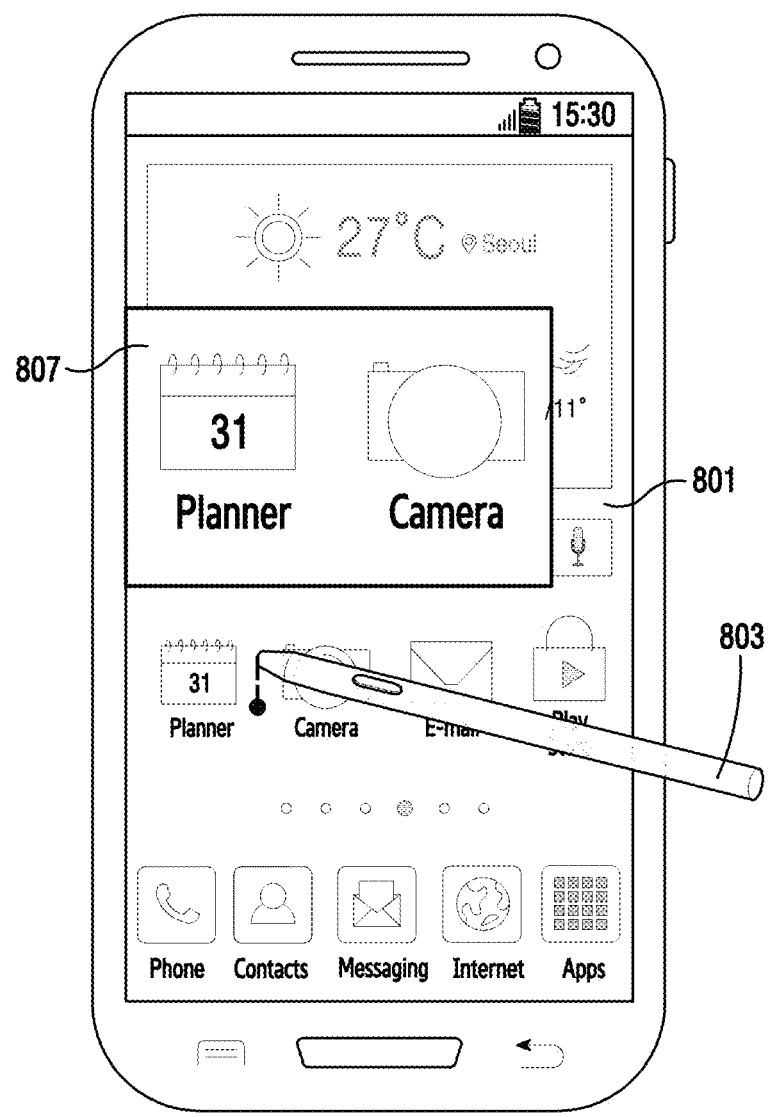

Referring to FIGS. 7 and 8D, in operation 709, the electronic device may reduce and display the target area to be smaller than before based on the increase of the height of the hovering. According to an embodiment of the present disclosure, when the electronic device detects the distance between the electronic pen 803 and the touch screen 801 increasing in operation 821 while magnifying and displaying the screen magnification target area on the magnification display area 811 as shown in FIG. 8C, the electronic device may reduce and display the magnification target area to be smaller than before on the magnification display area in operation 807 as shown in FIG. 8D.

According to an embodiment of the present disclosure, when the electronic device detects the distance between the electronic pen and the touch screen being reduced, the electronic device may reduce and display the magnification target area to be smaller than before on the magnification display area.

According to an embodiment of the present disclosure, when the electronic device detects the distance between the electronic pen and the touch screen increasing, the electronic device may further magnify and display the magnification target area to be larger than before on the magnification display area.

Figure 9:
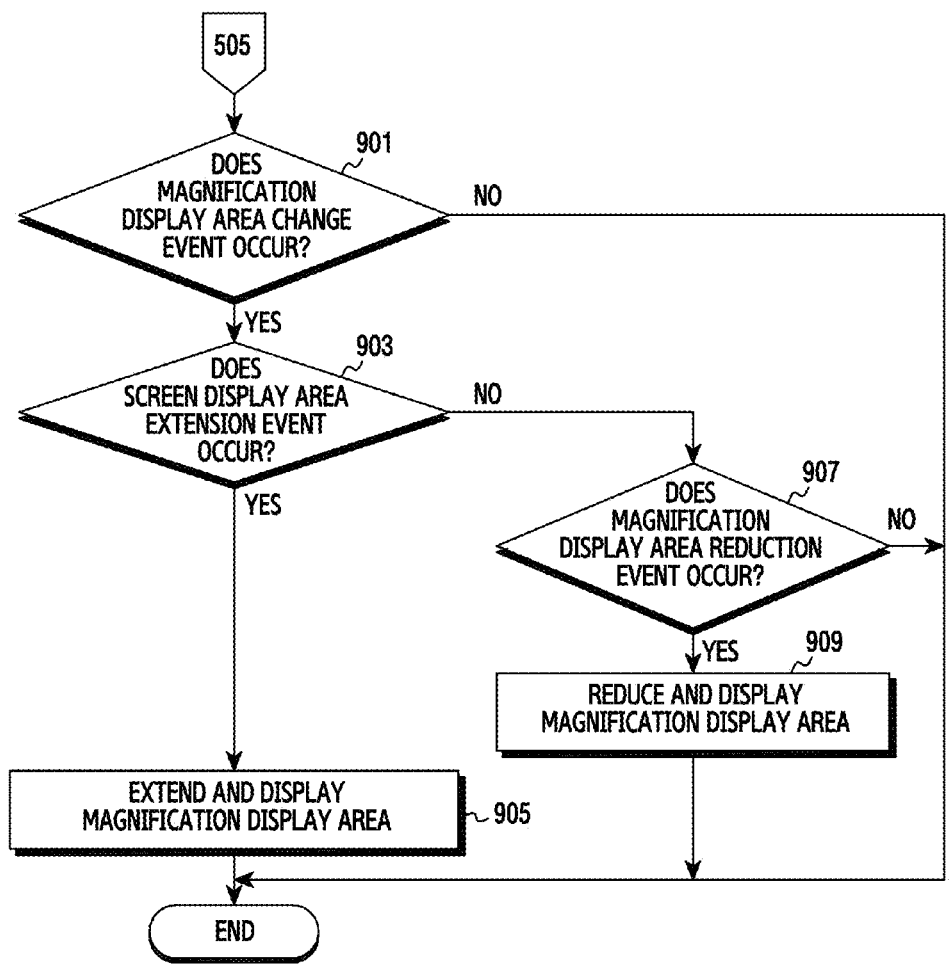
FIG. 9 is a flowchart illustrating a procedure for determining a size of a magnification display area in an electronic device according to various embodiments of the present disclosure.

FIG. 9 is a flowchart illustrating a procedure for determining a size of a magnification display area in an electronic device according to various embodiments of the present disclosure.

The procedure in the embodiment of FIG. 9 may include operations after operation 505 of magnifying and displaying the target area in FIG. 5.

Figure 10A:
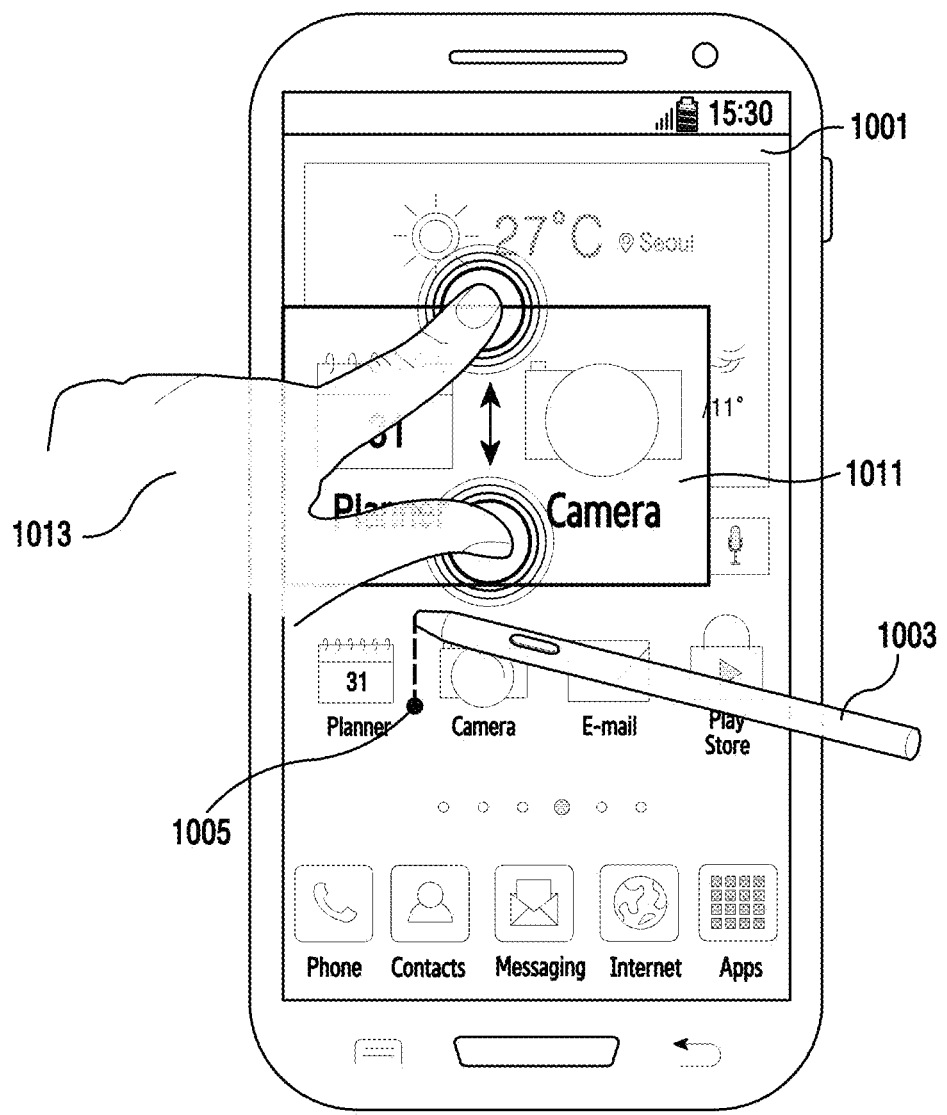
FIGS. 10A, 10B, 10C, and 10D illustrate a procedure for determining a size of a magnification display area in an electronic device according to various embodiments of the present disclosure.
Figure 10B:
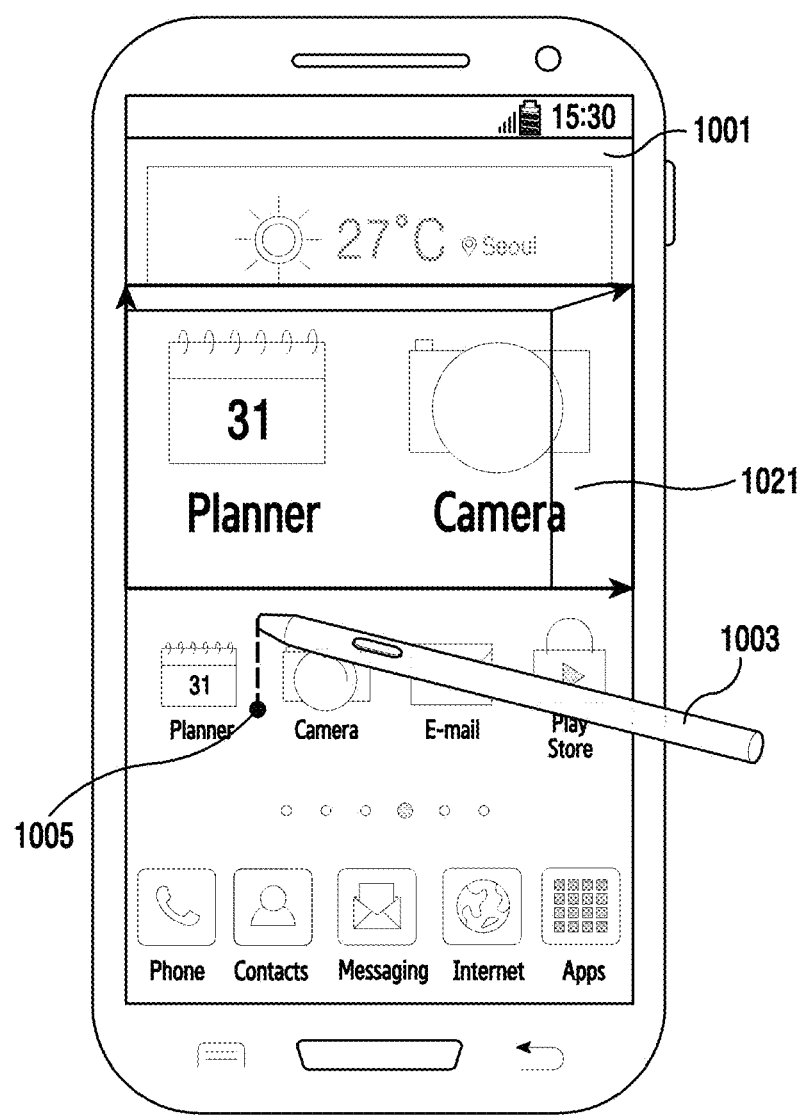
Figure 10C:
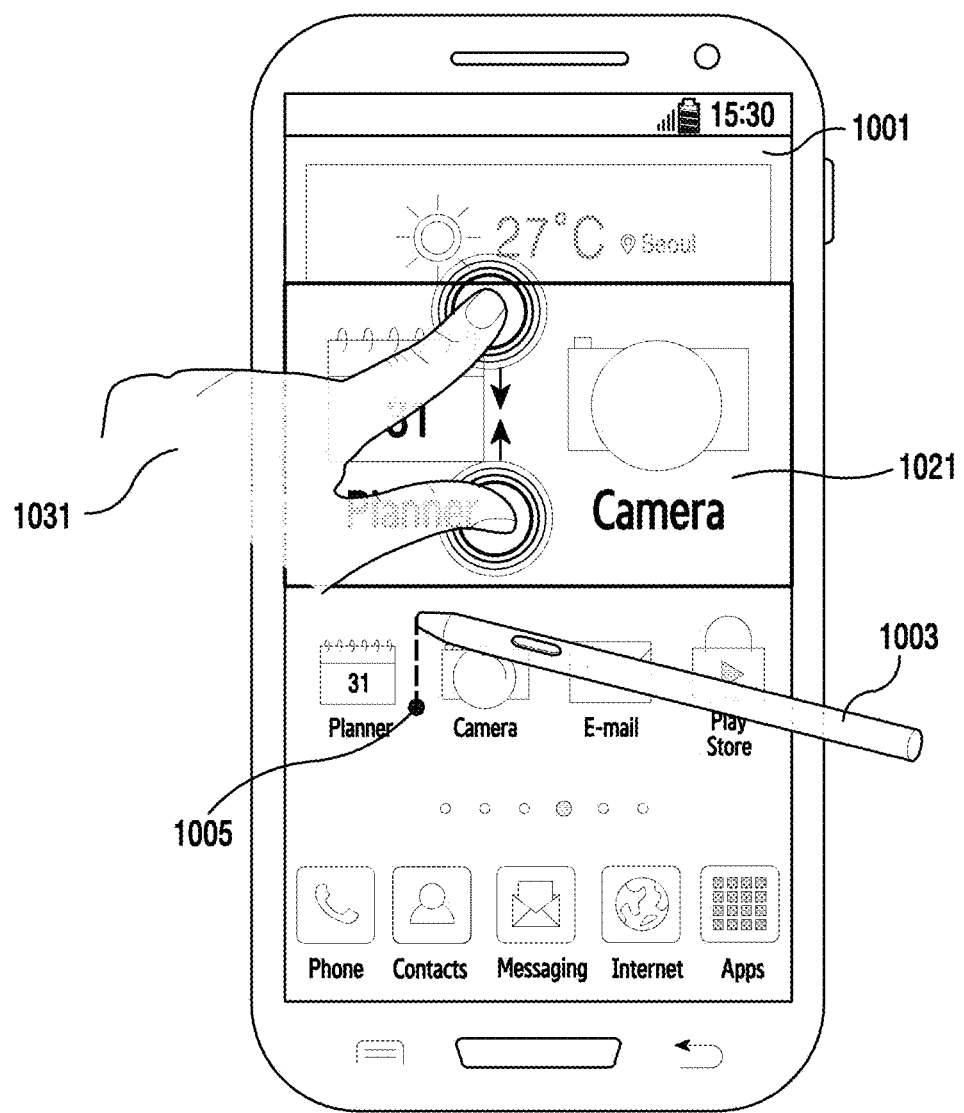

Referring to FIG. 9, in operation 901, the electronic device may determine whether a magnification display area change event occurs. According to an embodiment of the present disclosure, the magnification display area change event may be an event for changing the size of a magnification display area. According to an embodiment of the present disclosure, when an input by an electronic pen 1003 occurs at a certain distance from a touch screen 1001 as shown in FIGS. 10A, 10B, and 10C, the electronic device may recognize that hovering occurs. In this case, the electronic device may determine whether a user's input or menu manipulation for changing the size of a magnification display area 1011 or 1021 occurs.

Figure 10D:
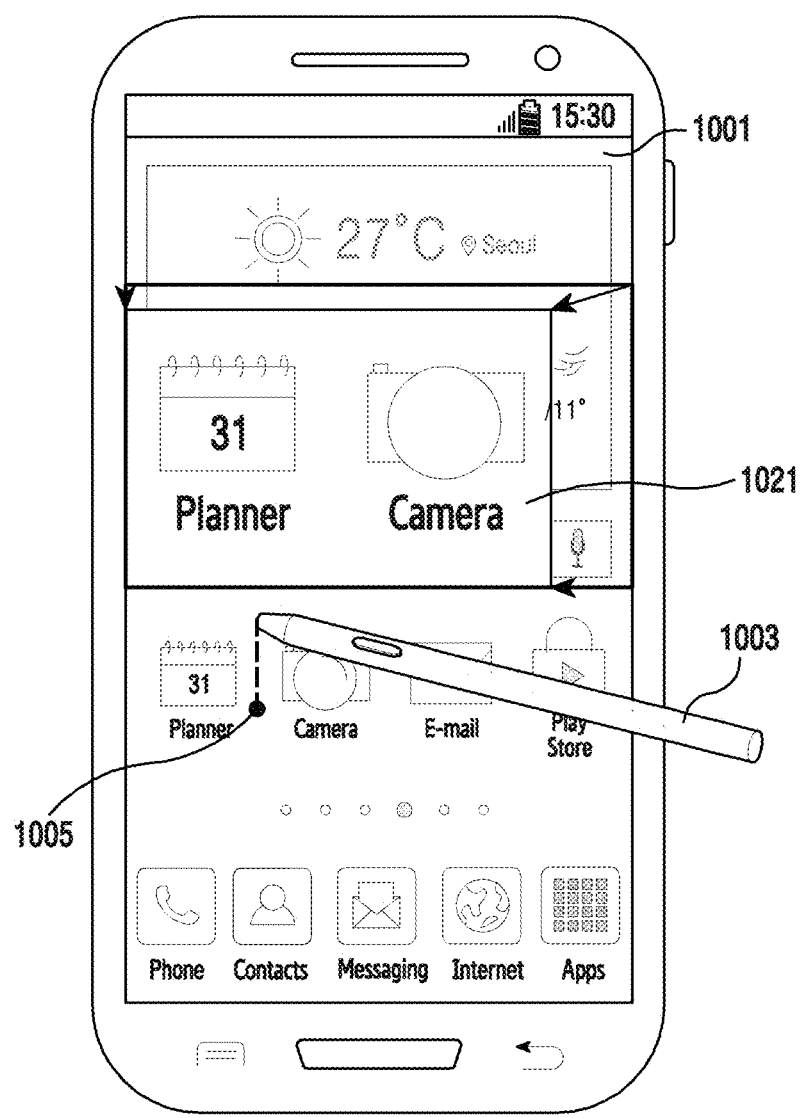

FIGS. 10A, 10B, and 10D illustrate a procedure for determining a size of a magnification display area in an electronic device according to various embodiments of the present disclosure.

Referring to FIGS. 10A, 10B, and 10D, according to an exemplary embodiment, the electronic device may detect the user input on the edge of the magnification display area 1011 or 1021, and, when a holding time of the user input is longer than or equal to a certain time, the electronic device may recognize that an event for changing the size of the magnification display area 1011 or 1021 occurs.

Referring to FIGS. 9 and 10A, in operation 903, the electronic device may determine whether a magnification display area extension event occurs. According to an embodiment of the present disclosure, as shown in FIG. 10A, the electronic device may determine whether a touch input of a user 1013 for extending the magnification display area 1011 occurs, while magnifying and displaying the screen magnification target area based on hovering coordinates 1005 inputted by the electronic pen 1003 on the magnification display area 1011. For example, the touch input of the user 1013 for extending the magnification display area 1011 may be a pinch zoom operation.

Referring to FIGS. 9 and 10B, in operation 905, the electronic device may extend and display the magnification display area based on the screen display area extension event. According to an embodiment of the present disclosure, when the electronic device detects the touch input of the user 1013 (for example, pinch zoom) for extending the magnification display area 1021, while magnifying and displaying the screen magnification target area based on hovering coordinates 1005 inputted by the electronic pen 1003 on the magnification display area 1021 as shown in FIG. 10A, the electronic device may extend and display the magnification display area as shown in FIG. 10B.

Referring to FIGS. 9 and 10C, in operation 907, the electronic device may determine whether a screen display area reduction event occurs. According to an embodiment of the present disclosure, as shown in FIG. 10C, the electronic device may determine whether a touch input of the user 1031 for reducing the magnification display area 1021 occurs, while magnifying and displaying the screen magnification target area based on the hovering coordinates 1005 inputted by the electronic pen 1003 on the magnification display area 1021. For example, the touch input of the user 1031 for reducing the magnification display area 1021 may be a pinch out operation.

Referring to FIGS. 9 and 10D, in operation 909, the electronic device may reduce and display the magnification display area based on the screen display area reduction event. According to an embodiment of the present disclosure, when the electronic device detects the touch input of the user 1031 (for example, pinch out) for reducing the magnification display area 1021, while magnifying and displaying the screen magnification target area based on hovering coordinates 1005 inputted by the electronic pen 1003 on the magnification display area 1021 as shown in FIG. 10C, the electronic device may reduce and display the magnification display area as shown in FIG. 10D in operation 1011.

In the above-described embodiments of the present disclosure, the electronic device may extend or reduce the magnification display area based on the user's touch input on the magnification display area. However, this should not be considered as limiting, and the magnification display area may be extended or reduced by a menu input, a key input, a gesture input, a touch input, an electronic pen input, and the like for extending or reducing the magnification display area.

Additionally, the electronic device may detect a user input on the edge of the magnification display area 1011 or 1021 for the sake of a user who does not perform a multi-touch operation (for example, pinch in or pinch out) with ease, and, when the holding time of the user input is longer than or equal to the certain reference time, the electronic device may recognize that an event for changing the size of the magnification display area 1011 or 1021 occurs. Accordingly, the electronic device may extend or reduce the size of the magnification display area 1011 or 1021 based on the user input on the corner of the magnification display area 1011 or 1021.

Figure 11:
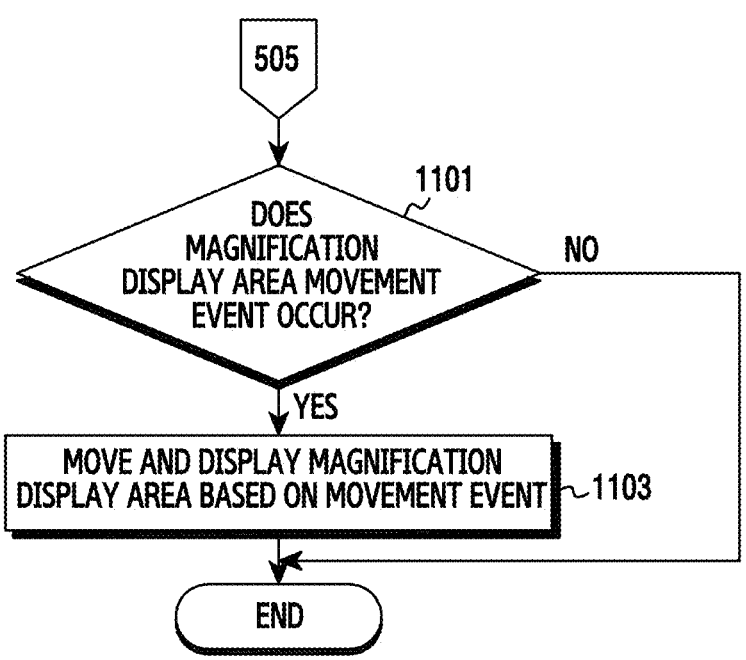
FIG. 11 is a flowchart illustrating a procedure for providing movement of a magnification display area in an electronic device according to various embodiments of the present disclosure.

FIG. 11 is a flowchart illustrating a procedure for providing movement of a magnification display area in an electronic device according to various embodiments of the present disclosure.

The procedure in the embodiment of FIG. 11 may include operations after operation 505 of magnifying and displaying the target area in FIG. 5.

Figure 12A:
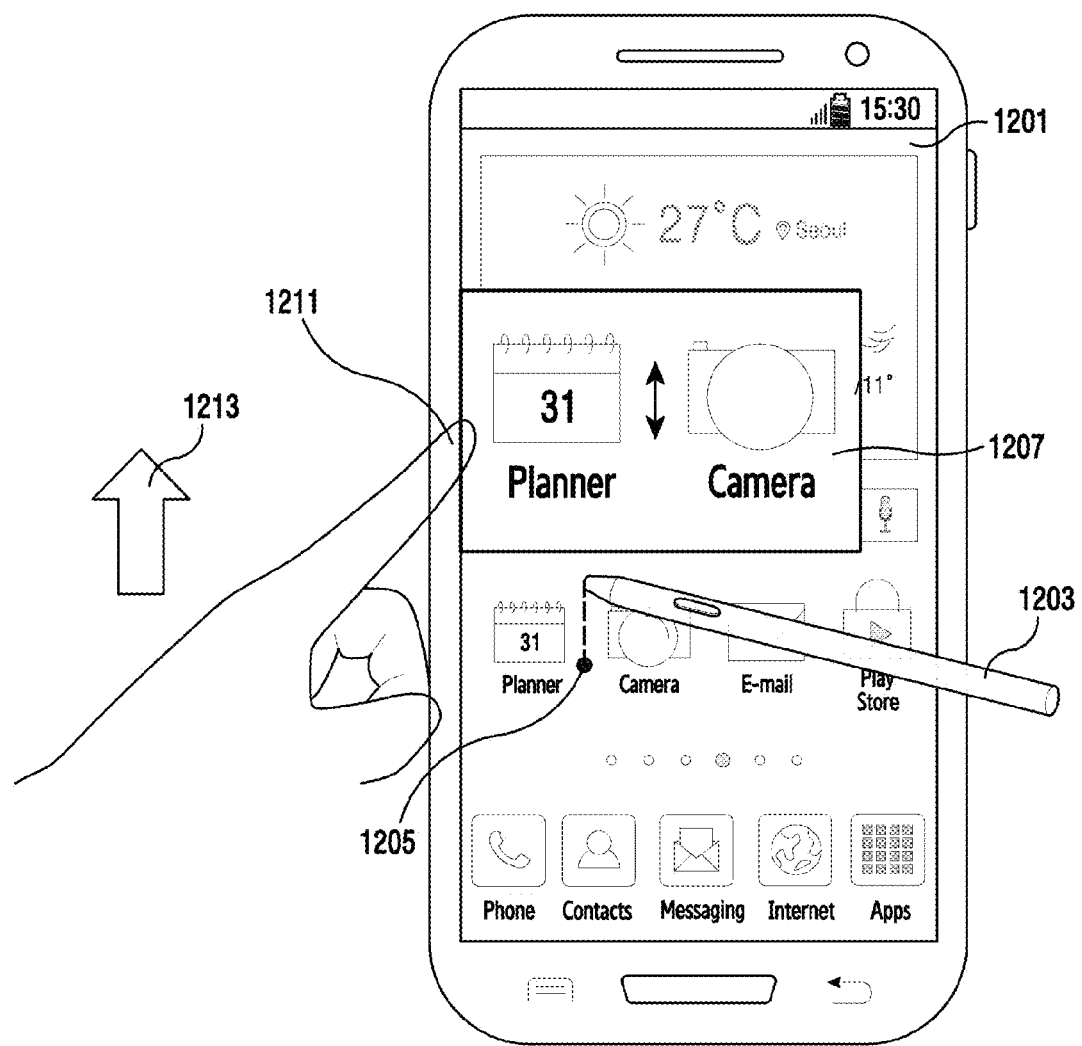
FIGS. 12A and 12B illustrate a procedure for providing movement of a magnification display area in an electronic device according to various embodiments of the present disclosure.

Referring to FIG. 11, in operation 1101, the electronic device may determine whether a magnification display area movement event occurs. According to an embodiment of the present disclosure, as shown in FIG. 12A, when an input by an electronic pen 1203 occurs at a certain distance from a touch screen 1201, the electronic device may recognize that hovering occurs. In this case, the electronic device may determine whether a user's input or menu manipulation for changing the location of a magnification display area 1207 occurs. For example, the user's input for changing the location of the magnification display area 1207 may be a drag operation.

Figure 12B:
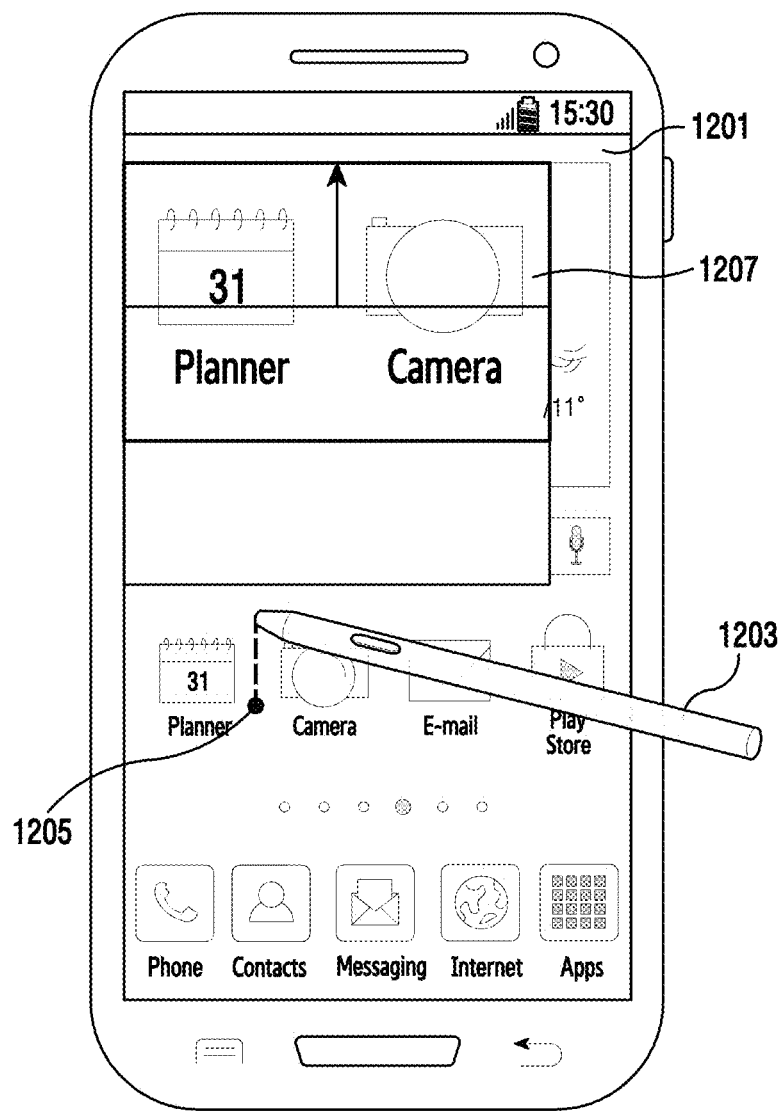

FIGS. 12A and 12B illustrate a procedure for providing movement of a magnification display area in an electronic device according to various embodiments of the present disclosure.

Referring to FIGS. 11, 12A, and 12B, in operation 1103, the electronic device may move and display the magnification display area based on a movement event. According to an embodiment of the present disclosure, when the electronic device detects a touch input (for example, a dragging 1213) of a user 1211 for changing the location of the magnification display area 1207, while magnifying and displaying the screen magnification target area based on hovering coordinates 1205 inputted by the electronic pen 1203 on the magnification display area 1207 as shown in FIG. 12A, the electronic device may change the location of the magnification display area 1207 based on the user's touch input and display the magnification display area 1207 as shown in FIG. 12B.

In the above-described embodiments of the present disclosure, the electronic device may change and display the location of the magnification display area based on the user's touch input on the magnification display area. However, this should not be considered as limiting. The location of the magnification display area may be changed by a menu input, a key input, a gesture input, a touch input, an electronic pen input, and the like for changing and displaying the location of the magnification display area.

Figure 13:
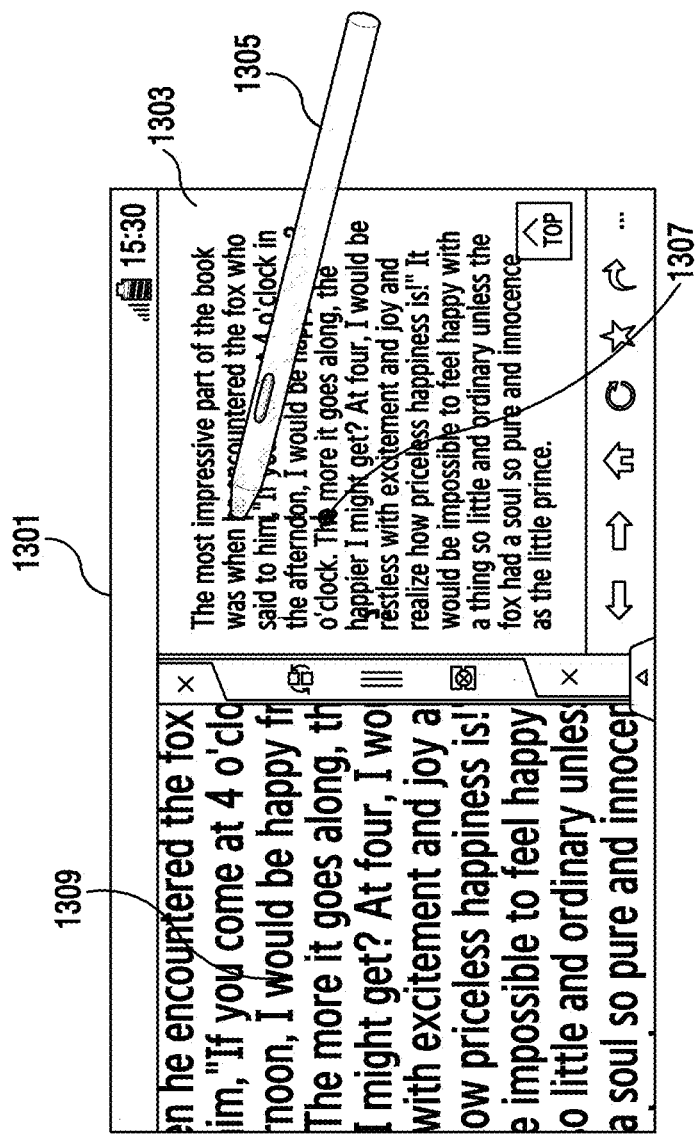
FIG. 13 illustrates a procedure for providing a screen magnification function based on a multi-window in an electronic device according to various embodiments of the present disclosure.

FIG. 13 illustrates a procedure for providing a screen magnification function based on a multi-window in an electronic device according to various embodiments of the present disclosure.

Referring to FIG. 13, when an electronic device 1301 supports a multi-window function and a hovering input by an electronic pen 1305 is detected on one window 1303 of a plurality of divided windows 1303 and 1309, the electronic device 1301 may magnify and display a certain area based on hovering coordinates 1307 on the other window 1309.

In the above-described embodiment of the present disclosure, the multi-window includes a plurality of windows divided vertically. However, this should not be considered as limiting, and the multi-window may include a plurality of windows divided horizontally. In addition, the multi-window may include a plurality of windows arranged in any pattern rather than being divided vertically or horizontally.

According to an embodiment of the present disclosure, the electronic device may configure a multi-window with an external electronic device (for example, a TV, a tablet PC, and the like) connected with the electronic device via a network. For example, the electronic device may display a magnified screen on the external electronic device connected via the network.

Figure 14A:
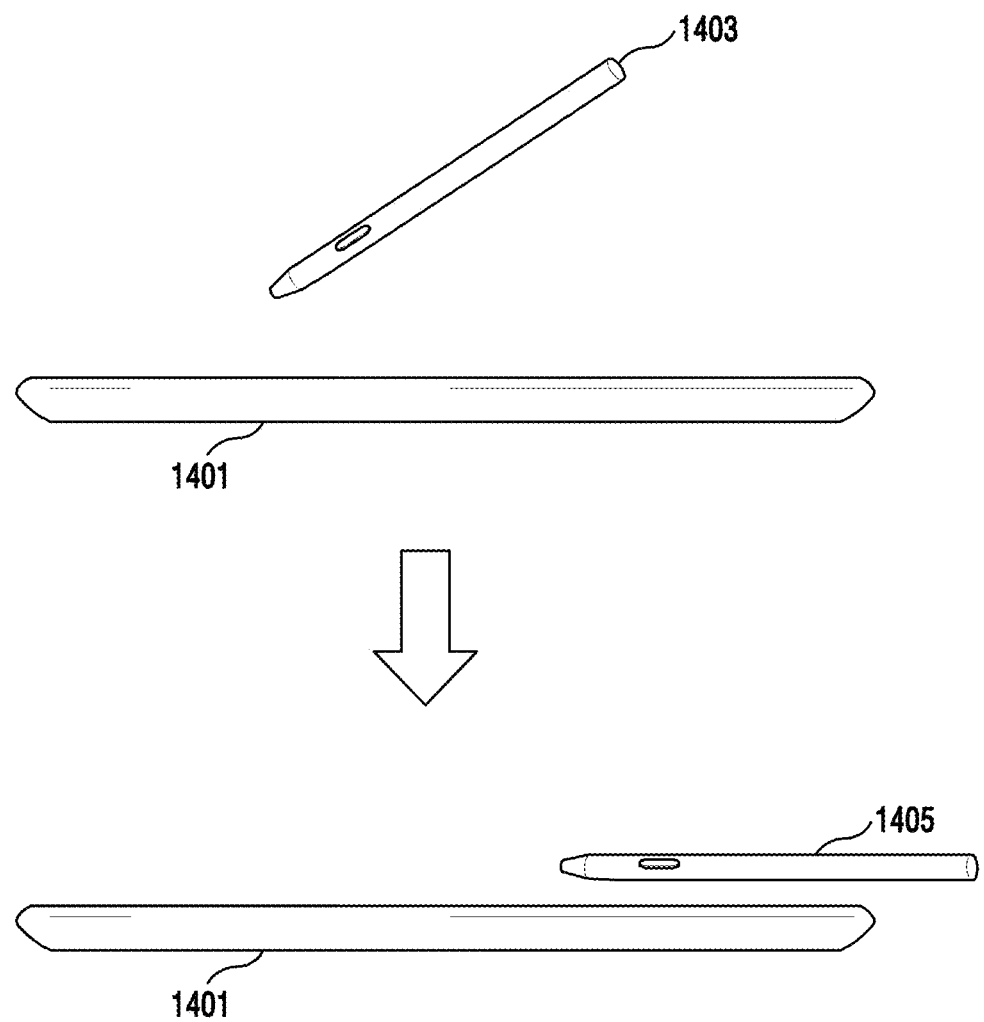
FIGS. 14A, 14B, and 14C illustrate a procedure for providing a screen magnification function based on state information of an electronic pen in an electronic device according to various embodiments of the present disclosure.
Figure 14B:
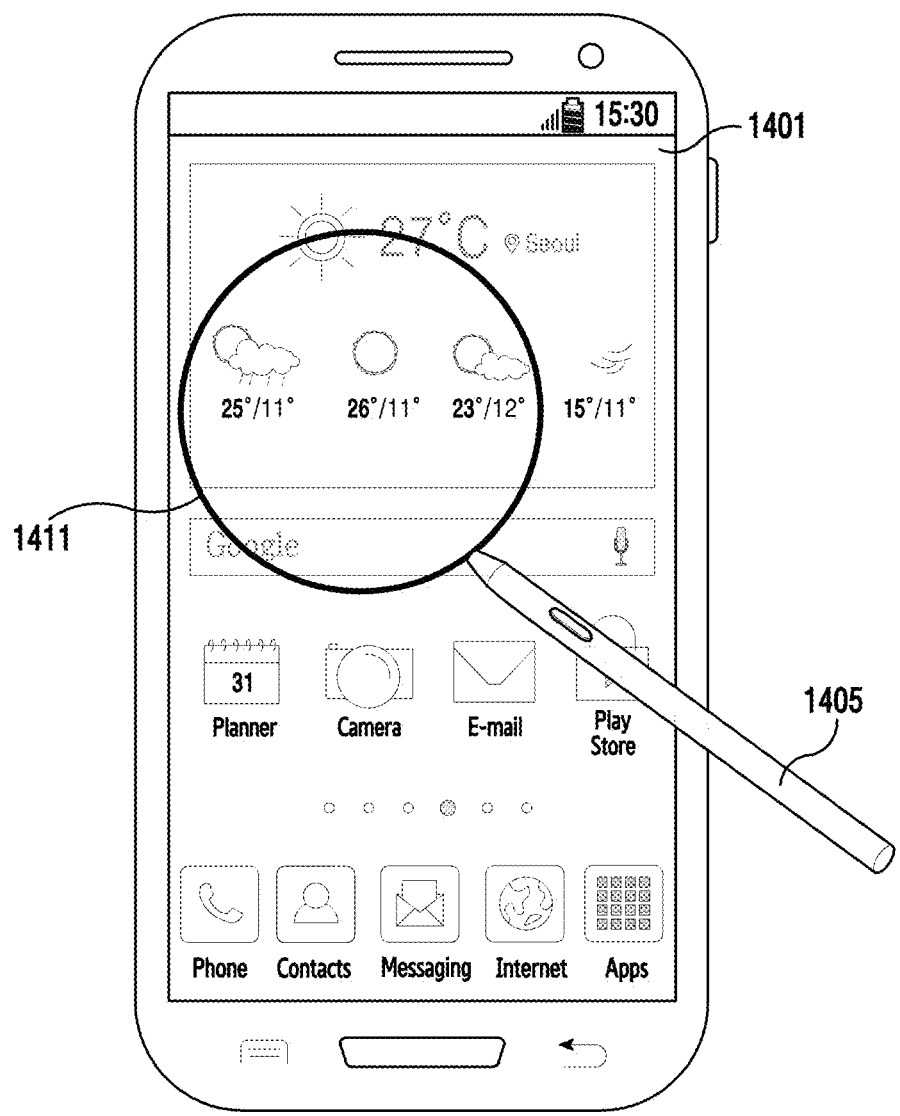
Figure 14C:
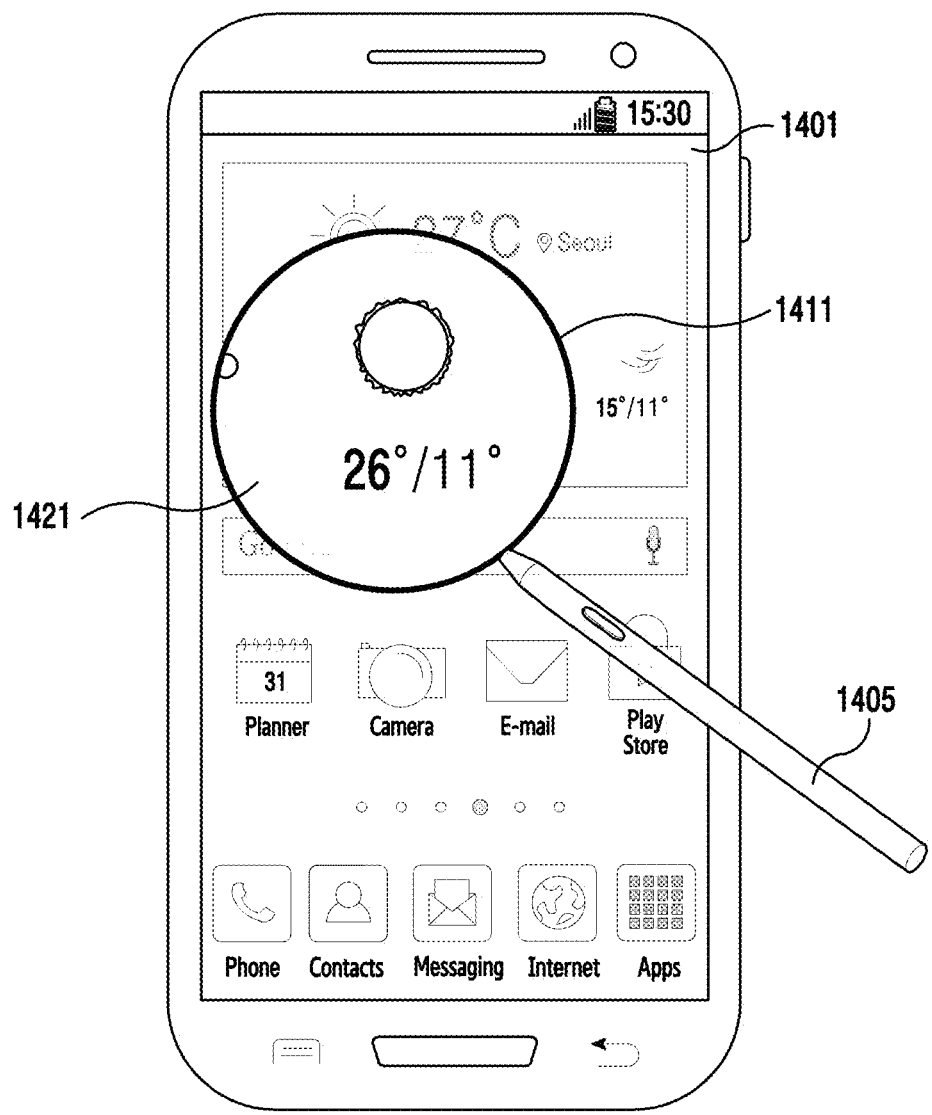

FIGS. 14A, 14B, and 14C illustrate a procedure for providing a screen magnification function based on state information of an electronic pen in an electronic device according to various embodiments of the present disclosure.

Referring to FIG. 14A, when an electronic device 1401 detects that the electronic pen is changed from a first state 1403 (for example, a state in which a tilt of the electronic pen is greater than or equal to a reference tilt) to a second state 1405 (for example, a state in which the tilt of the electronic pen is less than or equal to the reference tilt), the electronic device 1401 may recognize that a screen magnification event occurs.

Referring to FIG. 14B, the electronic device 1401 may display a screen magnifying tool 1411 on the screen based on the location of the electronic pen 1405. For example, the screen magnifying tool 1411 may have a shape of a magnifying glass.

Referring to FIG. 14C, the electronic device 1401 may magnify and display a certain area in the screen magnifying tool 1411 in operation 1421.

According to an embodiment of the present disclosure, when the location of the screen magnifying tool 1411 is changed by the electronic pen 1405, the electronic device 1401 may magnify and display a certain area based on the change of the corresponding location.

According to an embodiment of the present disclosure, when a change in height of the electronic pen 1405 is detected while the electronic device 1401 is displaying the screen magnifying tool 1411, the electronic device may change the magnification ratio of the certain area displayed in the screen magnifying tool 1411 based on the change in the height of the electronic pen 1405, and display the area.

According to an embodiment of the present disclosure, when the change in the height of the electronic pen 1405 is detected while the electronic device 1401 is displaying the screen magnifying tool 1411, the electronic device may change the size of the screen magnifying tool 1411 based on the change in the height of the electronic pen 1405, and display the screen magnifying tool 1411.

Figure 15A:
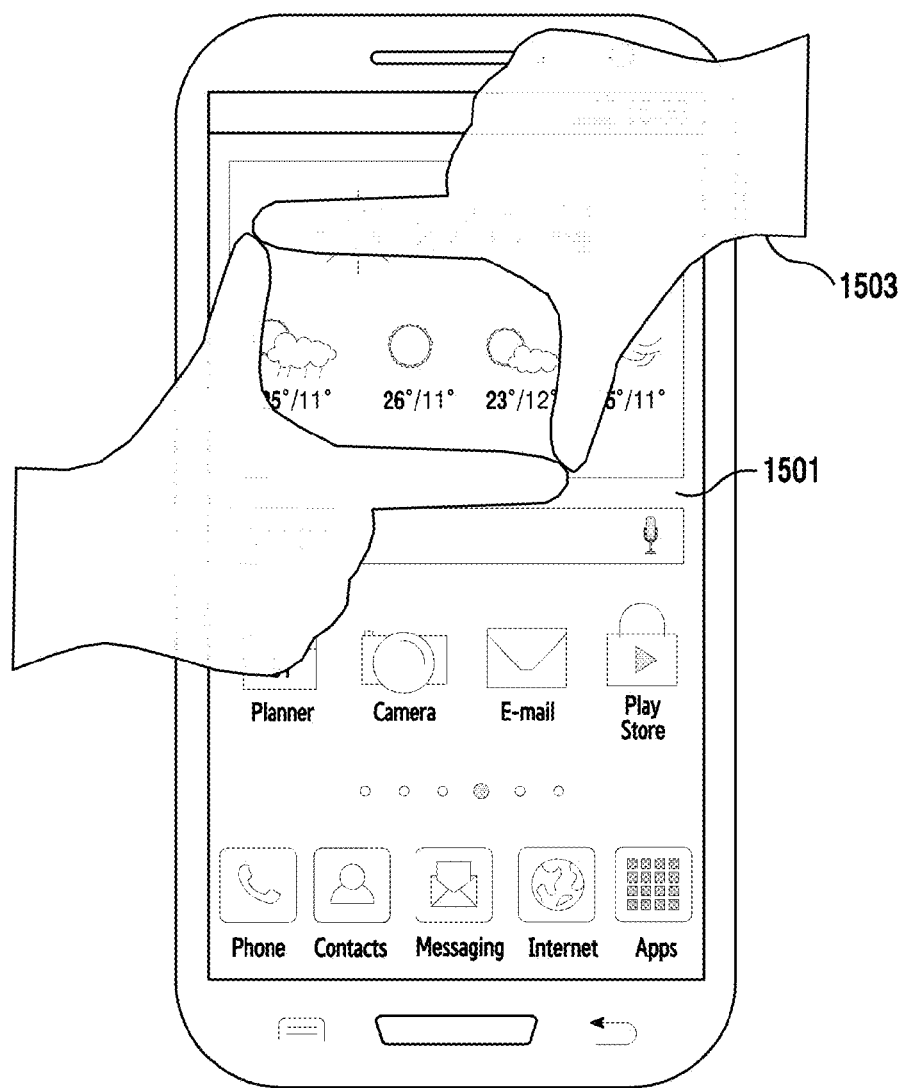
FIGS. 15A and 15B illustrate a procedure for providing a screen magnification function based on a user input in an electronic device according to various embodiments of the present disclosure.
Figure 15B:
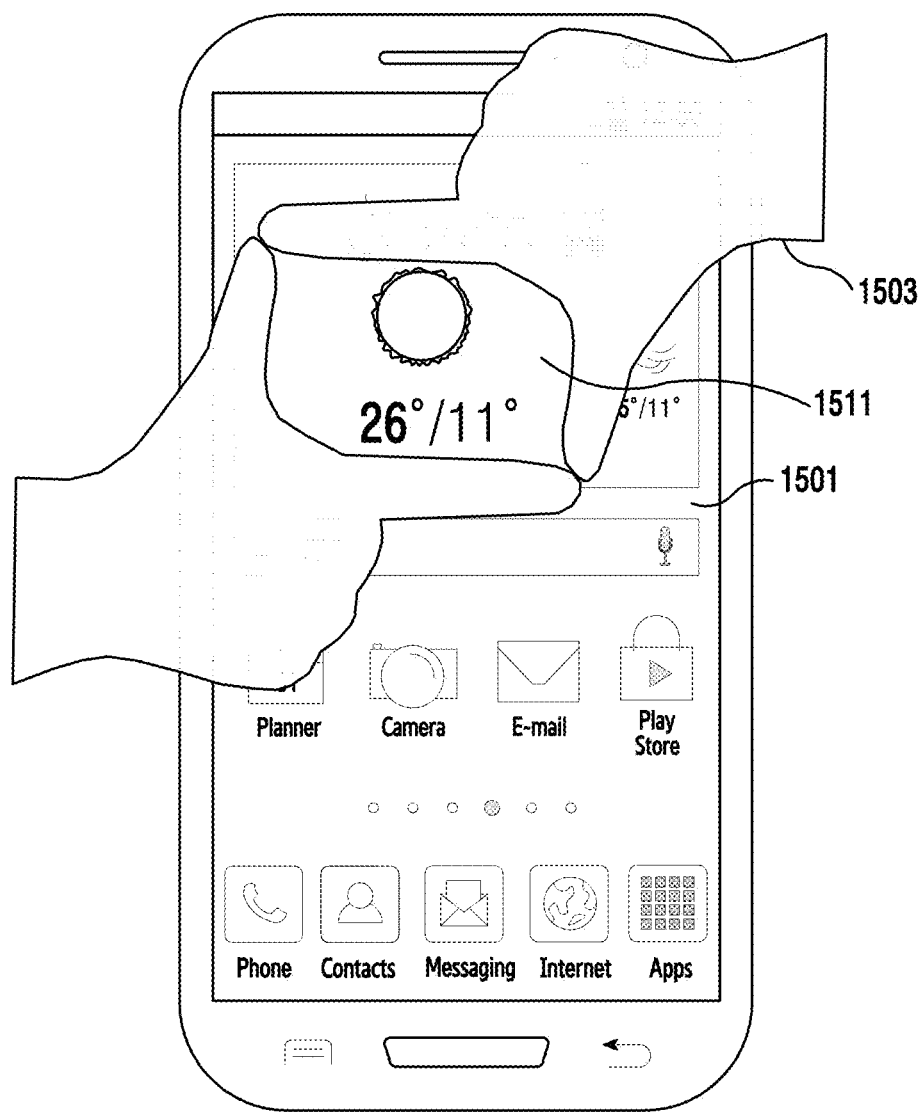

FIGS. 15A and 15B illustrate a procedure for providing a screen magnification function based on a user input in an electronic device according to various embodiments of the present disclosure.

Referring to FIG. 15A, when an input in a closed curve shape (or a shape which may be determined to be a shape of a closed curve or a certain shape) by a user 1503 is detected, an electronic device 1501 may recognize that a screen magnification event occurs. According to an embodiment of the present disclosure, the input by the user 1503 may be a hovering input.

Referring to FIG. 15B, the electronic device 1501 may magnify and display a certain area which is included in the shape of the closed curve inputted by the user 1503 in operation 1511.

According to an embodiment of the present disclosure, when the location of the user input is changed, the electronic device 1501 may magnify and display a certain area based on the corresponding location change.

According to an embodiment of the present disclosure, when a change in height of the user input is detected while the electronic device 1501 is displaying the magnified screen, the electronic device 1501 may change the magnification ratio of the certain area magnified and displayed based on the change in the height, and display the area.

According to an embodiment of the present disclosure, when a change in the size of the area made by a user input is detected while the electronic device 1501 is displaying the magnified screen, the electronic device 1501 may change the magnification ratio of the certain area magnified and displayed, based on the change in the size, and display the area. For example, when the area formed by the user input is smaller than before, the electronic device may increase the magnification ratio of the area formed by the user input and display the area.

FIGS. 16A, 16B, 16C, 16D, and 16E illustrate a procedure for providing screen magnification based on an input by an electronic pen in an electronic device according to various embodiments of the present disclosure.

Figure 16A:
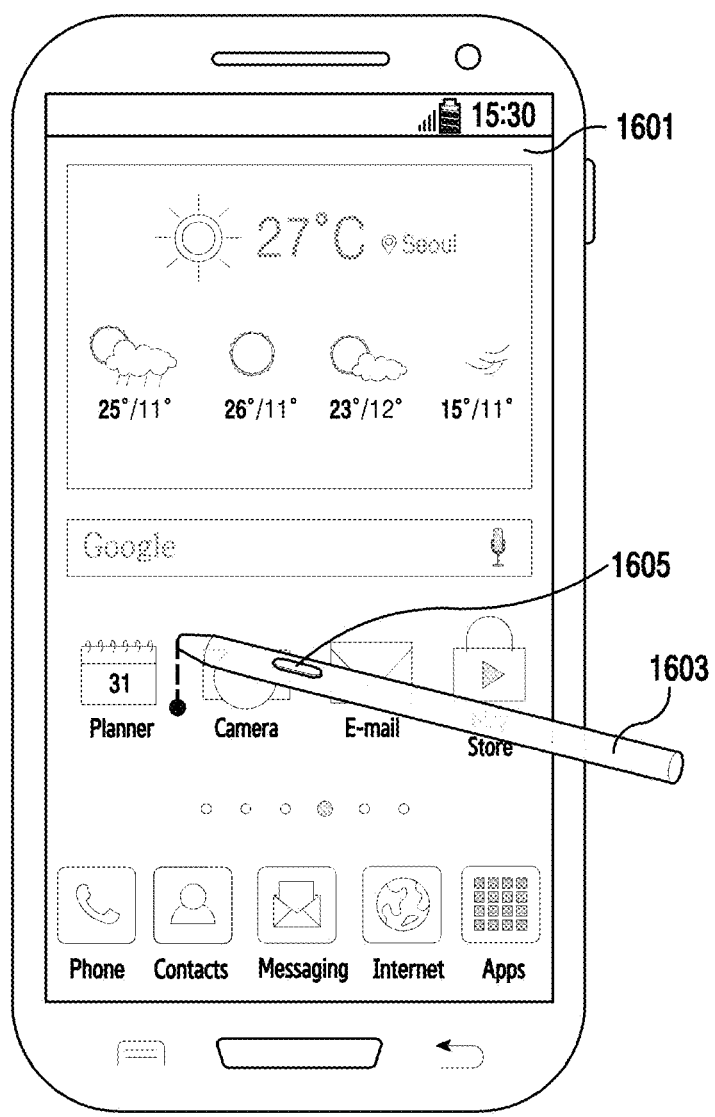
FIGS. 16A, 16B, 16C, 16D, and 16E illustrate a procedure for providing screen magnification based on an input by an electronic pen in an electronic device according to various embodiments of the present disclosure.
Figure 16B:
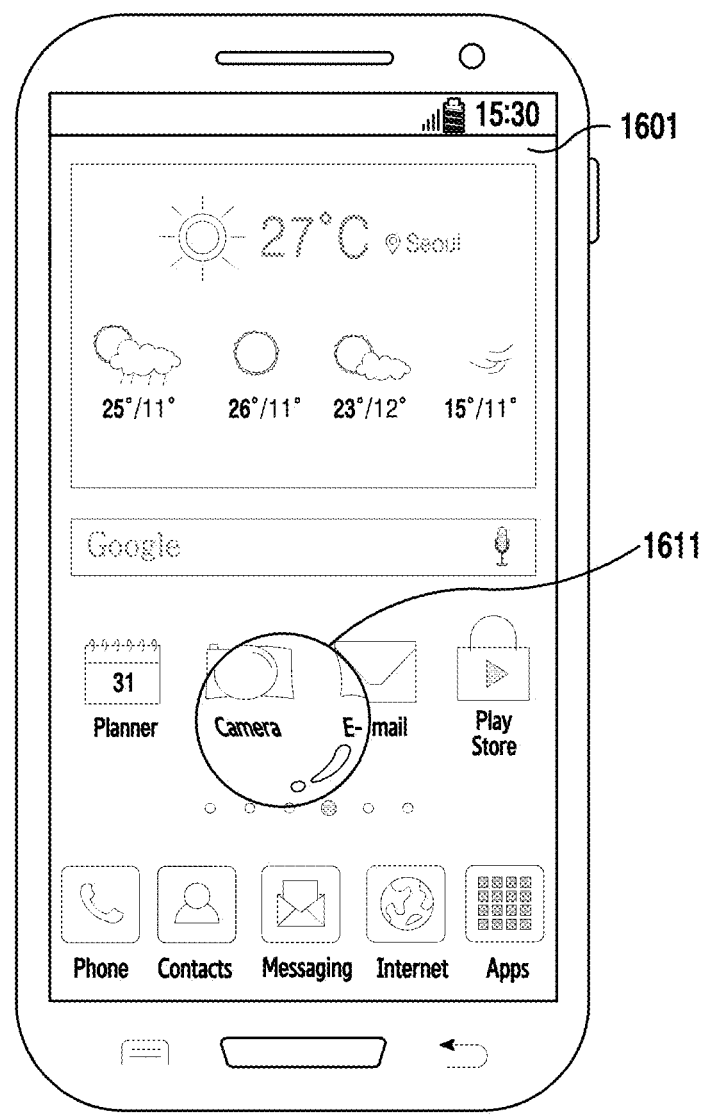

Referring to FIGS. 16A, 16B, 16C, 16D, and 16E, an electronic device 1601 may determine whether a hovering input by an electronic pen 1603 occurs. In this case, when a key input 1605 of the electronic pen 1603 is detected, the electronic device 1601 may provide a magnified area 1611 based on hovering coordinates as shown in FIG. 16B.

According to an embodiment of the present disclosure, when the key input 1605 of the electronic pen 1603 is detected, the electronic device 1601 may provide a magnified area in the form of a water drop. When a characteristic input by the electronic pen 1603 is detected, the electronic device may extend or reduce the size of the magnified area 1611 of the water drop shape.

Figure 16C:
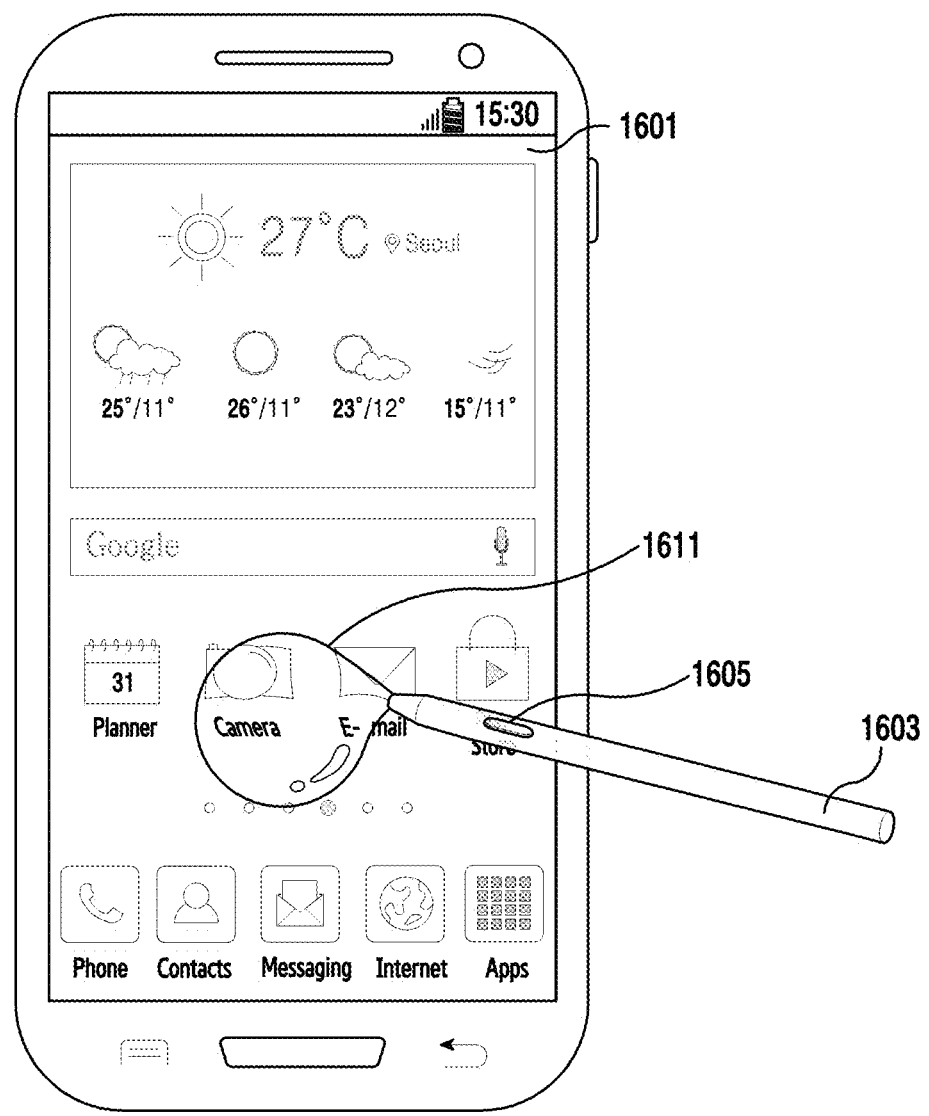
Figure 16D:

For example, when the key 1605 of the electronic pen 1603 is pressed multiple times as shown in FIG. 16C, the electronic device 1601 may increase the size of the magnified area and display the area by performing an operation of dropping a water drop like a pipette as shown in FIG. 16D in operation 1621.

Figure 16E:
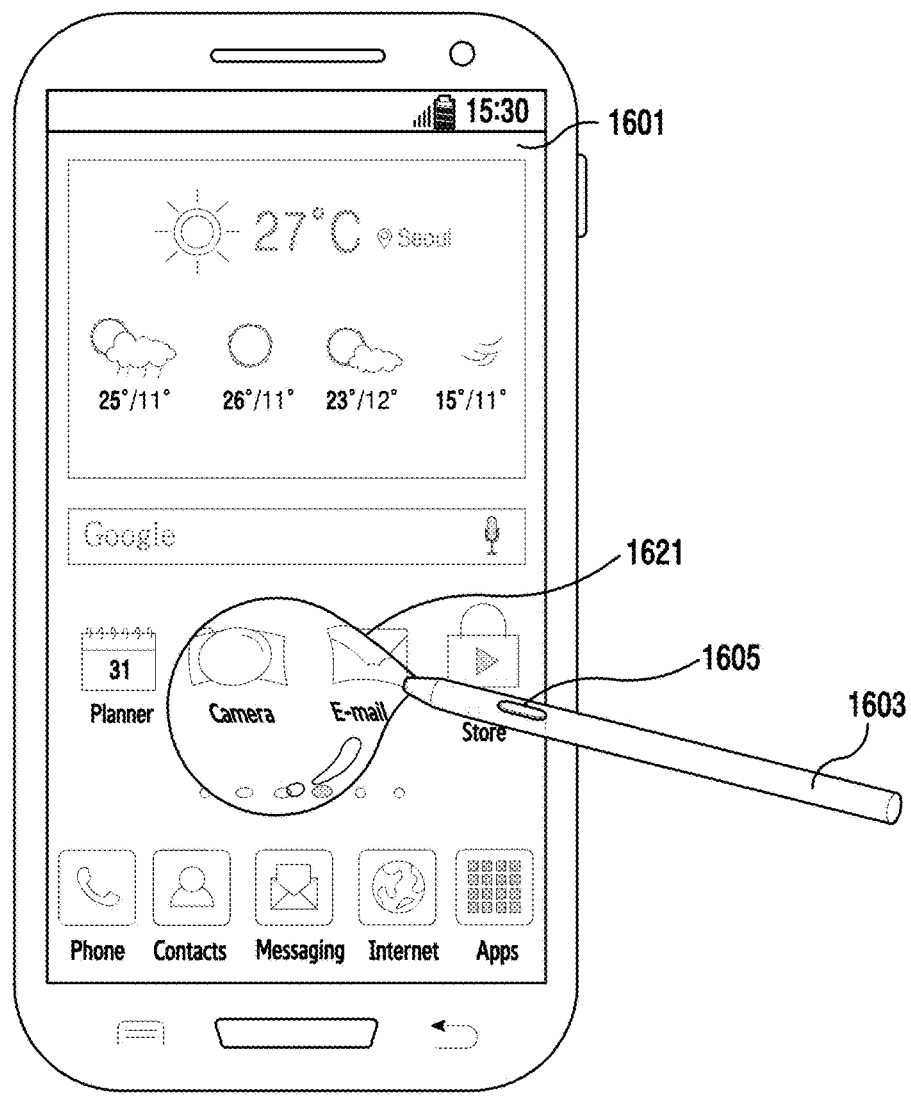

In another example, when the electronic pen 1603 approaches the magnified area 1621 of the water drop shape while holding the key input 1605 of the electronic pen 1603 during a reference time as shown in FIG. 16E, the electronic device 1601 may reduce the size of the magnified area and display the area by performing an operation of removing the water drop with the pipette as shown in FIG. 16B in operation 1611.

According to the above-described embodiments of the present disclosure, the electronic device may provide a fun element to the user when the user operates the electronic device.

Figure 17:
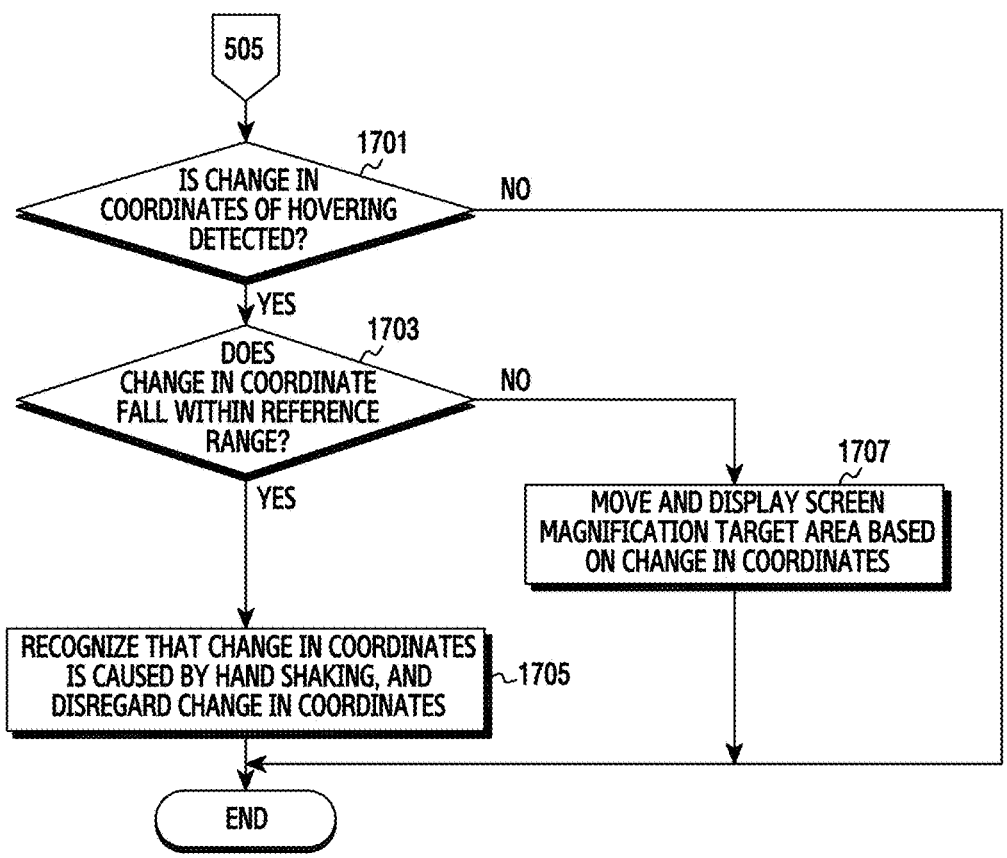
FIG. 17 is a flowchart illustrating a procedure for providing prevention of hand shaking by an electronic pen in an electronic device according to various embodiments of the present disclosure.

FIG. 17 is a flowchart a procedure for providing prevention of hand shaking by an electronic pen in an electronic device according to various embodiments of the present disclosure.

The procedure in the embodiment of FIG. 17 may include operations after operation 505 of magnifying and displaying the target area in FIG. 5.

Referring to FIGS. 17, 18A, 18B, and 18C, in operation 1701, the electronic device may determine whether coordinates of hovering are changed. According to an embodiment of the present disclosure, the electronic device may determine whether hovering coordinates 1805 inputted by an electronic pen 1803 are changed, while magnifying and displaying a screen magnification target area on a magnification display area 1811.

In operation 1703, the electronic device may determine whether the change in the coordinates falls within a reference rage. According to an embodiment of the present disclosure, the electronic device may determine whether the change in the coordinates is less than or equal to a certain reference value.

In operation 1705, when the change in the coordinates falls within the reference range, the electronic device may recognize that the change in the coordinates is caused by hand shaking and thus disregard the change in the coordinates. According to an embodiment of the present disclosure, when the change in the coordinates is less than or equal to the reference value, the electronic device may disregard the change in the coordinates. For example, when the location of the electronic pen 1803 is changed as shown in FIG. 18B, the screen magnification target area displayed on the magnification display area 1811 may be shaken by the change in the location of the electronic pen 1803. Accordingly, when the change in the location of the electronic pen 1803 falls within a reference range, the electronic device may recognize that the change in the location of the electronic pen 1803 is caused by hand shaking, and thus may disregard the change in the coordinates 1821 of the electronic pen 1803 and prevent the shaking of the screen magnification target area displayed on the magnification display area 1811.

In operation 1707, when the change in the coordinates does not fall within the reference range, the electronic device may move and display the screen magnification target area based on the change in the coordinates. According to an embodiment of the present disclosure, when the change in the coordinates exceeds the reference value, the electronic device may change the magnification target area. For example, the electronic device may recognize the change in the location of the electronic pen not as the change in the location caused by hand shaking but as the change in the location for changing the magnification target area, and thus change the magnification target area based on the change in the location of the electronic pen and display the target area on the magnification display area.

FIGS. 19A, 19B, 19C, 19D, 19E, and 19F illustrate a procedure for providing an automatic scroll on a magnification display area in an electronic device according to various embodiments of the present disclosure.

Figure 19A:
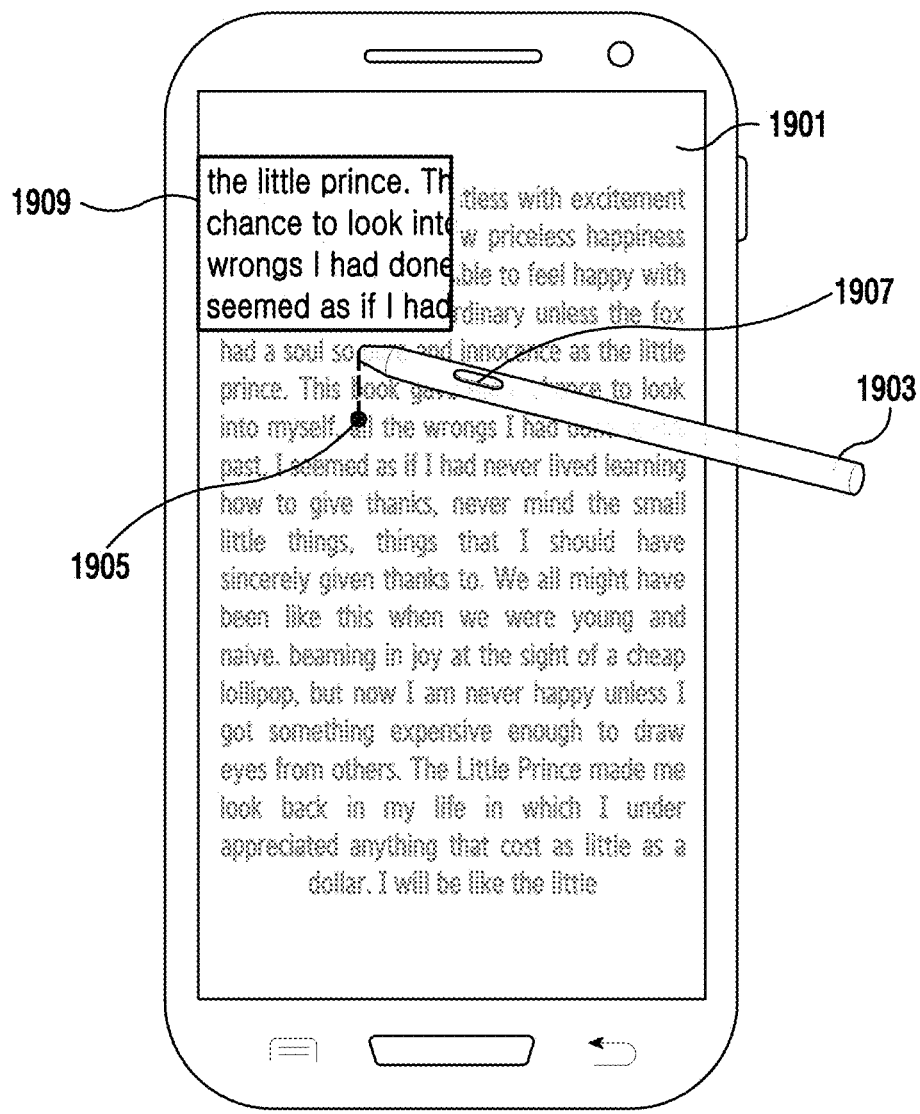
FIGS. 19A, 19B, 19C, 19D, 19E, and 19F illustrate a procedure for providing an automatic scroll on a magnification display area in an electronic device according to various embodiments of the present disclosure.

Referring to FIG. 19A, when a hovering input by an electronic pen 1903 occurs, an electronic device 1901 may magnify and display a magnification target area based on hovering coordinates 1905 on a magnification display area 1909.

When a key input 1907 of the electronic pen 1903 occurs while the electronic device is magnifying and displaying the magnification target area based on the hovering coordinates 1905 on the magnification display area 1909, the electronic device 1901 may recognize that an automatic scroll event on the magnification display area 1909 occurs. The above-described automatic scroll does not use hovering through the key input 1907 of the electronic pen 1903 or a certain input (for example, hovering and triggering by a key input of the electronic pen) since the user of the electronic device may feel fatigue due to the hovering and the fatigue the user feels may grow when the user reads a text.

Figure 19B:
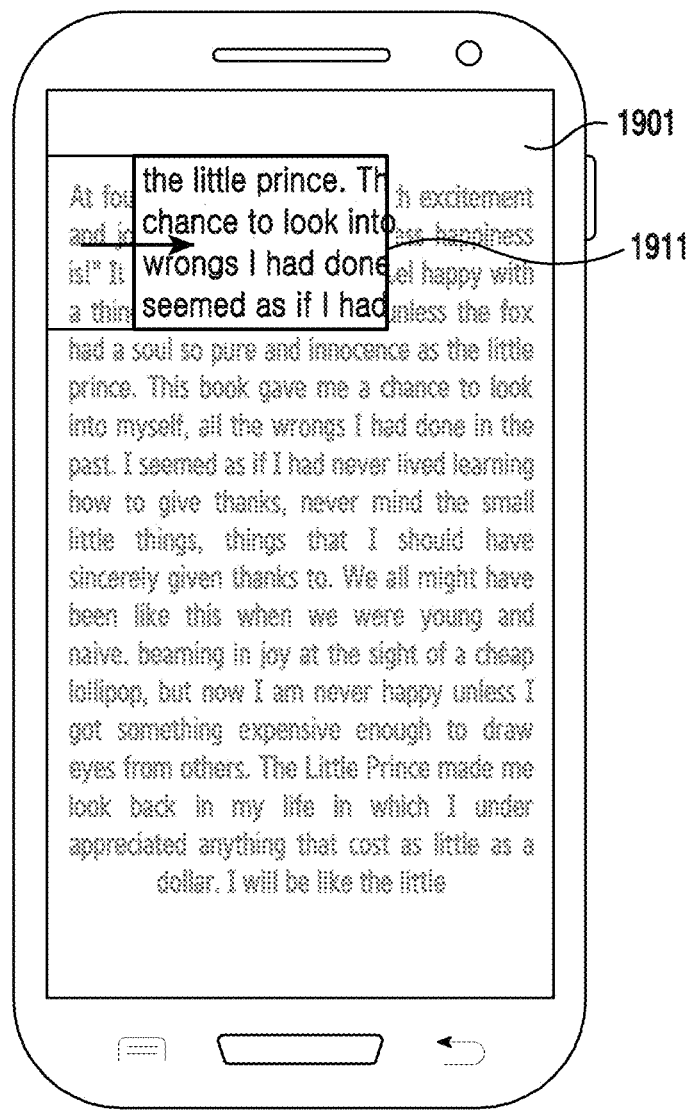

Referring to FIG. 19B, the electronic device 1901 may change and display the location of the magnification display area in operation 1911. According to an embodiment of the present disclosure, the electronic device 1901 may move the location of the magnification display area in a certain direction and display the area. For example, when the automatic scroll event occurs, the electronic device may change the magnification target area in real time, and accordingly, may magnify and display the changed magnification target area on the magnification display area in real time, or may change and display the display location of the magnification display area.

Figure 19C:
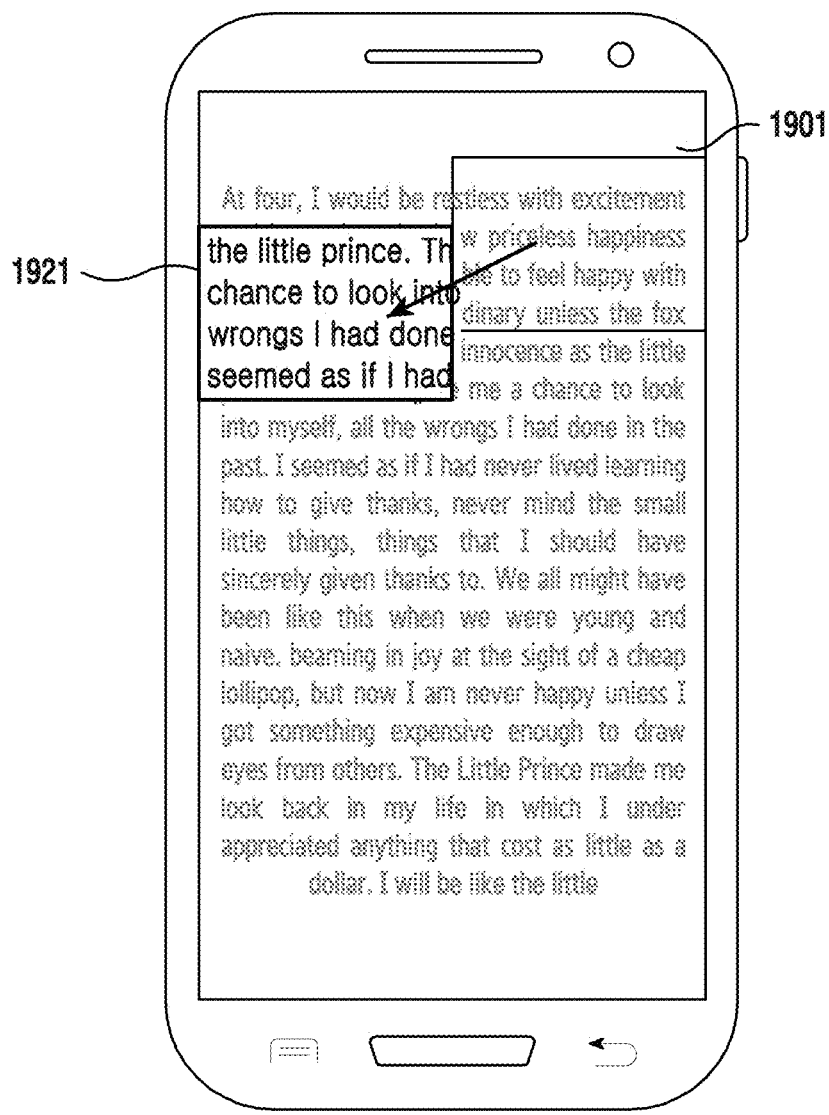

Referring to FIG. 19C, when movement in a certain direction is restricted while the location of the magnification display area is moved in the certain direction, the electronic device may move the location of the magnification display area and display the area in operation 1921.

According to an embodiment of the present disclosure, a scroll speed may be determined based on user's settings or settings pre-set in the electronic device.

Figure 19D:
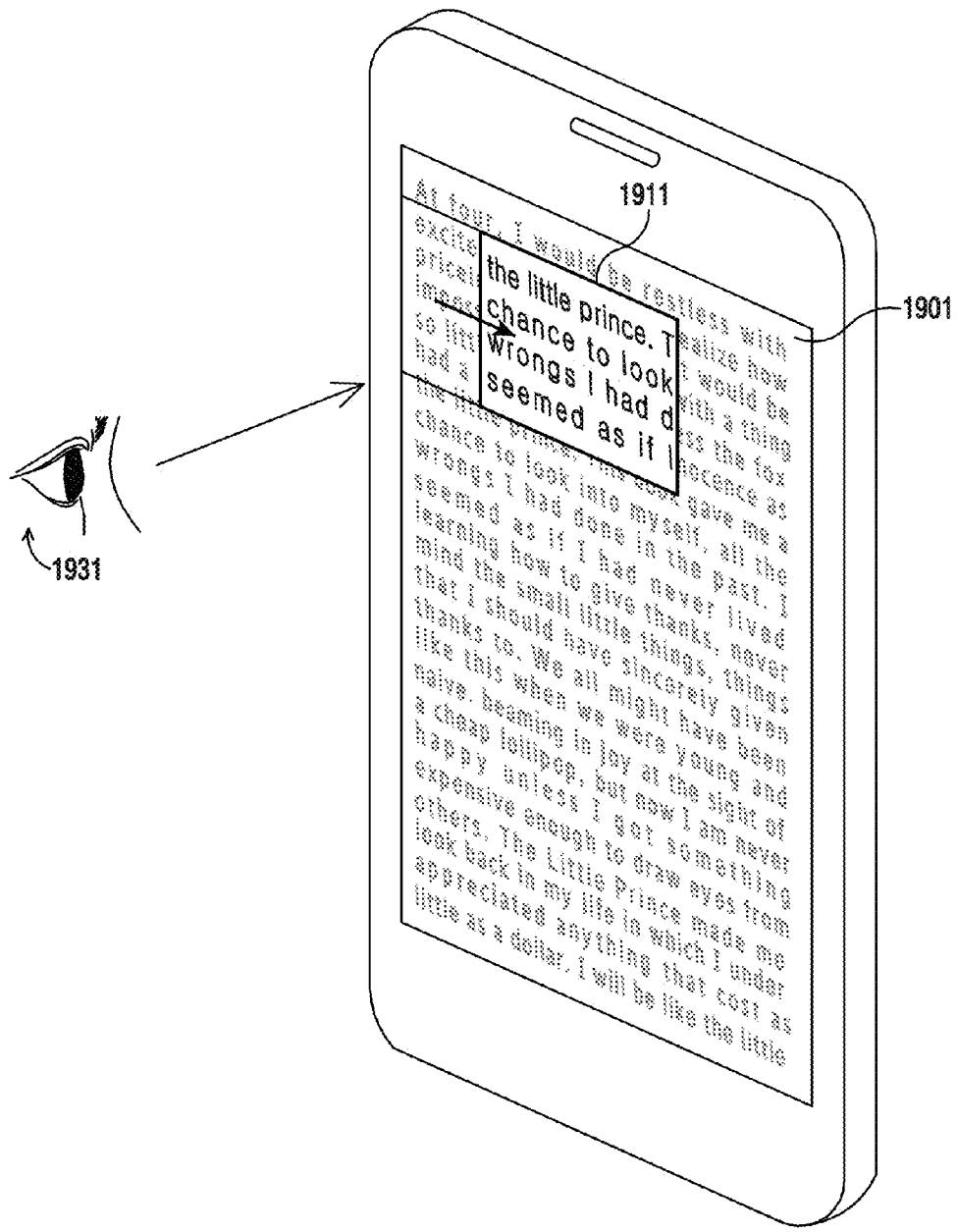

Referring to FIG. 19D, the electronic device may determine the scroll speed by detecting eye movement 1931 of the user during the automatic scroll event. According to an embodiment of the present disclosure, when the electronic device detects eye movement while changing and displaying the location of the magnification display area based on a certain scroll speed, and the eye movement is slower than the change of the location of the magnification display area, the electronic device may reduce the scroll speed of the magnification display area. The reverse case is also applicable.

Figure 19E:
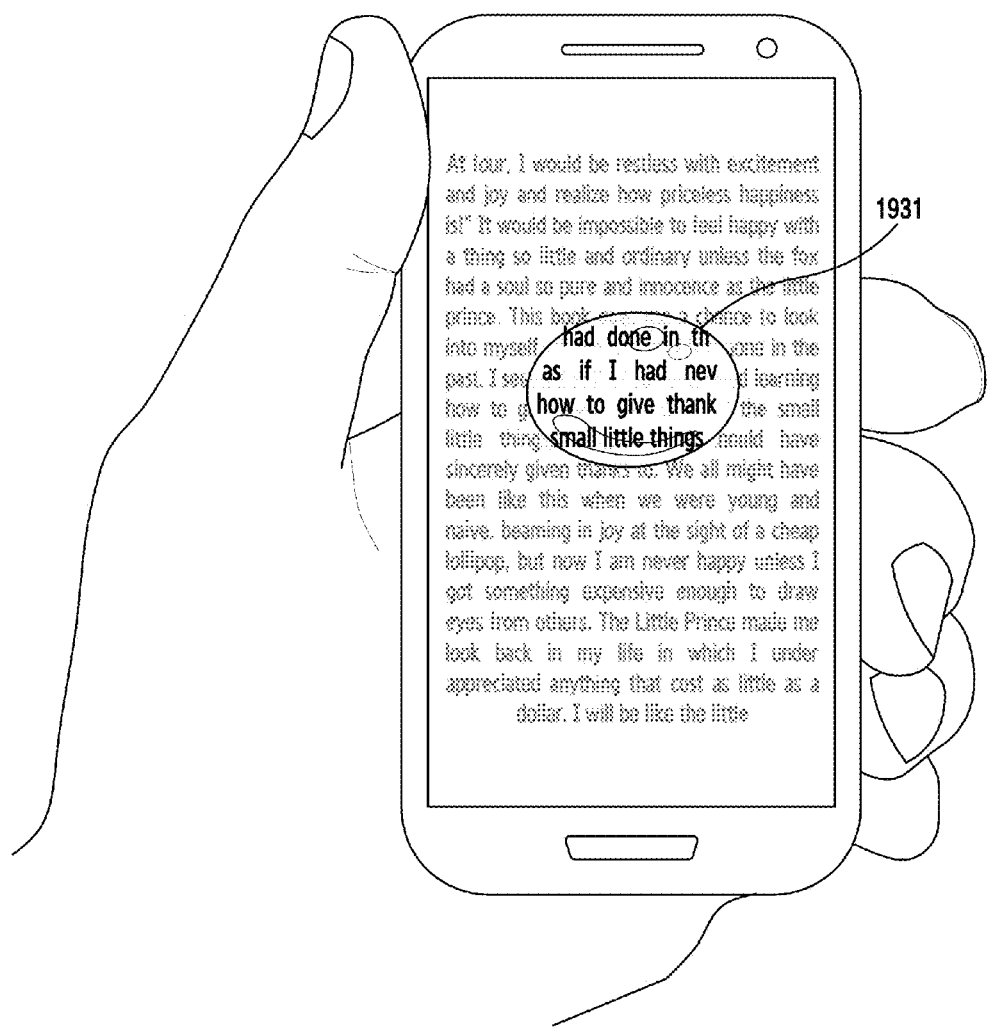
Figure 19F:
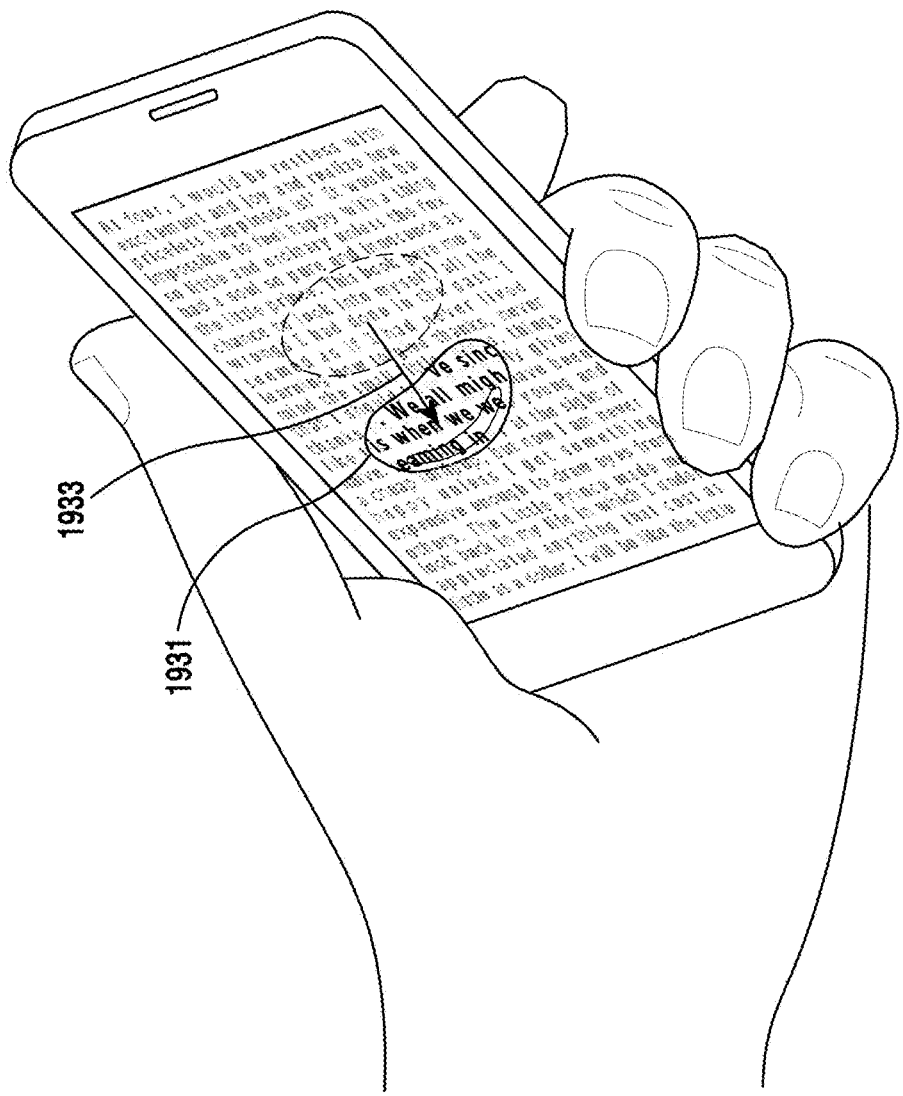

Referring to FIGS. 19E and 19F, when a magnified area 1931 in the form of a water drop is provided as shown in FIG. 19E, the electronic device may control to change the location of the magnified area 1931 in the form of the water drop based on the tilt of the electronic device as shown in FIG. 19F in operation 1933.

Figure 20:
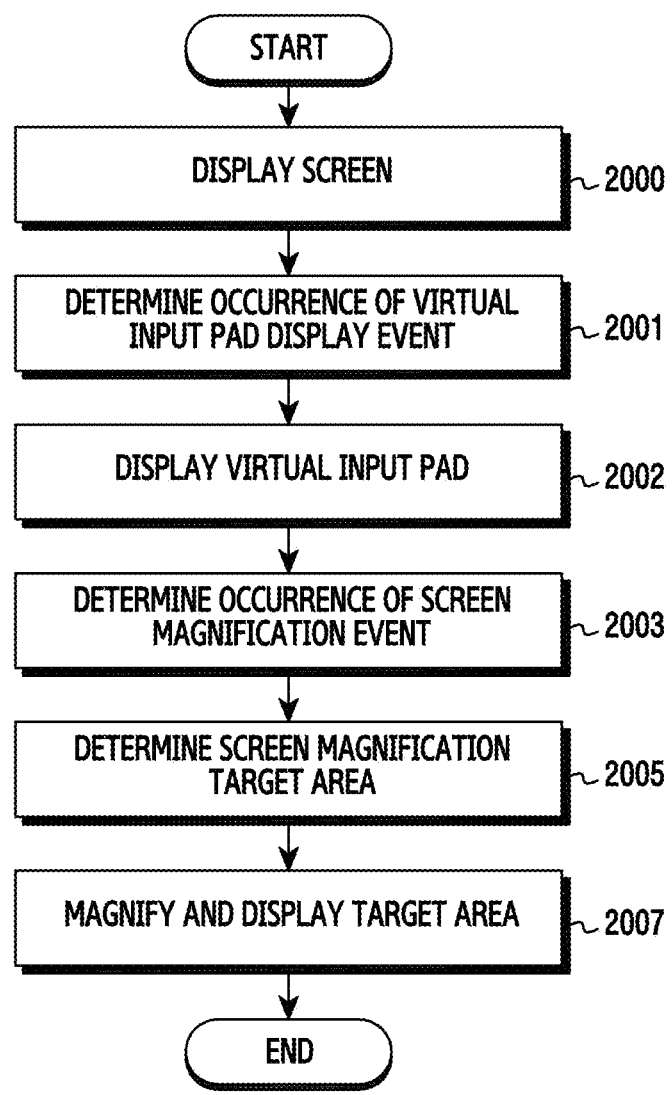
FIG. 20 is a flowchart illustrating a procedure for providing a virtual input pad for magnifying a screen in an electronic device according to various embodiments of the present disclosure.

FIG. 20 is a flowchart illustrating a procedure for providing a virtual input pad for magnifying a screen in an electronic device according to various embodiments of the present disclosure.

Figure 21A:
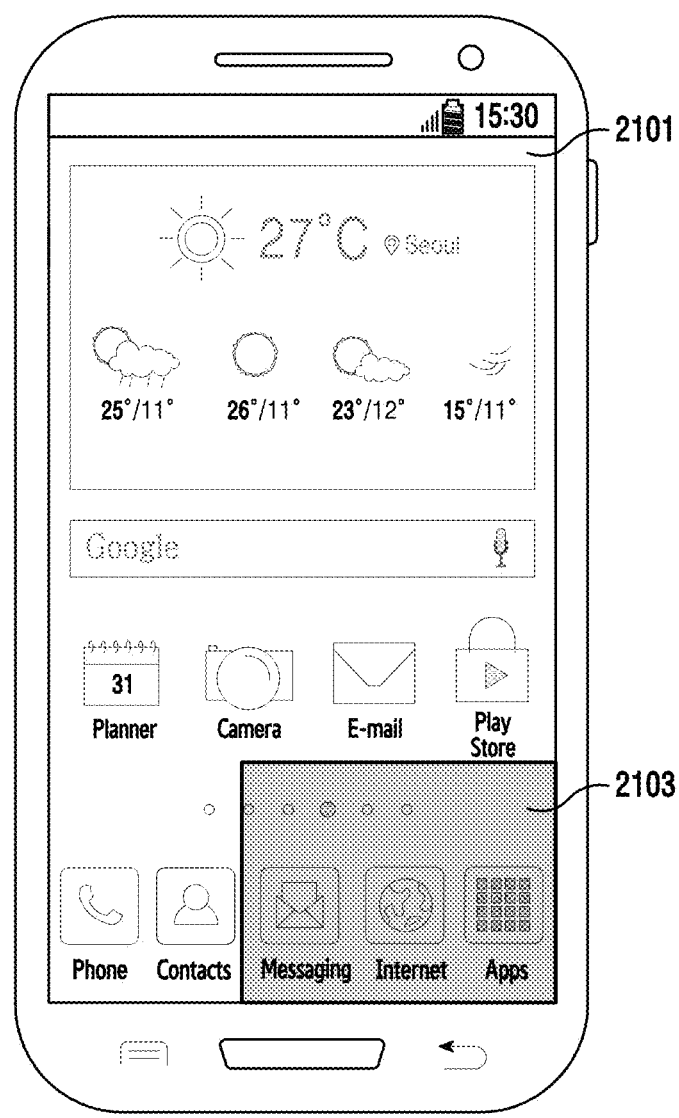
FIGS. 21A and 21B illustrate a procedure for providing a virtual input pad for magnifying a screen in an electronic device according to various embodiments of the present disclosure.
Figure 21B:
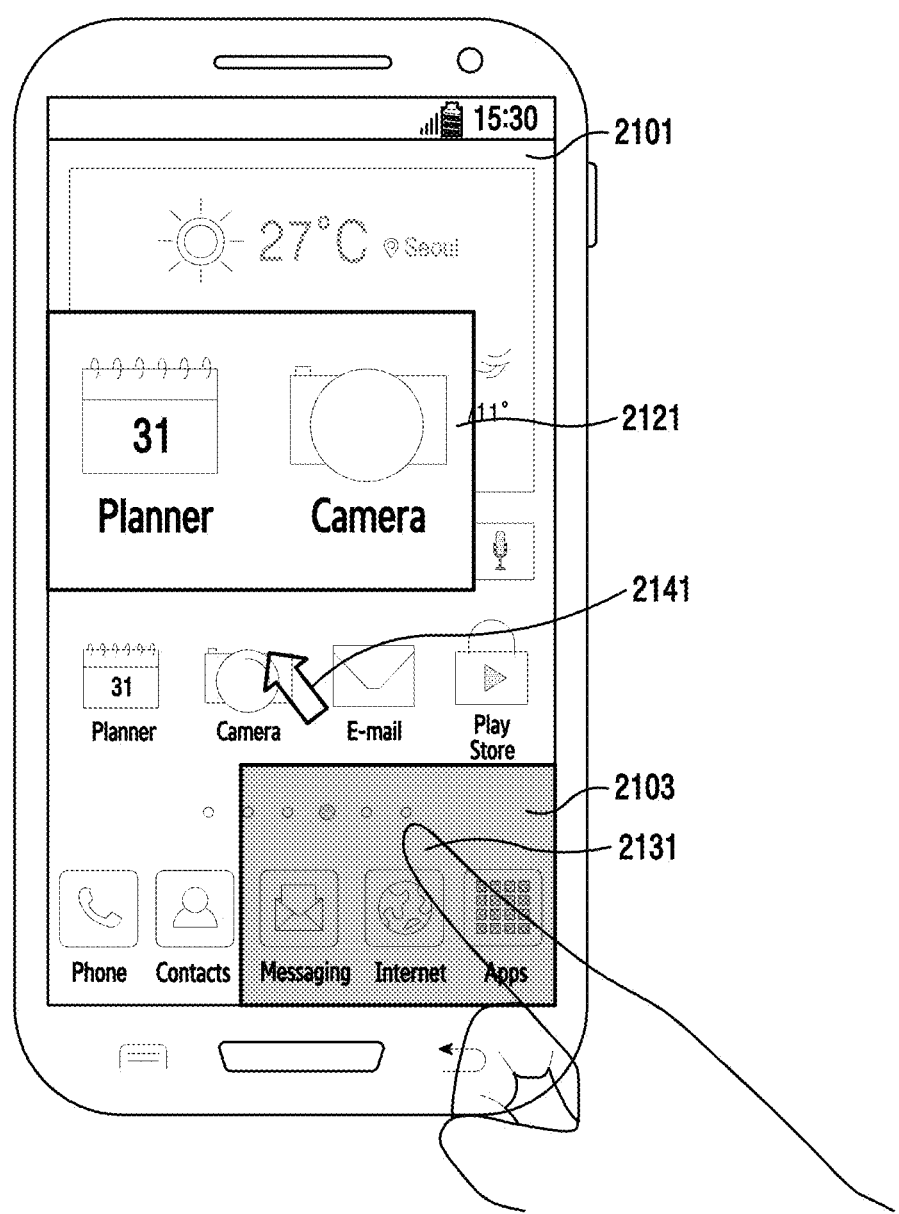

FIGS. 21A and 21B illustrate a procedure for providing a virtual input pad for magnifying a screen in an electronic device according to various embodiments of the present disclosure.

Referring to FIGS. 20 and 21A, in operation 2000, the electronic device may display a screen. According to an embodiment of the present disclosure, the electronic device may display the screen through a touch screen 2101.

In operation 2001, the electronic device may determine whether a virtual input pad display event occurs. According to an embodiment of the present disclosure, the event for displaying a virtual input pad 2103 in the electronic device may be performed based on at least one input of a menu manipulation, a touch input, a gesture input, a key input, and an electronic pen input of the user.

In operation 2002, the electronic device may display the virtual input pad 2103. According to an embodiment of the present disclosure, as shown in FIG. 21A, the electronic device may display the virtual input pad 2103 on the screen.

According to an embodiment of the present disclosure, when an input event occurs on the virtual input pad, the electronic device may process a control event (for example, cursor movement, selection, execution, and the like) corresponding to the input event. For example, in the case of a user who has a difficulty in manipulating the entire screen of the electronic device, the virtual input pad is provided on a certain area of the screen, thereby facilitating input on the entire screen.

According to an embodiment of the present disclosure, the electronic device may display the virtual input pad translucently or transparently, so that the user can see information displayed under the virtual input pad. For example, the electronic device may provide a setting menu for determining transparency of the virtual input pad.

Referring to FIG. 21B, in operation 2003, the electronic device may determine whether a screen magnification event occurs. According to an embodiment of the present disclosure, the electronic device may determine whether a touch event 2131 on the virtual input pad 2103 occurs as shown in FIG. 21B.

In operation 2005, the electronic device may determine a screen magnification target area. According to an embodiment of the present disclosure, the electronic device may determine the screen magnification target area based on touch coordinates by the finger 2131 as shown in FIG. 21B. In this case, the electronic device may display a cursor 2141 on the real coordinates by the touch inputted through the virtual input pad 2103.

In operation 2007, the electronic device may magnify and display the target area. According to an embodiment of the present disclosure, the electronic device may magnify and display the screen magnification target area on a magnification display area 2121 based on the touch coordinates by the finger 2131. The touch coordinates by the finger 2131 may be touch coordinates on the virtual input pad 2103 or coordinates of the cursor 2141 displayed by the touch input on the virtual input pad 2103.

FIGS. 22A, 22B, 22C, 22D, 22E, and 22F illustrate a procedure for providing screen magnification through a virtual input pad in an electronic device according to various embodiments of the present disclosure.

Figure 22A:
FIGS. 22A, 22B, 22C, 22D, 22E, and 22F illustrate a procedure for providing screen magnification through a virtual input pad in an electronic device according to various embodiments of the present disclosure.

Referring to FIG. 22A, a display 2201 of the electronic device may display a menu icon 2203 on at least a certain area.

Figure 22B:
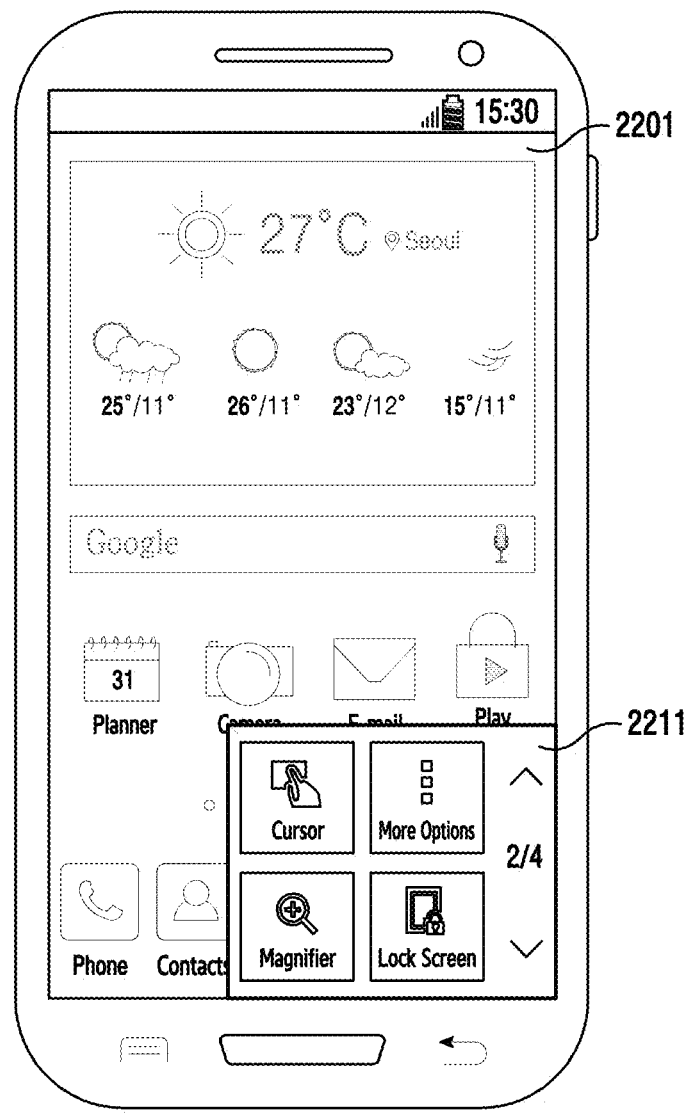

Referring to FIG. 22B, when a user's input on the menu icon 2203 is received, items 2211 for selecting at least one of the functions (for example, system menus or device menus) of the electronic device may be displayed on at least a certain area of the display 2201. According to an embodiment of the present disclosure, the items may be a text, a symbol, or an icon associated with the function of the electronic device.

Figure 22C:
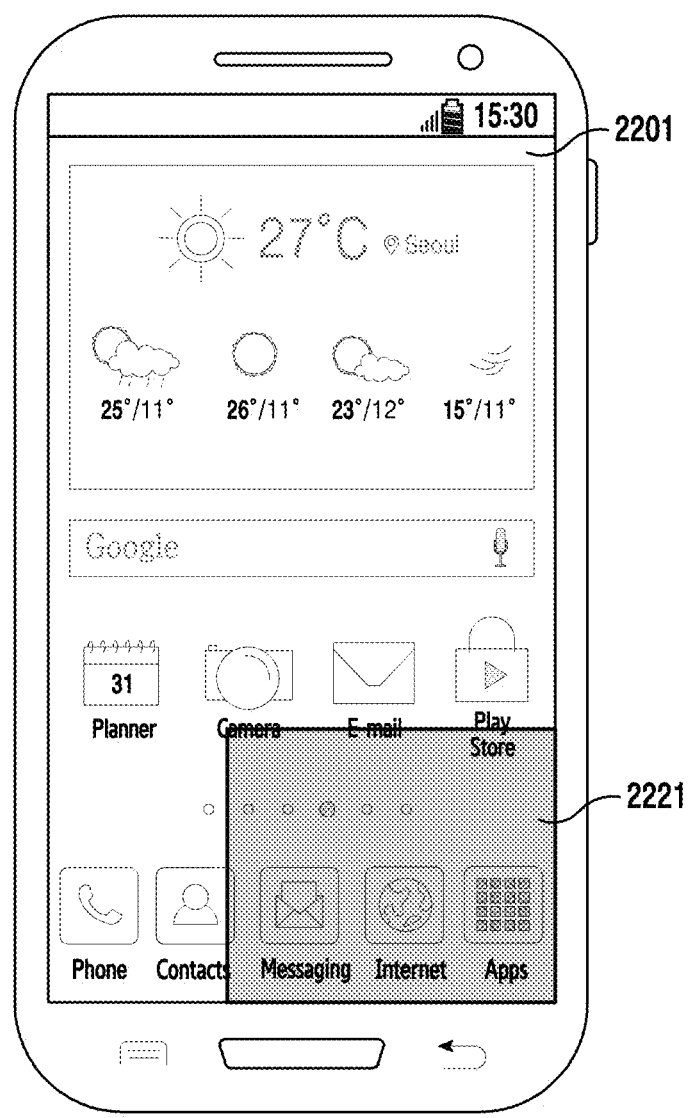

Referring to FIG. 22C, when "cursor" is selected from among the plurality of items on the screen, the electronic device may display a virtual input pad 2221 on the display 2201.

Figure 22D:
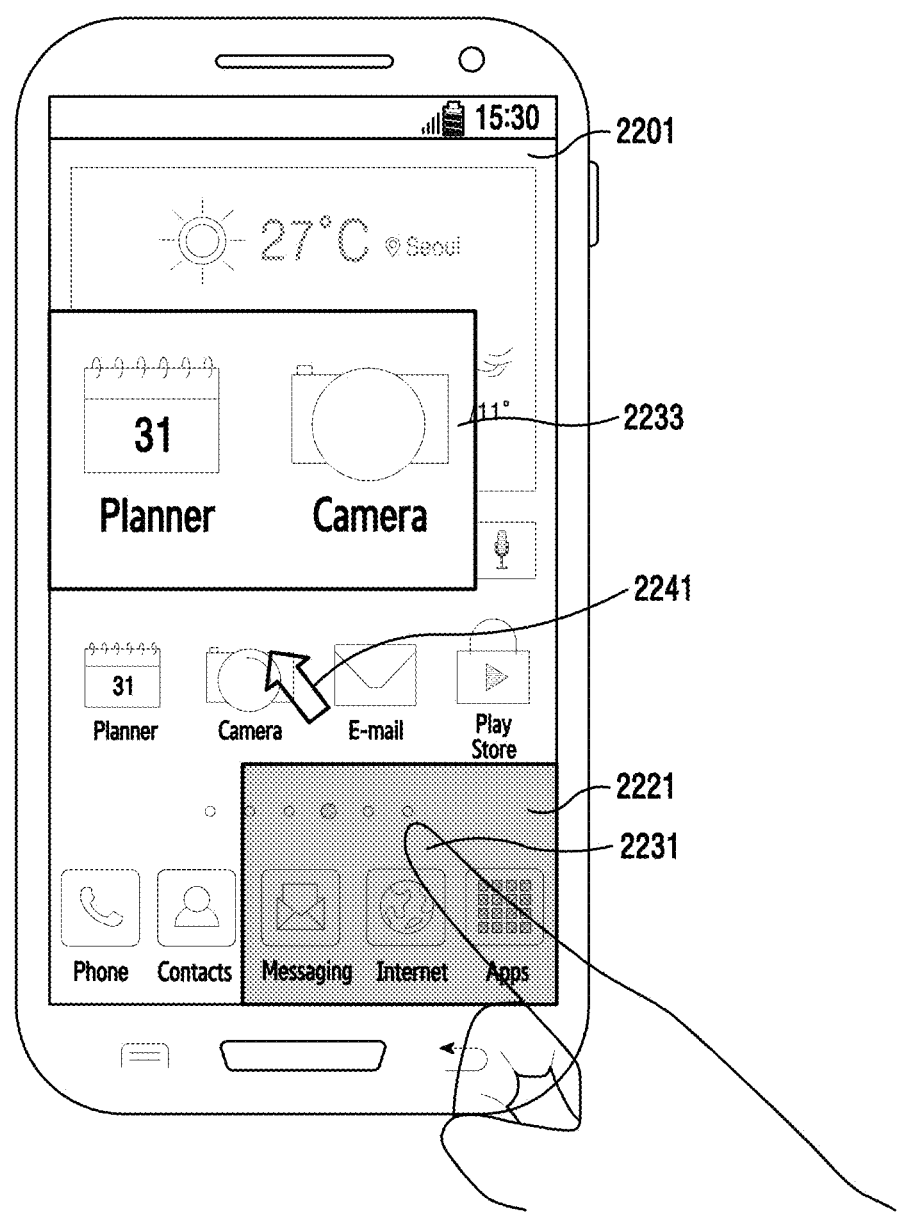

Referring to FIG. 22D, when a touch input 2231 of the user occurs on the virtual input pad 2221, the electronic device may magnify and display a screen magnification target area on a magnification display area 2233 based on touch coordinates. In this case, the electronic device may display a cursor 2241 on real coordinates by the user's touch input inputted through the virtual input pad 2221.

Figure 22E:
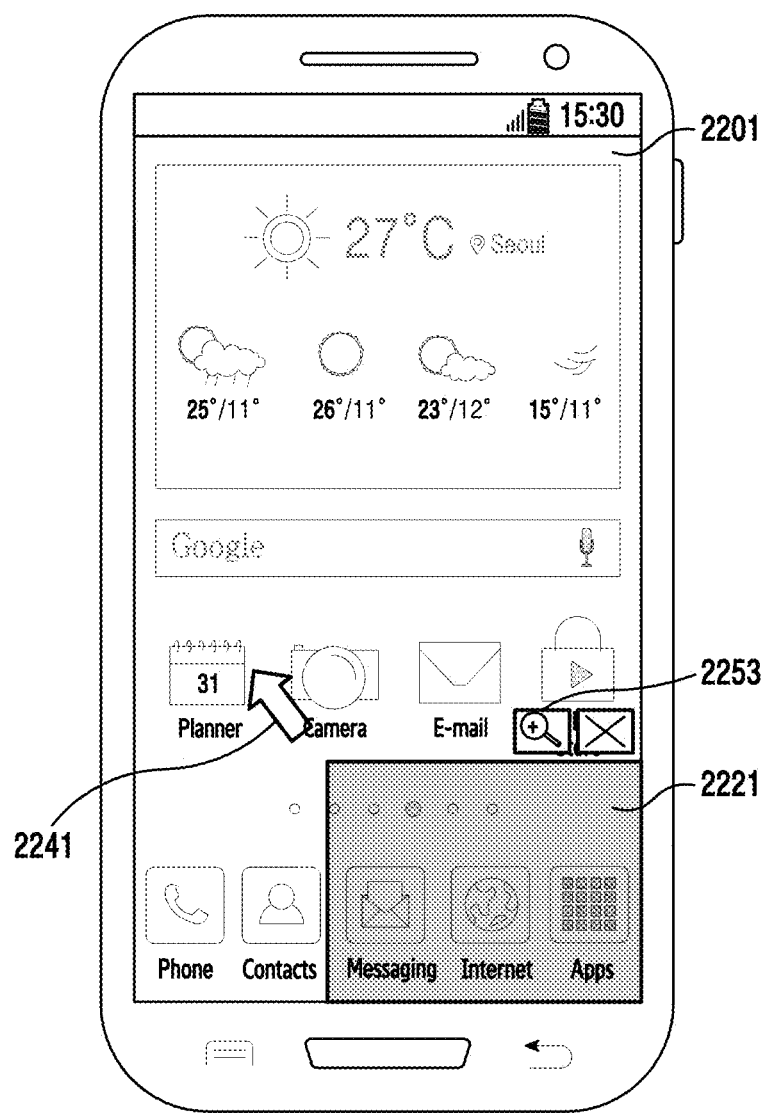

Referring to FIG. 22E, according to an embodiment of the present disclosure, when a virtual input pad display event occurs, the electronic device may display the virtual input pad 2221 and the cursor 2241. In addition, the electronic device may display a magnification menu icon 2253 for providing a magnified screen based on a touch input on the virtual input pad 2221, and an icon for removing the display of the virtual input pad 2221.

Figure 22F:
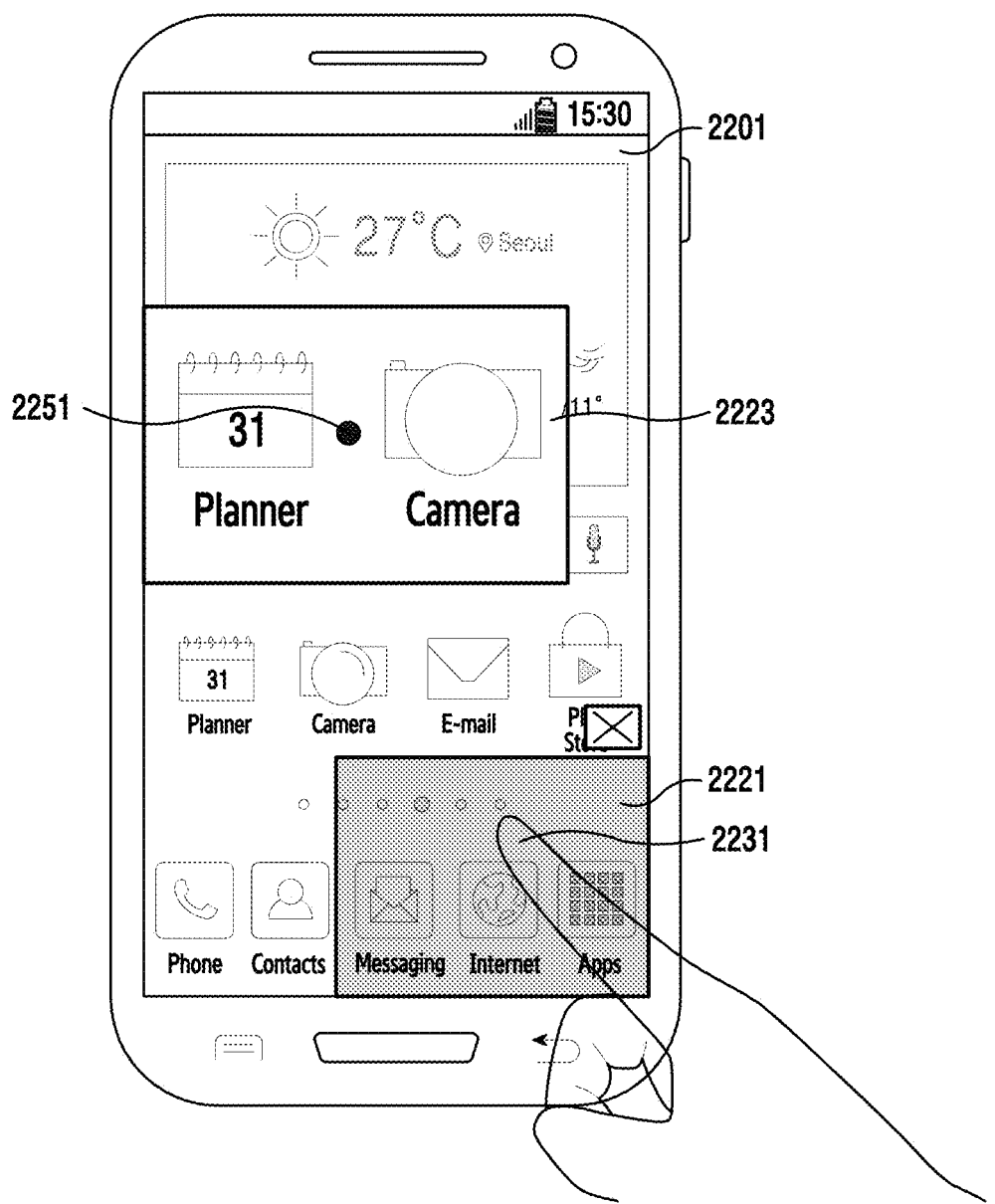

Referring to FIG. 22F, when the magnification menu icon 2253 is selected, the electronic device may determine a magnification target area based on the touch input 2231 on the virtual input pad 2221, and display the determined magnification target area on the screen magnification display area 2223. In this case, the electronic device may remove the display of the cursor 2241 shown in FIG. 22E, and, as shown in FIG. 22F, the electronic device may display a point 2251 on the coordinates of the magnification display area 2223 corresponding to the user's touch input on the virtual input pad 2221.

Figure 23A:
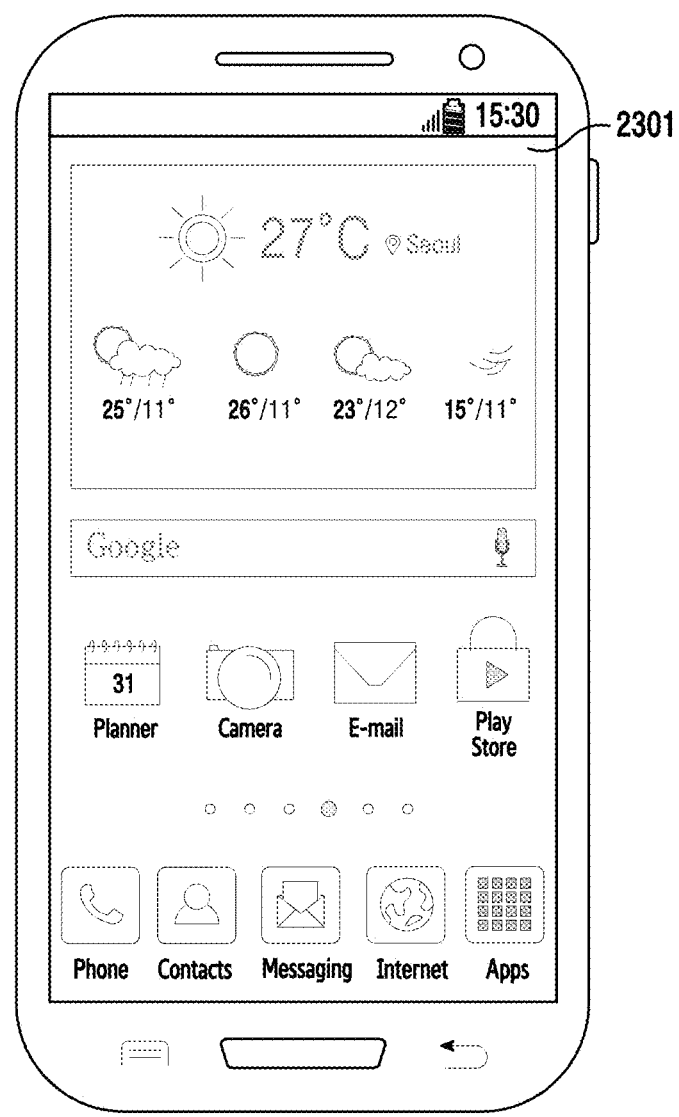
FIGS. 23A, 23B, and 23C illustrate a procedure for providing screen magnification based on an electronic pen input in an electronic device according to various embodiments of the present disclosure.
Figure 23B:
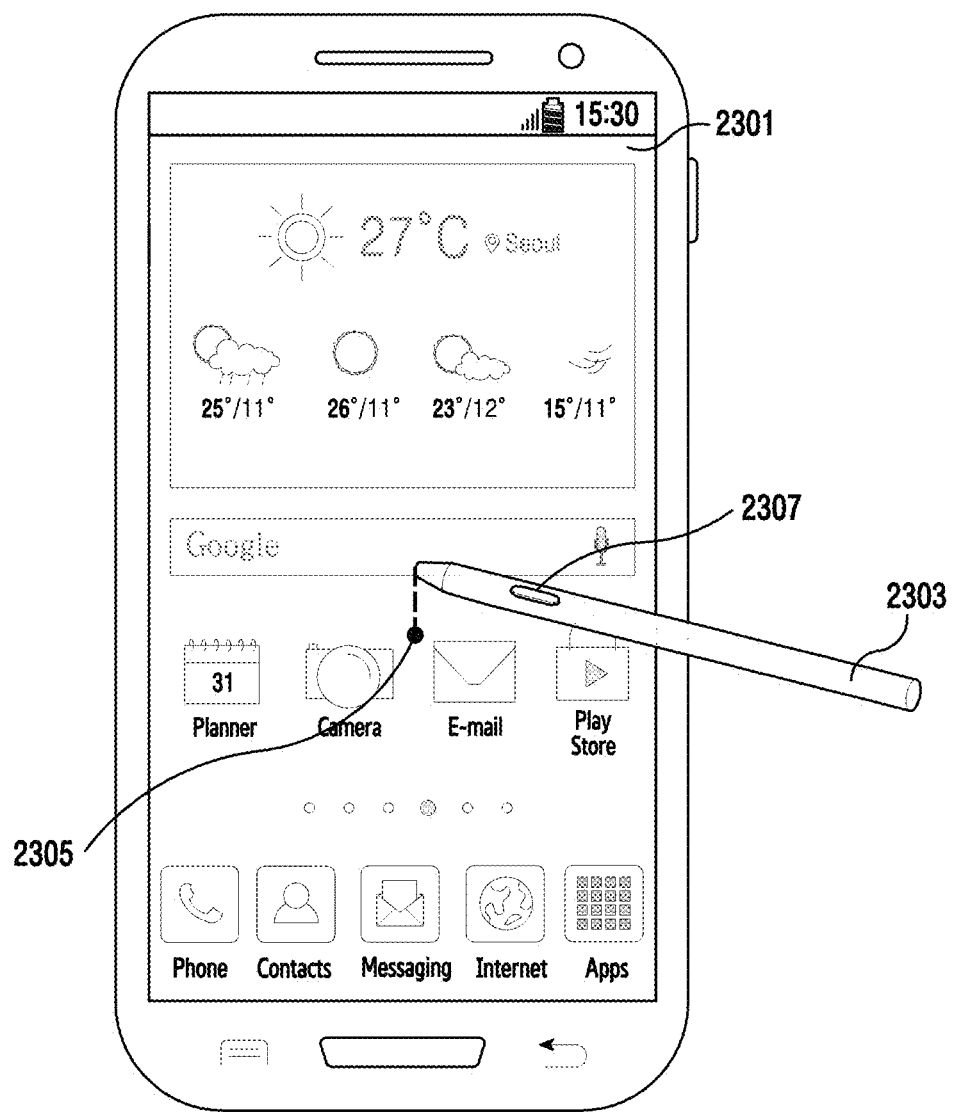
Figure 23C:
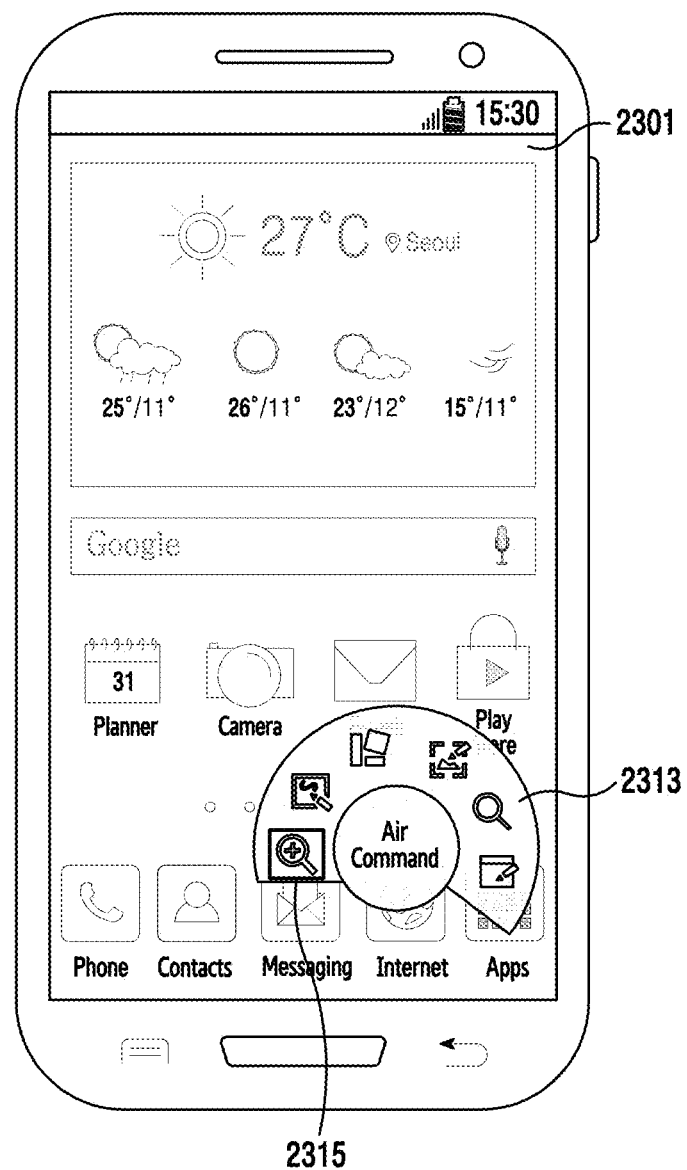

FIGS. 23A, 23B, and 23C illustrate a procedure for providing screen magnification based on an electronic pen input in an electronic device according to various embodiments of the present disclosure.

Referring to FIGS. 23A, 23B, and 23C, when the electronic device displays display data through a display 2301 as shown in FIG. 23A, and a hovering input 2305 by an electronic pen 2303 occurs as shown in FIG. 23B, the electronic device may display a shortcut menu 2313 (for example, an air command) as shown in FIG. 23C. When selection of a screen magnifying tool 2315 is detected on the shortcut menu 2313, the screen magnification function according to the above-described embodiments of the present disclosure may be provided.

Figure 24A:
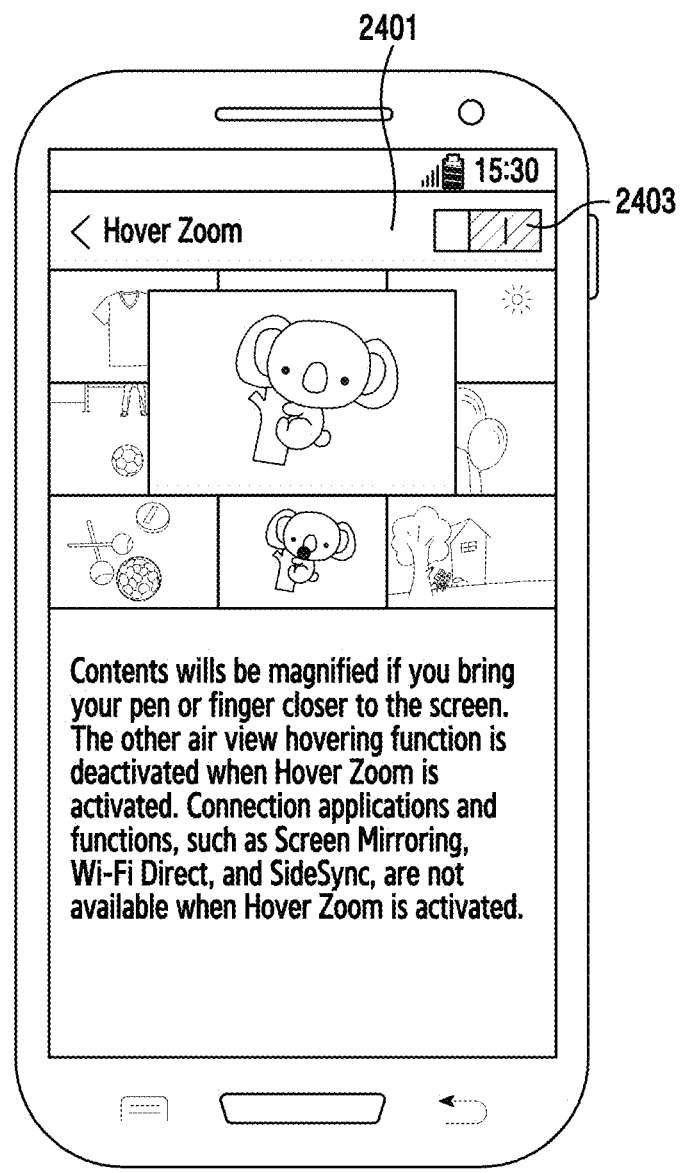
FIGS. 24A, 24B, and 24C illustrate a procedure for providing settings of a screen magnification function in an electronic device according to various embodiments of the present disclosure.
Figure 24B:
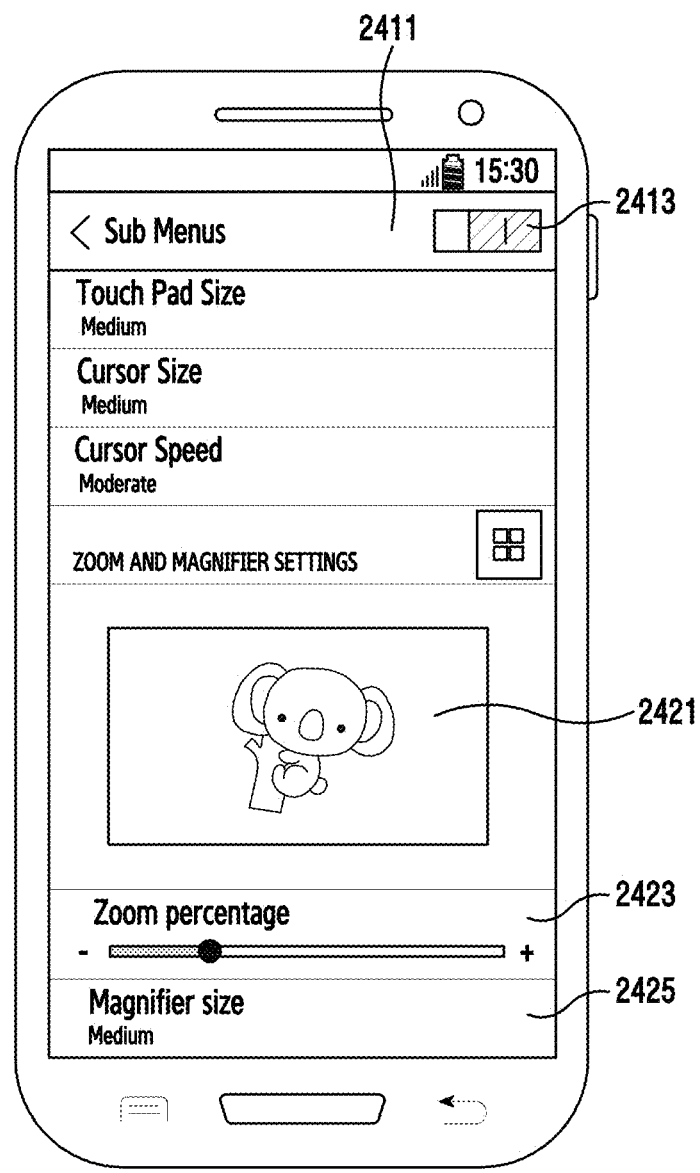
Figure 24C:
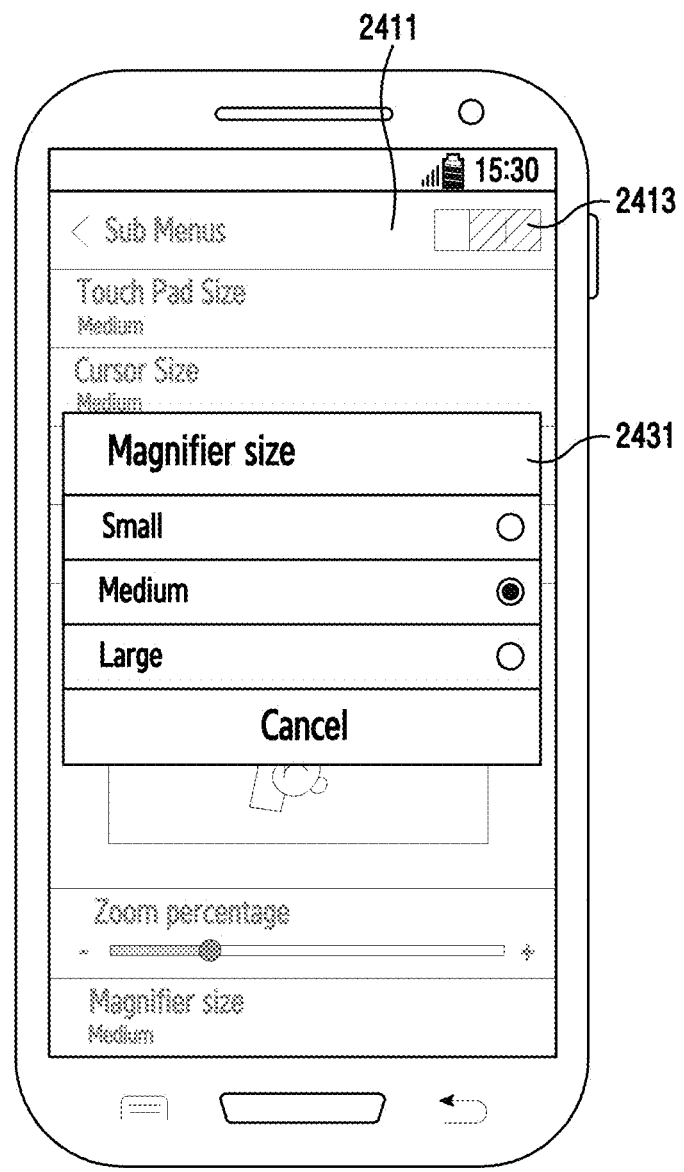

FIGS. 24A, 24B, and 24C illustrate a procedure for providing settings 2401 of a screen magnification function in an electronic device according to various embodiments of the present disclosure.

Referring to FIG. 24A, the electronic device may provide a button 2403 for determining whether to activate or deactivate the screen magnification function. In this case, the electronic device may guide the user about the other functions which are deactivated when the screen magnification function is activated.

Referring to FIG. 24B, the electronic device may provide detailed settings 2411 of the screen magnification function. According to an embodiment of the present disclosure, the electronic device may provide a button 2413 for determining whether to apply the detailed settings 2411 of the screen magnification function.

According to an embodiment of the present disclosure, the electronic device may provide a menu for determining a basic magnification ratio when providing the screen magnification function in operation 2423. In this case, the electronic device may display a preview screen 2421 in response to the basic magnification ratio 2425 being determined.

Referring to FIG. 24C, according to an embodiment of the present disclosure, the electronic device may provide a menu for determining the size of the magnification display area when providing the screen magnification function in operation 2431.

According to various embodiments of the present disclosure, a method for providing screen magnification in an electronic device includes displaying a screen, detecting a screen magnification event, determining a target area on the screen based on the screen magnification event, and magnifying the target area on the screen.

According to various embodiments of the present disclosure, the screen magnification event may be detected by a hovering input.

According to various embodiments of the present disclosure, the determining the target area may include determining the target area based on coordinates of the hovering input on the screen.

According to various embodiments of the present disclosure, the magnifying the target area may include determining a magnification ratio of the target area based on a height of the hovering input from the screen, and adjusting the target area according to the magnification ratio.

According to various embodiments of the present disclosure, the method may further include, when the height of the hovering input from the screen is changed, changing the magnification ratio of the target area.

According to various embodiments of the present disclosure, the magnifying the target area may include displaying the target area on a display area on a certain location of the screen, changing a size of the display area based on a gesture on the display area, and changing the magnification ratio of the target area according to the size of the display area.

According to various embodiments of the present disclosure, the detecting the screen magnification event may include displaying a virtual input pad on the screen, and detecting the screen magnification event on the virtual input pad.

According to various embodiments of the present disclosure, the determining the target area may include determining the target area in a circular, oval, polygonal, or water drop shape.

The magnifying the target area may include applying a water drop effect or a magnifying glass effect to the target area.

According to various embodiments of the present disclosure, the method may include detecting a change in coordinates of the hovering input on the screen, when the change in the coordinates is less than or equal to a reference value, disregarding the change in the coordinates, and, when the change in the coordinates exceeds the reference value, moving the target area on the screen according to the change in the coordinates.

The term "module" used in various embodiments of the present disclosure refers to, for example, a unit including one of hardware, software, and firmware, or a combination of at least two of the hardware, software, and firmware. For example, the "module" may be used interchangeably with terms like unit, logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" may include at least one of an application specific IC (ASIC) chip, field programmable gate arrays (FPGAs), and a programmable logic device which perform any operation that is already well known or will be developed in the future.

At least part of the apparatus (for example, modules or functions) or method (for example, operations) according to various embodiments of the present disclosure may be implemented by using instructions stored in a computer-readable storage media in the form of a programming module. When the instructions are executed by one or more processors (for example, the processor 120), the one or more processors may perform a function corresponding to the instructions. The computer-readable storage media may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or programming module according to various embodiments of the present disclosure may include one or more of the above-described elements, may omit some elements, or may further include additional other elements. The operations performed by the module, the programming module, or the other elements according to various embodiments of the present disclosure may be performed serially, in parallel, repeatedly, or heuristically. In addition, some operation may be performed in different order or may omitted, and additional other operations may be added.

According to various embodiments of the present disclosure, the computer readable recording medium, which stores instructions, may record a program for executing the operations of displaying a screen, detecting a screen magnification event, determining a target area on the screen based on the screen magnification event, and magnifying the target area on the screen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing screen magnification in an electronic device, the method comprising:
 displaying a screen;
 detecting a screen magnification event;
 determining a target area on the screen based on the screen magnification event;
 displaying the target area on a display area on a certain location of the screen;
 changing a size of the display area based on a gesture on the display area; and
 changing a magnification ratio of the target area according to the size of the display area.

2. The method of claim 1, wherein the screen magnification event is detected by a hovering input.

3. The method of claim 2, wherein the determining of the target area comprises determining the target area based on coordinates of the hovering input on the screen.

4. The method of claim 2, wherein the magnifying of the target area comprises:
determining the magnification ratio of the target area based on a height of the hovering input from the screen; and
adjusting the target area according to the magnification ratio.

5. The method of claim 4, further comprising changing, when the height of the hovering input from the screen is changed, the magnification ratio of the target area.

6. The method of claim 2, further comprising:
detecting a change in coordinates of the hovering input on the screen;
disregarding, when the change in the coordinates is less than or equal to a reference value, the change in the coordinates; and
moving, when the change in the coordinates exceeds the reference value, the target area on the screen according to the change in the coordinates.

7. The method of claim 1, wherein the detecting of the screen magnification event comprises:
displaying a virtual input pad on the screen; and
detecting the screen magnification event on the virtual input pad.

8. The method of claim 1, wherein the determining of the target area comprises determining the target area in a circular shape, an oval shape, a polygonal shape, or a water drop shape.

9. The method of claim 1, wherein the magnifying of the target area comprises applying a water drop effect or a magnifying glass effect to the target area.

10. An electronic device comprising:
a display; and
a processor configured to:
display a screen on the display,
detect a screen magnification event,
determine a target area on the screen based on the screen magnification event,
display the target area on a display area on a certain location of the screen,
change a size of the display area based on a gesture on the display area, and
change a magnification ratio of the target area according to the size of the display area.

11. The electronic device of claim 10, further comprising:
a sensor configured to detect a hovering input on the display,
wherein the processor is further configured to detect the hovering input as the screen magnification event.

12. The electronic device of claim 11, wherein the processor is further configured to determine the target area based on coordinates of the hovering input on the screen.

13. The electronic device of claim 11, wherein the processor is further configured to:
determine the magnification ratio of the target area based on a height of the hovering input from the screen, and
adjust the target area according to the magnification ratio.

14. The electronic device of claim 13, wherein, when the height of the hovering input from the screen is changed, the processor is further configured to change the magnification ratio of the target area.

15. The electronic device of claim 11, wherein the processor is further configured to:
detect a change in coordinates of the hovering input on the screen,
disregard, when the change in the coordinates is less than or equal to a reference value, the change in the coordinates, and
move, when the change in the coordinates exceeds the reference value, the target area on the screen according to the change in the coordinates.

16. The electronic device of claim 10, wherein the processor is further configured to:
display a virtual input pad on the screen, and
detect the screen magnification event on the virtual input pad.

17. The electronic device of claim 10, wherein the processor is further configured to apply a water drop effect or a magnifying glass effect to the target area.

18. At least one non-transitory computer readable storage medium for storing a computer program of instructions configured to be readable by at least one processor for instructing the at least one processor to execute a computer process for performing the method of claim 1.

* * * * *